(12) United States Patent
Huang

(10) Patent No.: US 12,323,999 B2
(45) Date of Patent: Jun. 3, 2025

(54) METHOD AND APPARATUS FOR REDUCING POWER CONSUMPTION FOR CARRIER AGGREGATION IN A WIRELESS COMMUNICATION SYSTEM

(71) Applicant: ASUSTek Computer Inc., Taipei (TW)

(72) Inventor: Chun-Wei Huang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 18/632,383

(22) Filed: Apr. 11, 2024

(65) Prior Publication Data

US 2024/0260050 A1    Aug. 1, 2024

Related U.S. Application Data

(63) Continuation of application No. 17/227,430, filed on Apr. 12, 2021, now Pat. No. 11,985,671.

(60) Provisional application No. 63/010,223, filed on Apr. 15, 2020.

(51) Int. Cl.
| | |
|---|---|
| *H04W 72/23* | (2023.01) |
| *H04L 1/1812* | (2023.01) |
| *H04L 1/1867* | (2023.01) |
| *H04W 24/08* | (2009.01) |
| *H04W 72/0453* | (2023.01) |

(Continued)

(52) U.S. Cl.
CPC .......... *H04W 72/23* (2023.01); *H04L 1/1819* (2013.01); *H04L 1/1896* (2013.01); *H04W 24/08* (2013.01); *H04W 72/0453* (2013.01); *H04W 72/1263* (2013.01); *H04W 72/535* (2023.01)

(58) Field of Classification Search
None
See application file for complete search history.

(56) References Cited

U.S. PATENT DOCUMENTS 12,108,394 B2 * 10/2024 Seo .................. H04L 5/0053
2021/0127450 A1 * 4/2021 Abdoli .............. H04W 72/0453
(Continued)

OTHER PUBLICATIONS

LG Electronics: "Discussion of L1 based Scell Dormancy", 3GPP TSG RAN WG1 Meeting #99, R1-1912407, Reno, USA, Nov. 185h-22nd, 2019, 9 pages.

(Continued)

*Primary Examiner* — Saumit Shah
(74) *Attorney, Agent, or Firm* — Cooper Legal Group LLC

(57) ABSTRACT

A method and apparatus are disclosed. In an example, a User Equipment (UE) is configured with one or more cells including a second cell. The UE is configured to monitor one or more first UE-specific Physical Downlink Control Channels (PDCCHs) on the second cell. The one or more first UE-specific PDCCHs schedule data transmission on a first cell. The UE receives a Downlink Control Information (DCI) indicative of dormancy information associated with the one or more cells. The DCI indicates dormant status of the second cell. In response to the DCI indicating the dormant status of the second cell, the UE switches a scheduling cell of the first cell from the second cell to the first cell, and the UE monitors one or more second UE-specific PDCCHs on the first cell. The one or more second UE-specific PDCCHs schedule data transmission on the first cell.

20 Claims, 12 Drawing Sheets

1100 ⟶

```
┌────────────────────────────────────────────────────────────────┐
│ RECEIVE DCI INDICATIVE OF DORMANCY INFORMATION ASSOCIATED WITH ONE OR │ — 1105
│     MORE CELLS, WHEREIN DCI INDICATES DORMANT STATUS OF SECOND CELL   │
└────────────────────────────────────────────────────────────────┘
                               ↓
┌────────────────────────────────────────────────────────────────┐
│   IN RESPONSE TO DCI INDICATING DORMANT STATUS OF SECOND CELL, SWITCH  │
│      SCHEDULING CELL OF FIRST CELL FROM SECOND CELL TO FIRST CELL AND  │
│   MONITOR ONE OR MORE SECOND UE-SPECIFIC PDCCHS ON FIRST CELL, WHEREIN │ — 1110
│  ONE OR MORE SECOND UE-SPECIFIC PDCCHS SCHEDULE DATA TRANSMISSION ON   │
│                              FIRST CELL                                │
└────────────────────────────────────────────────────────────────┘
```

(51) Int. Cl.
H04W 72/1263 (2023.01)
H04W 72/50 (2023.01)

(56) References Cited

U.S. PATENT DOCUMENTS

2021/0195523 A1* 6/2021 Kim .................. H04W 52/0241
2021/0377852 A1* 12/2021 Zhou ................. H04W 52/0206

OTHER PUBLICATIONS

Ericsson: "Reduced Latency Scell Management for NR CA", 3GPP TsG-RAN WG1 #98, R1-1909144, Prague, Czech Republic, Aug. 26-30, 2019, 7 pages.
Corresponding Korean Patent Application No. 10-2021-0047206, Office Action dated May 20, 2024, English Translation, 13 pages.

* cited by examiner

702 →

| Bit position in a bit-map (in a DCI) | a_1 | a_2 | a_3 | a_4 | ... | ... | a_14 |
|---|---|---|---|---|---|---|---|
| Associated SCell index | 1 | 2 | 8 | 10 | | | 31 |

MCG

| Bit position in a bit-map (in a DCI) | a_1 | a_2 | a_3 | a_4 | ... | ... | a_14 | a_15 |
|---|---|---|---|---|---|---|---|---|
| Associated SCell index | 1 | 2 | 8 | 10 | | | 31 | N/A or reserved |

MCG

FIG. 8

METHOD AND APPARATUS FOR REDUCING POWER CONSUMPTION FOR CARRIER AGGREGATION IN A WIRELESS COMMUNICATION SYSTEM

CROSS-REFERENCE TO RELATED APPLICATIONS

The present application claims priority to and is a continuation of U.S. application Ser. No. 17/227,430, filed on Apr. 12, 2021, entitled "METHOD AND APPARATUS FOR REDUCING POWER CONSUMPTION FOR CARRIER AGGREGATION IN A WIRELESS COMMUNICATION SYSTEM", which claims the benefit of U.S. Provisional Patent Application Ser. No. 63/010,223 filed on Apr. 15, 2020. U.S. application Ser. No. 17/227,430 and U.S. Provisional Patent Application Ser. No. 63/010,223 are incorporated herein in their entirety by reference.

FIELD

This disclosure generally relates to wireless communication networks, and more particularly, to a method and apparatus for reducing power consumption for carrier aggregation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE is configured with one or more cells comprising a second cell. The UE is configured to monitor one or more first UE-specific Physical Downlink Control Channels (PDCCHs) on the second cell. The one or more first UE-specific PDCCHs schedule data transmission on a first cell. The UE receives a Downlink Control Information (DCI) indicative of dormancy information associated with the one or more cells. The DCI indicates dormant status of the second cell. In response to the DCI indicating the dormant status of the second cell, the UE switches a scheduling cell of the first cell from the second cell to the first cell, and the UE monitors one or more second UE-specific PDCCHs on the first cell. The one or more second UE-specific PDCCHs schedule data transmission on the first cell.

In an example from the perspective of a first network, the first network configures a UE with one or more cells comprising a second cell. The first network configures the UE to monitor one or more PDCCHs on the second cell. The one or more PDCCHs schedule data transmission on a first cell. The first network transmits a first DCI indicative of dormancy information associated with the one or more cells. The first DCI indicates dormant status of a third cell of the one or more cells. The first network is not allowed to provide, via the first DCI, an indication of dormant status corresponding to the second cell. In response to and/or after transmitting the first DCI or receiving a Hybrid Automatic Repeat Request-Acknowledgement (HARQ-ACK) associated with the first DCI, the first network does not transmit a second DCI on the third cell.

In an example from the perspective of a UE, the UE is configured with one or more cells comprising a second cell. The UE is configured to monitor one or more first UE-specific PDCCHs on the second cell. The one or more first UE-specific PDCCHs schedule data transmission on a first cell. The UE receives a DCI indicative of dormancy information associated with the one or more cells. If the DCI indicates dormant status of the second cell, in response to the DCI indicating the dormant status of the second cell, the UE switches a scheduling cell of the first cell from the second cell to the first cell, and the UE monitors one or more second UE-specific PDCCHs on the first cell, wherein the one or more second UE-specific PDCCHs schedule data transmission on the first cell. If the DCI indicates non-dormant status of the second cell, in response to the DCI indicating the non-dormant status of the second cell, the UE monitors the one or more first UE-specific PDCCHs on the second cell.

BRIEF DESCRIPTION OF THE DRAWINGS

FIG. 7 illustrates a table associated with a bit-map indicating dormancy information according to one exemplary embodiment.

FIG. 8 illustrates a table associated with a bit-map indicating dormancy information according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: RP-193260, "New WID on NR Dynamic spectrum sharing (DSS)", Ericsson; 3GPP TS 38.211 V16.1.0 (2020-03), "3GPP TSG RAN; NR Physical channels and modulation (Release 16)"; 3GPP TS 38.212 V16.1.0 (2020-03), "3GPP TSG RAN; NR Physical channels and modulation (Release 16)"; 3GPP TS 38.213 V16.1.0 (2020-03), "3GPP TSG RAN; NR Physical channels and modulation (Release 16)"; Draft 3GPP TS 38.321 V16.0.0 (2020-03), "3GPP TSG RAN; NR Medium Access Control (MAC) protocol specification (Release 16)"; R1-1909942, Final Report of 3GPP TSG RAN WG1 #98 v1.0.0 (Prague, Czech Rep, 26-30 Aug. 2019); R1-1913275, Final Report of 3GPP TSG RAN WG1 #98bis v2.0.0 (Chongqing, China, 14-20 Oct. 2019); Draft Report of 3GPP TSG RAN WG1 #99 v0.1.0 (Reno, USA, 18-22 Nov. 2019); Draft Report of 3GPP TSG RAN WG1 #100-e v0.2.0 (Online meeting, 24 Feb.-6 Mar. 2020); 3GPP TS 38.331 V16.0.0 (2020-03), "3GPP TSG RAN; NR Radio Resource Control (RRC) protocol specification (Release 16)". The standards and documents listed above are hereby expressly incorporated by reference in their entirety.

Figure 1:
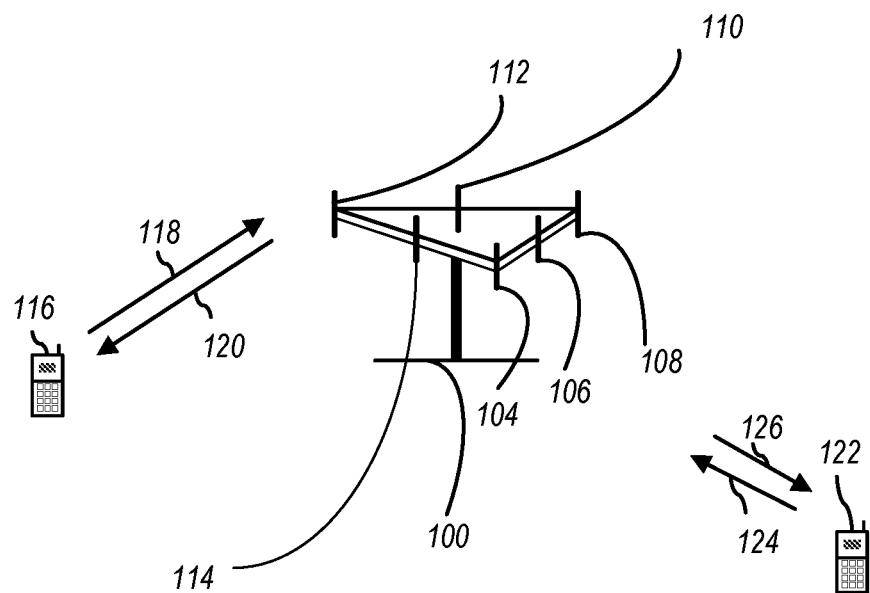
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
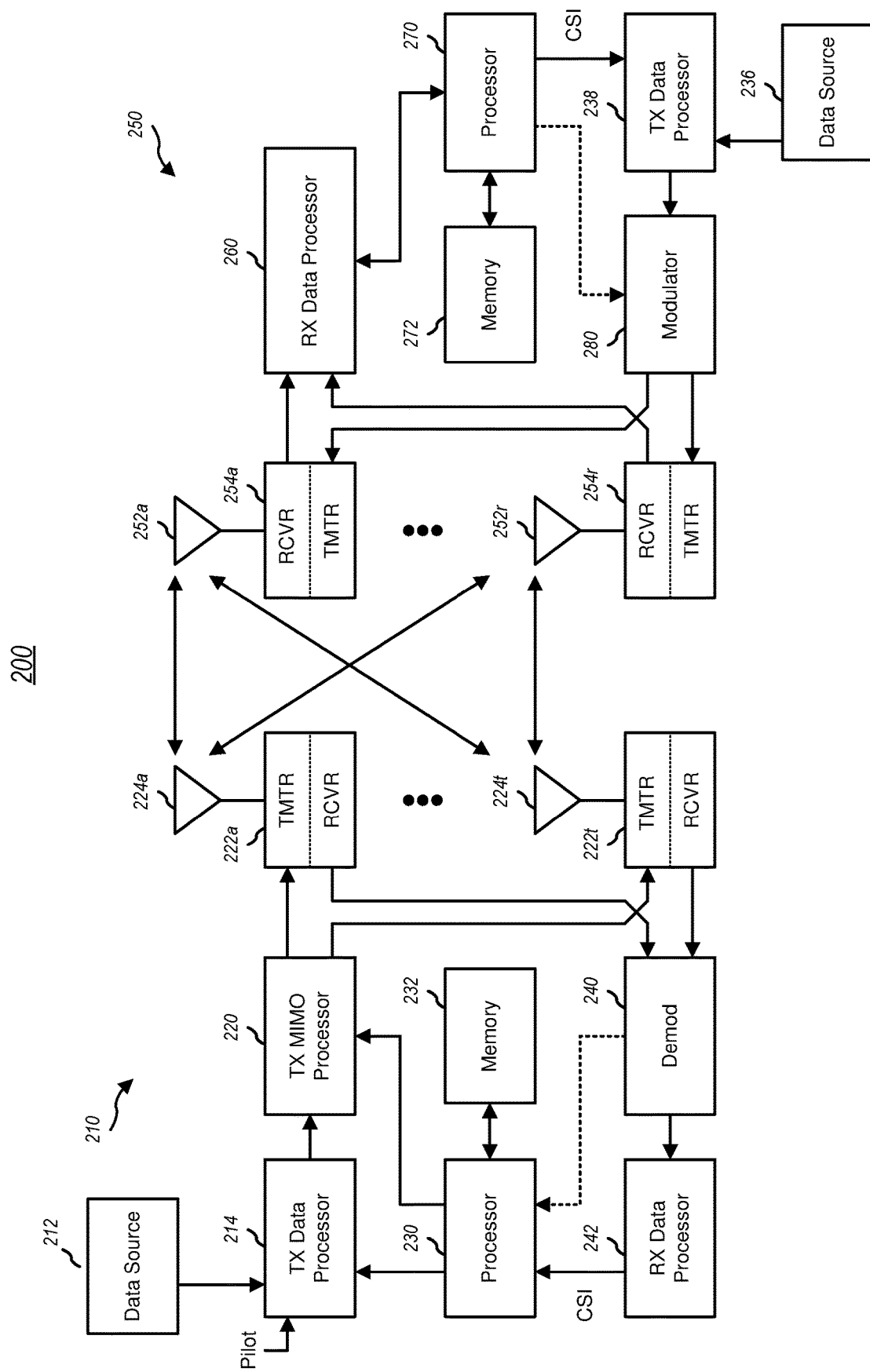
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
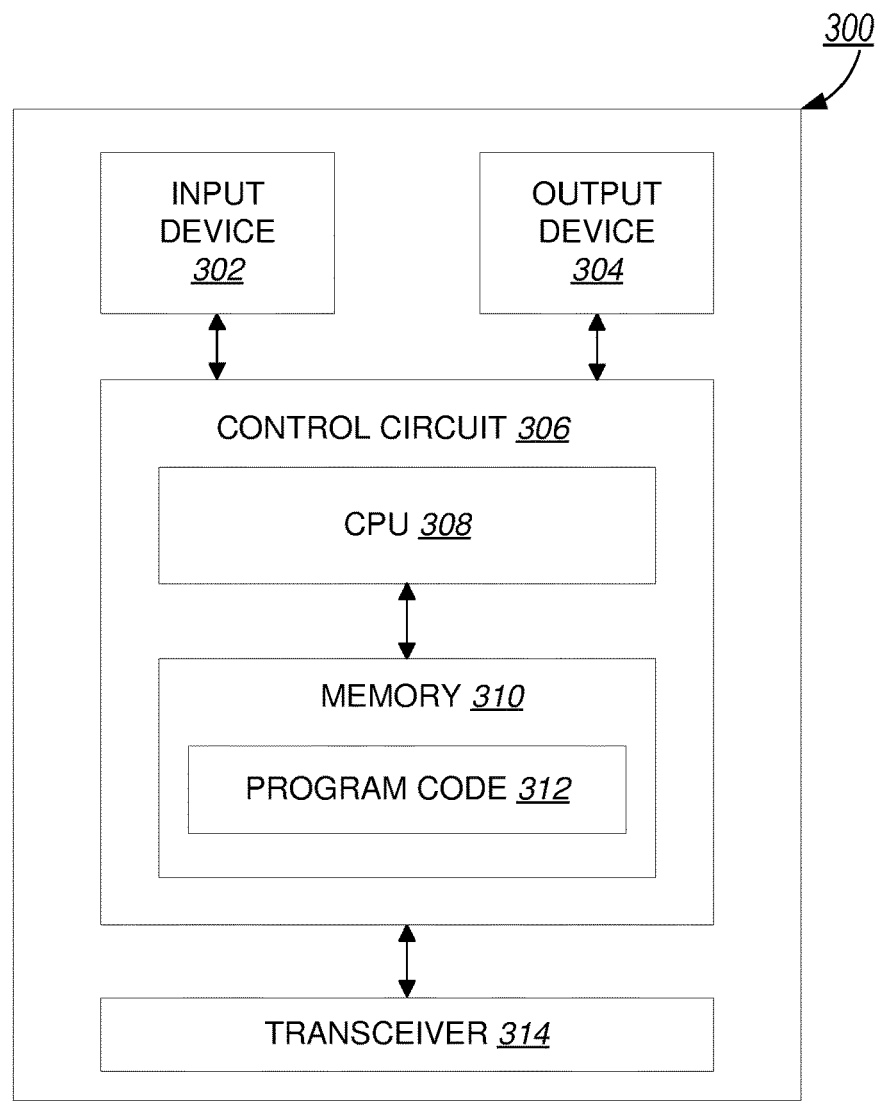
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
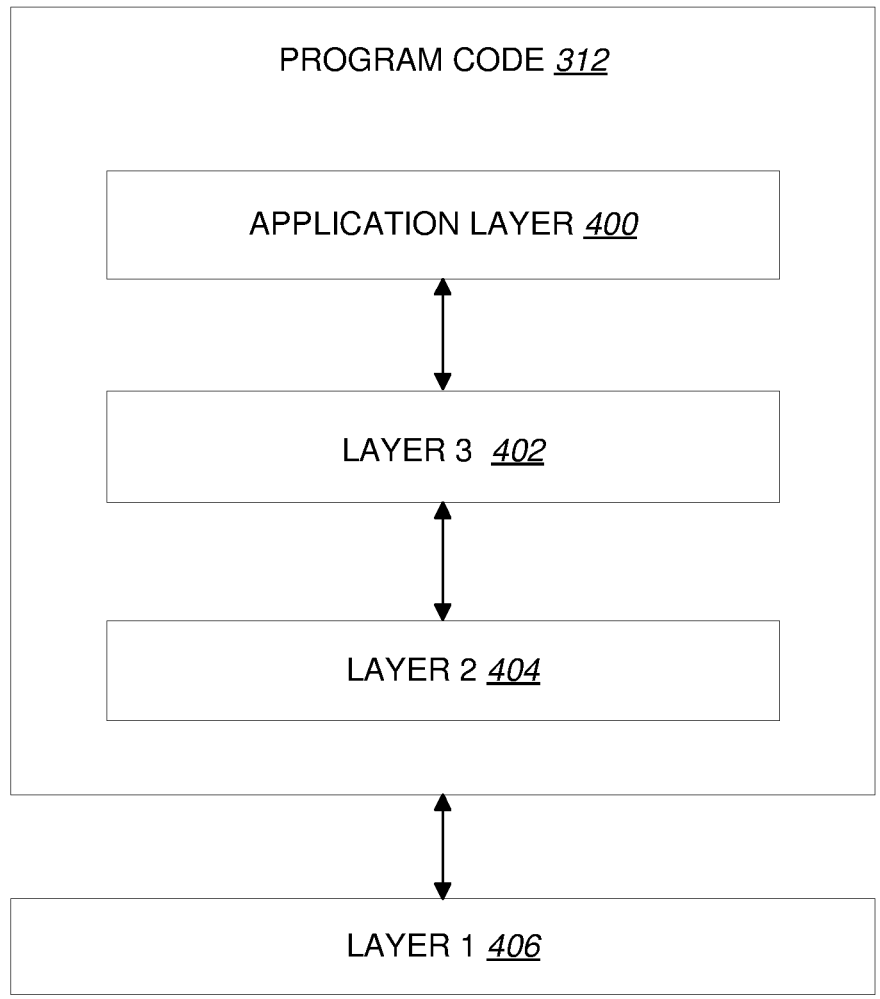
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

RP-193260 specifies and/or discusses one or more objectives of NR dynamic spectrum sharing (DSS). Parts of RP-193260 are quoted below:
This work item is limited to FR1, and includes the following objectives for NR Dynamic Spectrum Sharing (DSS):
  PDCCH enhancements for cross-carrier scheduling including [RAN1, RAN2]
    PDCCH of SCell scheduling PDSCH or PUSCH on P(S)Cell
    Study, and if agreed specify PDCCH of P(S)Cell/SCell scheduling PDSCH on multiple cells using a single DCI
      The number of cells can be scheduled at once is limited to 2
      The increase in DCI size should be minimized
    Note: The total PDCCH blind decoding budget should not be changed as a result of this work
    Note: These enhancements are not specific to DSS and are generally applicable to cross-carrier scheduling in carrier aggregation 3GPP TS 38.211 V16.1.0 specifies and/or discusses frame structure of NR system. Parts of 3GPP TS 38.211 V16.1.0 are quoted below:
4 Frame Structure and Physical Resources
. . .
Multiple OFDM numerologies are supported as given by Table 4.2-1 where $\mu$ and the cyclic prefix for a downlink or uplink bandwidth part are obtained from the higher-layer parameter subcarrierSpacing and cyclicPrefix, respectively.

TABLE 4.2-1

Supported transmission numerologies.

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

4.3.2 Slots
For subcarrier spacing configuration $\mu$, slots are numbered $n_s^{\mu} \in \{0, \ldots, N_{slot}^{subframe,\mu}-1\}$ in increasing order within a subframe and $n_{s,f}^{\mu} \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot $n_s^{\mu}$ in a subframe is aligned in time with the start of OFDM symbol $n_s^{\mu} N_{symb}^{slot}$ in the same subframe.

TABLE 4.3.2-1

Number of OFDM symbols per slot, slots per frame, and slots per subframe for normal cyclic prefix.

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

3GPP TS 38.212 V16.1.0 specifies and/or discusses DCI format for power saving. Parts of 3GPP TS 38.212 V16.1.0 are quoted below:
7.3.1.1.2 Format 0_1
DCI format 0_1 is used for the scheduling of one or multiple PUSCH in one cell, or indicating CG downlink feedback information (CG-DFI) to a UE.
The following information is transmitted by means of the DCI format 0_1 with CRC scrambled by C-RNTI or CS-RNTI or SP-CSI-RNTI or MCS-C-RNTI:
  Identifier for DCI formats—1 bit
    The value of this bit field is always set to 0, indicating an UL DCI format Carrier indicator—0 or 3 bits, as defined in Clause 10.1 of [5, TS38.213].
DFI flag—0 or 1 bit
  1 bit if the UE is configured to monitor DCI format 0_1 with CRC scrambled by CS-RNTI and for operation in a cell with shared spectrum channel access. For a DCI format 0_1 with CRC scrambled by CS-RNTI, the bit value of 0 indicates activating type 2 CG transmission and the bit value of 1 indicates CG-DFI. For a DCI format 0_1 with CRC scrambled by C-RNTI/SP-CSI-RNTI/MCS-C-RNTI and for operation in a cell with shared spectrum channel access, the bit is reserved.
  0 bit otherwise;
If DCI format 0_1 is used for indicating CG-DFI, all the remaining fields are set as follows:
  HARQ-ACK bitmap—16 bits, where the order of the bitmap to HARQ process index mapping is such that HARQ process indices are mapped in ascending order from MSB to LSB of the bitmap. For each bit of the bitmap, value 1 indicates ACK, and value 0 indicates NACK.
  TPC command for scheduled PUSCH—2 bits as defined in Clause 7.1.1 of [5, TS38.213]
  All the remaining bits in format 0_1 are set to zero.
Otherwise, all the remaining fields are set as follows:
  UL/SUL indicator—0 bit for UEs not configured with supplementaryUplink in ServingCellConfig in the cell or UEs configured with supplementaryUplink in ServingCellConfig in the cell but only one carrier in the cell is configured for PUSCH transmission; otherwise, 1 bit as defined in Table 7.3.1.1.1-1.
  Bandwidth part indicator—0, 1 or 2 bits as determined by the number of UL BWPs $n_{BWP,RRC}$ configured by higher layers, excluding the initial UL bandwidth part. The bitwidth for this field is determined as $\lceil \log_2 (n_{BWP}) \rceil$ bits, where
    $n_{BWP}=n_{BWP,RRC}+1$ if $n_{BWP,RRC} \leq 3$, in which case the bandwidth part indicator is equivalent to the ascending order of the higher layer parameter BWP-Id;
    otherwise $n_{BWP}=n_{BWP,RRC}$, in which case the bandwidth part indicator is defined in Table 7.3.1.1.2-1;
  If a UE does not support active BWP change via DCI, the UE ignores this bit field.
  . . .
  SCell dormancy indication—0 bit if higher layer parameter Scell-groups-for-dormancy-within-active-time is not configured; otherwise 1, 2, 3, 4 or 5 bits bitmap determined according to higher layer parameter Scell-groups-for-dormancy-within-active-time, where each bit corresponds to one of the SCell group(s) configured by higher layers parameter Scell-groups-for-dormancy-within-active-time, with MSB to LSB of the bitmap corresponding to the first to last configured SCell group. The field is only present when this format is carried by PDCCH on the primary cell within DRX Active Time and the UE is configured with at least two DL BWPs for an SCell.

7.3.1.2.2 Format 1_1

DCI format 1_1 is used for the scheduling of PDSCH in one cell.
The following information is transmitted by means of the DCI format 1_1 with CRC scrambled by C-RNTI or CS-RNTI or MCS-C-RNTI:
  Identifier for DCI formats—1 bits
    The value of this bit field is always set to 1, indicating a DL DCI format
  Carrier indicator—0 or 3 bits as defined in Clause 10.1 of [5, TS 38.213].
  Bandwidth part indicator—0, 1 or 2 bits as determined by the number of DL BWPs $n_{BWP,RRC}$ configured by higher layers, excluding the initial DL bandwidth part. The bitwidth for this field is determined as $\lceil \log_2 (n_{BWP}) \rceil$ bits, where
    $n_{BWP}=n_{BWP,RRC}+1$ if $n_{BWP,RRC} \leq 3$, in which case the bandwidth part indicator is equivalent to the ascending order of the higher layer parameter BWP-Id;
    otherwise $n_{BWP}=n_{BWP,RRC}$, in which case the bandwidth part indicator is defined in Table 7.3.1.1.2-1;
  If a UE does not support active BWP change via DCI, the UE ignores this bit field.
  Frequency domain resource assignment—number of bits determined by the following, where $N_{RB}^{DL,BWP}$ is the size of the active DL bandwidth part:
    $N_{RBG}$ bits if only resource allocation type 0 is configured, where $N_{RBG}$ is defined in Clause 5.1.2.2.1 of [6, TS38.214],
    $\lceil \log_2(N_{RB}^{DL,BWP}(N_{RB}^{DL,BWP}+1)/2) \rceil$ bits if only resource allocation type 1 is configured, or
    max ($\lceil \log_2(N_{RB}^{DL,BWP}+1)/2) \rceil$, $N_{RBG}$)+1 bits if both resource allocation type 0 and 1 are configured.
    If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
    For resource allocation type 0, the $N_{RBG}$ LSBs provide the resource allocation as defined in Clause 5.1.2.2.1 of [6, TS 38.214].
    For resource allocation type 1, the $\lceil \log_2(N_{RB}^{DL,BWP}(N_{RB}^{DL,BWP}+1)/2 \rceil$ LSBs provide the resource allocation as defined in Clause 5.1.2.2.2 of [6, TS 38.214]
  If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
  Time domain resource assignment—0, 1, 2, 3, or 4 bits as defined in Clause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.
  VRB-to-PRB mapping—0 or 1 bit:
    0 bit if only resource allocation type 0 is configured or if interleaved VRB-to-PRB mapping is not configured by high layers;
    1 bit according to Table 7.3.1.2.2-5 otherwise, only applicable to resource allocation type 1, as defined in Clause 7.3.1.6 of [4, TS 38.211].
  PRB bundling size indicator—0 bit if the higher layer parameter prb-BundlingType is not configured or is set to 'staticBundling', or 1 bit if the higher layer parameter prb-BundlingType is set to 'dynamicBundling' according to Clause 5.1.2.3 of [6, TS 38.214].
  Rate matching indicator—0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.

ZP CSI-RS trigger—0, 1, or 2 bits as defined in Clause 5.1.4.2 of [6, TS 38.214]. The bitwidth for this field is determined as $\lceil \log_2(n_{ZP}+1) \rceil$ bits, where n, is the number of aperiodic ZP CSI-RS resource sets configured by higher layer.

For transport block 1:
  Modulation and coding scheme—5 bits as defined in Clause 5.1.3.1 of [6, TS 38.214]
  New data indicator—1 bit
  Redundancy version—2 bits as defined in Table 7.3.1.1.1-2

For transport block 2 (only present if maxNrofCodeWordsScheduledByDCI equals 2):
  Modulation and coding scheme—5 bits as defined in Clause 5.1.3.1 of [6, TS 38.214]
  New data indicator—1 bit
  Redundancy version—2 bits as defined in Table 7.3.1.1.1-2
  . . .
  HARQ process number—4 bits
  Downlink assignment index
  . . .
  SCell dormancy indication—0 bit if higher layer parameter Scell-groups-for-dormancy-within-active-time is not configured; otherwise 1, 2, 3, 4 or 5 bits bitmap determined according to higher layer parameter Scell-groups-for-dormancy-within-active-time, where each bit corresponds to one of the SCell group(s) configured by higher layers parameter Scell-groups-for-dormancy-within-active-time, with MSB to LSB of the bitmap corresponding to the first to last configured SCell group. The field is only present when this format is carried by PDCCH on the primary cell within DRX Active Time and the UE is configured with at least two DL BWPs for an SCell.

If all bits of frequency domain resource assignment are set to 0 for resource allocation type 0 or set to 1 for resource allocation type 1, this field is reserved and the following fields among the fields above are used for SCell dormancy indication, where each bit corresponds to one of the configured SCell(s), with MSB to LSB of the following fields concatenated in the order below corresponding to the SCell with lowest to highest SCell index
  Modulation and coding scheme of transport block 1
  New data indicator of transport block 1
  Redundancy version of transport block 1
  HARQ process number
  Antenna port(s)
  [-DMRS sequence initialization]

If DCI formats 1_1 are monitored in multiple search spaces associated with multiple CORESETs in a BWP for scheduling the same serving cell, zeros shall be appended until the payload size of the DCI formats 1_1 monitored in the multiple search spaces equal to the maximum payload size of the DCI format 1_1 monitored in the multiple search spaces.

7.3.1.3.7 Format 2_6
DCI format 2_6 is used for notifying the power saving information outside DRX Active Time for one or more UEs. The following information is transmitted by means of the DCI format 2_6 with CRC scrambled by PS-RNTI:

block number 1, block number 2, . . . , block number N where the starting position of a block is determined by the parameter PSPositionDCI2-6 provided by higher layers for the UE configured with the block.

If the UE is configured with higher layer parameter PS-RNTI and dci-Format2-6, one block is configured for the UE by higher layers, with the following fields defined for the block:
  Wake-up indication—1 bit
  SCell dormancy indication—0 bit if higher layer parameter Scell-groups-for-dormancy-outside-active-time is not configured; otherwise 1, 2, 3, 4 or 5 bits bitmap determined according to higher layer parameter Scell-groups-for-dormancy-outside-active-time, where each bit corresponds to one of the SCell group(s) configured by higher layers parameter Scell-groups-for-dormancy-outside-active-time, with MSB to LSB of the bitmap corresponding to the first to last configured SCell group.

The size of DCI format 2_6 is indicated by the higher layer parameter SizeDCI_2-6, according to Clause 10.3 of [5, TS 38.213].

3GPP TS 38.213 V16.1.0 specifies and/or discusses Bandwidth Part (BWP) and Physical Downlink Control Channel (PDCCH) related to power saving. Parts of 3GPP TS 38.213 V16.1.0 are quoted below:

10.3 PDCCH Monitoring Indication and Dormancy/Non-Dormancy Behaviour for SCells

A UE configured with DRX mode operation [11, TS 38.321] on the PCell or on the SpCell [12, TS 38.331]
  a PS-RNTI for DCI format 2_6 by ps-RNTI
  a number of search space sets, by dci-Format2-6, to monitor PDCCH for detection of DCI format 2_6 on the active DL BWP of the PCell or of the SpCell according to a common search space as described in Clause 10.1
  a payload size for DCI format 2_6 by SizeDCI_2-6
  a location in DCI format 2_6 of a Wake-up indication bit by PSPositionDCI2-6, where
    the UE may not start the drx-onDurationTimer for the next long DRX cycle when a value of the Wake-up indication bit is '0', and
    the UE starts the drx-onDurationTimer for the next long DRX cycle when a value of the Wake-up indication bit is '1'
  a bitmap, when the UE is provided a number of groups of configured SCells by Scell-groups-for-dormancy-outside-active-time, where
    the bitmap location is immediately after the Wake-up indication bit location
    the bitmap size is equal to the number of groups of configured SCells where each bit of the bitmap corresponds to a group of configured SCells from the number of groups of configured SCells
    a '0' value for a bit of the bitmap indicates an active DL BWP, provided by dormant-BWP, for the UE [11, TS38.321] for each activated SCell in the corresponding group of configured SCells
    a '1' value for a bit of the bitmap indicates
      an active DL BWP, provided by first-non-dormant-BWP-ID-for-DCI-outside-active-time, for the UE for each activated SCell in the corresponding group of configured SCells, if a current active DL BWP is the dormant DL BWP
      a current active DL BWP, for the UE for each activated SCell in the corresponding group of configured SCells, if the current active DL BWP is not the dormant DL BWP an offset by ps-Offset indicating a time, where the UE starts monitoring PDCCH for detection of DCI format 2_6 according to the number of search space sets, prior to a slot where the drx-onDuarationTimer would start on the PCell or on the SpCell [11, TS 38.321]
    for each search space set, the PDCCH monitoring occasions are the ones in the first TS slots indicated by duration, or $T_S=1$ slot if duration is not provided, starting from the first slot of the first $T_S$ slots and ending prior to the start of drx-onDurationTimer.

The UE does not monitor PDCCH for detecting DCI format 2_6 during Active Time [11, TS 38.321].

If a UE reports for an active DL BWP a requirement of X slots prior to the beginning of a slot where the UE would start the drx-onDurationTimer, the UE is not required to monitor PDCCH for detection of DCI format 2_6 during the X slots, where X corresponds to the requirement of the SCS of the active DL BWP.

If a UE is provided search space sets to monitor PDCCH for detection of DCI format 2_6 in the active DL BWP of the PCell or of the SpCell and the UE does not detect DCI format 2_6
    if the UE is provided ps-WakeupOrNot, the UE is indicated by ps-WakeupOrNot whether the UE may not start or whether the UE shall start the drx-onDuration-Timer for the next DRX cycle
    if the UE is not provided ps-WakeupOrNot, the UE may not start Active Time indicated by drx-onDuration-Timer for the next DRX cycle If a UE is provided search space sets to monitor PDCCH for detection of DCI format 2_6 in the active DL BWP of the PCell or of the SpCell and the UE
    is not required to monitor PDCCH for detection of DCI format 2_6, as described in Clauses 10, 11.1, 12, and in Clause 5.7 of [14, TS 38.321] for all corresponding PDCCH monitoring occasions outside Active Time prior to a next DRX cycle, or
    does not have any PDCCH monitoring occasions for detection of DCI format 2_6 outside Active Time of a next DRX cycle
the UE shall start the drx-onDurationTimer for the next DRX cycle.

If a UE is provided search space sets to monitor PDCCH for detection of DCI format 0_1 and DCI format 1_1 and if one or both of DCI format 0_1 and DCI format 1_1 include a SCell dormancy indication field,
    the SCell dormancy indication field is a bitmap with size equal to a number of groups of configured SCells, provided by Scell-groups-for-dormancy-within-active-time,
    each bit of the bitmap corresponds to a group of configured SCells from the number of groups of configured Scells
    if the UE detects a DCI format 0_1 or a DCI format 1_1 that does not include a carrier indicator field, or detects a DCI format 0_1 or DCI format 1_1 that includes a carrier indicator field with value equal to 0
    a '0' value for a bit of the bitmap indicates an active DL BWP, provided by dormant-BWP, for the UE for each activated SCell in the corresponding group of configured SCells
    a '1' value for a bit of the bitmap indicates
        an active DL BWP, provided by first-non-dormant-BWP-ID-for-DCI-inside-active, for the UE for each activated SCell in the corresponding group of configured SCells, if a current active DL BWP is the dormant DL BWP
        a current active DL BWP, for the UE for each activated SCell in the corresponding group of configured SCells, if the current active DL BWP is not the dormant DL BWP
    the UE sets the active DL BWP to the indicated active DL BWP If a UE is provided search space sets to monitor PDCCH for detection of DCI format 1_1, and if
    the CRC of DCI format 1_1 is scrambled by a C-RNTI or a MCS-C-RNTI, and if
    resourceAllocation=resourceAllocationType0 and all bits of the frequency domain resource assignment field in DCI format 1_1 are equal to 0, or
    resourceAllocation=resourceAllocationType1 and all bits of the frequency domain resource assignment field in DCI format 1_1 are equal to 1
    resourceAllocation=dynamicSwitch and all bits of the frequency domain resource assignment field in DCI format 1_1 are equal to 0 or 1
the UE considers the DCI format 1_1 as indicating SCell dormancy, not scheduling a PDSCH reception or indicating a SPS PDSCH release, and for transport block 1 interprets the sequence of fields of
    modulation and coding scheme
    new data indicator
    redundancy version
and of
    HARQ process number
    antenna port(s)
    DMRS sequence initialization
as providing a bitmap to each configured SCell, in an ascending order of the SCell index, where
    a '0' value for a bit of the bitmap indicates an active DL BWP, provided by dormant-BWP, for the UE for a corresponding activated SCell
    a '1' value for a bit of the bitmap indicates
        an active DL BWP, provided by first-non-dormant-BWP-ID-for-DCI-inside-active-time, for the UE for a corresponding activated SCell, if a current active DL BWP is the dormant DL BWP
        a current active DL BWP, for the UE for a corresponding activated SCell, if the current active DL BWP is not the dormant DL BWP
    the UE sets the active DL BWP to the indicated active DL BWP If an active DL BWP provided by dormant-BWP for a UE on an activated SCell is not a default DL BWP for the UE on the activated SCell, as described in Clause 12, the BWP inactivity timer is not used for transitioning from the active DL BWP provided by dormant-BWP to the default DL BWP on the activated SCell.

A UE is expected to provide HARQ-ACK information in response to a detection of a DCI format 1_1 indicating SCell dormancy after N symbols from the last symbol of a PDCCH providing the DCI format 1_1. If processingType2Enabled of PDSCH-ServingCellConfig is set to enable for the serving cell with the PDCCH providing the DCI format 1_1, N=5 for $\mu=0$, N=5.5 for $\mu=1$, and N=11 for $\mu=2$; otherwise, N=10 for $\mu=0$, N=12 for $\mu=1$, N=22 for $\mu=2$, and N=25 for $\mu=3$, where y is the smallest SCS configuration between the SCS configuration of the PDCCH providing the DCI format 1_1 and the SCS configuration of a PUCCH with the HARQ-ACK information in response to the detection of the DCI format 1_1.

12 Bandwidth Part Operation
. . .
A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter BWP-Downlink or by parameter initialDownlinkBWP with a set of parameters configured by BWP-DownlinkCommon and BWP-DownlinkDedicated, and a set of at most four BWPs for transmissions by the UE (UL BWP set) in an UL bandwidth by parameter BWP-Uplink or by parameter initialUplinkBWP with a set of parameters configured by BWP-UplinkCommon and BWP-UplinkDedicated.

If a UE is not provided initialDownlinkBWP, an initial DL BWP is defined by a location and number of contiguous PRBs, starting from a PRB with the lowest index and ending at a PRB with the highest index among PRBs of a CORESET for Type0-PDCCH CSS set, and a SCS and a cyclic prefix for PDCCH reception in the CORESET for Type0-PDCCH CSS set; otherwise, the initial DL BWP is provided by initialDownlinkBWP. For operation on the primary cell or on a secondary cell, a UE is provided an initial UL BWP by initialUplinkBWP. If the UE is configured with a supplementary UL carrier, the UE can be provided an initial UL BWP on the supplementary UL carrier by initialUplinkBWP. If a UE has dedicated BWP configuration, the UE can be provided by firstActiveDownlinkBWP-Id a first active DL BWP for receptions and by firstActiveUplinkBWP-Id a first active UL BWP for transmissions on a carrier of the primary cell.

For each DL BWP or UL BWP in a set of DL BWPs or UL BWPs, respectively, the UE is provided the following parameters for the serving cell as defined in [4, TS 38.211] or [6, TS 38.214]:

a SCS by subcarrierSpacing a cyclic prefix by cyclicPrefix a common RB $N_{BWP}^{start} = O_{carrier} + RB_{start}$ and a number of contiguous RBs $N_{BWP}^{size} = L_{RB}$ provided by locationAndBandwidth that indicates an offset $RB_{start}$ and a length $L_{RB}$ as RIV according to [6, TS 38.214], setting $N_{BWP}^{size} = 275$, and a value $O_{carrier}$ provided by offsetToCarrier for the subcarrierSpacing an index in the set of DL BWPs or UL BWPs by respective BWP-Id a set of BWP-common and a set of BWP-dedicated parameters by BWP-DownlinkCommon and BWP-DownlinkDedicated for the DL BWP, or BWP-UplinkCommon and BWP-UplinkDedicated for the UL BWP [12, TS 38.331]

For unpaired spectrum operation, a DL BWP from the set of configured DL BWPs with index provided by BWP-Id is linked with an UL BWP from the set of configured UL BWPs with index provided by BWP-Id when the DL BWP index and the UL BWP index are same. For unpaired spectrum operation, a UE does not expect to receive a configuration where the center frequency for a DL BWP is different than the center frequency for an UL BWP when the BWP-Id of the DL BWP is same as the BWP-Id of the UL BWP.

For each DL BWP in a set of DL BWPs of the PCell, or of the PUCCH-SCell, a UE can be configured CORESETs for every type of CSS sets and for USS as described in Clause 10.1. The UE does not expect to be configured without a CSS set on the PCell, or on the PUCCH-SCell, of the MCG in the active DL BWP.

If a UE is provided controlResourceSetZero and searchSpaceZero in PDCCH-ConfigSIB1 or PDCCH-ConfigCommon, the UE determines a CORESET for a search space set from controlResourcesetZero as described in Clause 13 and for Tables 13-1 through 13-10, and determines corresponding PDCCH monitoring occasions as described in Clause 13 and for Tables 13-11 through 13-15. If the active DL BWP is not the initial DL BWP, the UE determines PDCCH monitoring occasions for the search space set only if the CORESET bandwidth is within the active DL BWP and the active DL BWP has same SCS configuration and same cyclic prefix as the initial DL BWP. For each UL BWP in a set of UL BWPs of the PCell or of the PUCCH-SCell, the UE is configured resource sets for PUCCH transmissions as described in Clause 9.2.1.

A UE receives PDCCH and PDSCH in a DL BWP according to a configured SCS and CP length for the DL BWP. A UE transmits PUCCH and PUSCH in an UL BWP according to a configured SCS and CP length for the UL BWP.

If a bandwidth part indicator field is configured in DCI format 1_1, the bandwidth part indicator field value indicates the active DL BWP, from the configured DL BWP set, for DL receptions as described in [5, TS 38.212]. If a bandwidth part indicator field is configured in DCI format 0_1, the bandwidth part indicator field value indicates the active UL BWP, from the configured UL BWP set, for UL transmissions as described in [5, TS 38.212] . . .

set the active UL BWP or DL BWP to the UL BWP or DL BWP indicated by the bandwidth part indicator in the DCI format 0_1 or DCI format 1_1, respectively

. . .

A UE expects to detect a DCI format 0_1 indicating active UL BWP change, or a DCI format 11 indicating active DL BWP change, only if a corresponding PDCCH is received within the first 3 symbols of a slot.

For a serving cell, a UE can be provided by defaultDownlinkBWP-Id a default DL BWP among the configured DL BWPs. If a UE is not provided a default DL BWP by defaultDownlinkBWP-Id, the default DL BWP is the initial DL BWP.

If a UE is provided by bwp-InactivityTimer a timer value for the serving cell [11, TS 38.321] and the timer is running, the UE decrements the timer at the end of a subframe for FR1 or at the end of a half subframe for FR2 if the restarting conditions in [11, TS 38.321] are not met during the interval of the subframe for FR1 or of the half subframe for FR2.

. . .

If a UE is provided by firstActiveDownlinkBWP-Id a first active DL BWP and by firstActiveUplinkBWP-Id a first active UL BWP on a carrier of a secondary cell, the UE uses the indicated DL BWP and the indicated UL BWP as the respective first active DL BWP on the secondary cell and first active UL BWP on the carrier of the secondary cell.

A UE does not expect to monitor PDCCH when the UE performs RRM measurements [10, TS 38.133] over a bandwidth that is not within the active DL BWP for the UE.

Draft 3GPP TS 38.321 v16.0.0 specifies and/or discusses Medium Access Control (MAC) protocol specification in NR. Parts of Draft 3GPP TS 38.321 v16.0.0 are quoted below:

Dormant BWP: The dormant BWP is one of downlink BWPs configured by the network via dedicated RRC signaling. In the dormant BWP, the UE stop monitoring PDCCH on/for the SCell, but continues performing CSI measurements, Automatic Gain Control (AGC) and beam management, if configured.

5.9 Activation/Deactivation of SCells

If the MAC entity is configured with one or more SCells, the network may activate and deactivate the configured SCells. Upon configuration of an SCell, the SCell is deactivated unless the parameter sCellState is set to activated for the SCell within RRCReconfiguration message.

The configured SCell(s) is activated and deactivated by:
  receiving the SCell Activation/Deactivation MAC CE described in clause 6.1.3.10;
  configuring sCellDeactivationTimer timer per configured SCell (except the SCell configured with PUCCH, if any): the associated SCell is deactivated upon its expiry.

The MAC entity shall for each configured SCell:
  1> if an SCell is configured with sCellState is set to activated upon SCell configuration, or an SCell Activation/Deactivation MAC CE is received activating the SCell:
    2> if firstActiveDownlinkBWP-Id is not set to dormant BWP:
      3> activate the SCell according to the timing defined in TS 38.213 [6]; i.e. apply normal SCell operation including:
        4> SRS transmissions on the SCell;
        4> CSI reporting for the SCell;
        4> PDCCH monitoring on the SCell;
        4> PDCCH monitoring for the SCell;
        4> PUCCH transmissions on the SCell, if configured.
      3> if the SCell was deactivated prior to receiving this SCell Activation/Deactivation MAC CE:
        4> activate the DL BWP and UL BWP indicated by firstActiveDownlinkBWP-Id and firstActiveUplinkBWP-Id respectively;
      3> start or restart the sCellDeactivationTimer associated with the SCell according to the timing defined in TS 38.213 [6];
      3> (re-)initialize any suspended configured uplink grants of configured grant Type 1 associated with this SCell according to the stored configuration, if any, and to start in the symbol according to rules in clause 5.8.2;
      3> trigger PHR according to clause 5.4.6.
    2> else if firstActiveDownlinkBWP-Id is set to dormant BWP:
      3> stop the bwp-InactivityTimer of this Serving Cell, if running.
      3> not monitor the PDCCH on the BWP;
      3> not monitor the PDCCH for the BWP;
      3> not receive DL-SCH on the BWP;
      3> perform CSI measurement for the BWP, if configured;
      3> stop all the UL behavior, i.e. stop any UL transmission, suspend any configured uplink grant Type 1 associated with the SCell, clear any configured uplink grant of configured grant Type 2 associated with the SCell;
      3> if configured, perform beam failure detection and beam failure recovery for the SCell if beam failure is detected;
      3> if the SCell was deactivated prior to receiving this SCell Activation/Deactivation MAC CE:
        4> activate the DL BWP and UL BWP indicated by firstActiveDownlinkBWP-Id and firstActiveUplinkBWP-Id respectively;
      3> else if an SCell is configured with sCellState is set to activated upon SCell configuration:
        4> activate the DL BWP and UL BWP indicated by firstActiveDownlinkBWP-Id and firstActiveUplinkBWP-Id respectively;
      3> start or restart the sCellDeactivationTimer associated with the SCell according to the timing defined in TS 38.213 [6].
  1> else if an SCell Activation/Deactivation MAC CE is received deactivating the SCell; or
  1> if the sCellDeactivationTimer associated with the activated SCell expires:
    2> deactivate the SCell according to the timing defined in TS 38.213 [6];
    2> stop the sCellDeactivationTimer associated with the SCell;
    2> stop the bwp-InactivityTimer associated with the SCell;
    2> deactivate any active BWP associated with the SCell;
    2> clear any configured downlink assignment and any configured uplink grant Type 2 associated with the SCell respectively;
    2> clear any PUSCH resource for semi-persistent CSI reporting associated with the SCell;
    2> suspend any configured uplink grant Type 1 associated with the SCell;
    2> cancel all the triggered BFRs (see clause 5.17) for this Serving Cell;
    2> flush all HARQ buffers associated with the SCell;
    2> cancel, if any, triggered consistent LBT failure for the SCell.
  1> if PDCCH on the activated SCell indicates an uplink grant or downlink assignment; or
  1> if PDCCH on the Serving Cell scheduling the activated SCell indicates an uplink grant or a downlink assignment for the activated SCell; or
  1> if a MAC PDU is transmitted in a configured uplink grant or received in a configured downlink assignment:
    2> restart the sCellDeactivationTimer associated with the SCell.
  1> if the SCell is deactivated:
    2> not transmit SRS on the SCell;
    2> not report CSI for the SCell;
    2> not transmit on UL-SCH on the SCell;
    2> not transmit on RACH on the SCell;
    2> not monitor the PDCCH on the SCell;
    2> not monitor the PDCCH for the SCell;
    2> not transmit PUCCH on the SCell.

HARQ feedback for the MAC PDU containing SCell Activation/Deactivation MAC CE shall not be impacted by PCell, PSCell and PUCCH SCell interruptions due to SCell activation/deactivation in TS 38.133 [11].

When SCell is deactivated, the ongoing Random Access procedure on the SCell, if any, is aborted.

5.15.1 Downlink and Uplink

In addition to clause 12 of TS 38.213 [6], this clause specifies requirements on BWP operation. A Serving Cell may be configured with one or multiple BWPs, and the maximum number of BWP per Serving Cell is specified in TS 38.213 [6].

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random Access procedure or upon detection of consistent LBT failure on SpCell. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively (as specified in TS 38.331 [5]) is active without receiving PDCCH indicating a downlink assignment or an uplink grant. The active BWP for a Serving Cell is indicated by either RRC or PDCCH (as specified in TS 38.213 [6]). For unpaired spectrum, a DL BWP is paired with a UL BWP, and BWP switching is common for both UL and DL.

Entering or leaving dormant BWP is done by BWP switching. It is controlled per SCell or per dormancy SCell group by the PDCCH (as specified in TS 38.212 [9]). The dormancy SCell group configuration indicated by dormancySCellGroups and dormant BWP configuration for one SCell indicated by dormantDownlinkBWP-Id are configured by RRC signalling as described in TS 38.331 [5]. Upon reception of the PDCCH indicating leaving dormant BWP from SpCell outside active time, the DL BWP indicated by firstOutsideActiveTimeBWP-Id (as specified in TS 38.331 [5]) is activated. Upon reception of the PDCCH indicating leaving dormant BWP from SpCell within active time, the DL BWP indicated by firstWithinActiveTimeBWP-Id (as specified in TS 38.331 [5]) is activated. Upon reception of the PDCCH indicating entering dormant BWP, the DL BWP indicated by dormantDownlinkBWP-Id (as specified in TS 38.331 [5]) is activated. The dormant BWP configuration for SpCell or PUCCH SCell is not supported.

For each activated Serving Cell configured with a BWP, the MAC entity shall:

1> if a BWP is activated and it is not the dormant BWP:
2> transmit on UL-SCH on the BWP;
2> transmit on RACH on the BWP, if PRACH occasions are configured;
2> monitor the PDCCH on the BWP;
2> transmit PUCCH on the BWP, if configured;
2> report CSI for the BWP;
2> transmit SRS on the BWP, if configured;
2> receive DL-SCH on the BWP;
2> (re-)initialize any suspended configured uplink grants of configured grant Type 1 on the active BWP according to the stored configuration, if any, and to start in the symbol according to rules in clause 5.8.2;
2> if consistent LBT failure recovery is configured:
3> stop the lbt-FailureDetectionTimer, if running;
3> set LBT_COUNTER to 0;
3> monitor LBT failure indications from lower layers as specified in clause 5.21.2.
1> if a BWP is activated and it is dormant BWP for an SCell:
2> stop the bwp-InactivityTimer of this Serving Cell, if running.
2> not monitor the PDCCH on the BWP;
2> not monitor the PDCCH for the BWP;
2> not receive DL-SCH on the BWP;
2> perform CSI measurement for the BWP, if configured;
2> stop all the UL behavior, i.e. stop any UL transmission, suspend any configured uplink grant Type 1 associated with the SCell, clear any configured uplink grant of configured grant Type 2 associated with the SCell;
2> if configured, perform beam failure detection and beam failure recovery for the SCell if beam failure is detected.
1> if a BWP is deactivated:
2> not transmit on UL-SCH on the BWP;
2> not transmit on RACH on the BWP;
2> not monitor the PDCCH on the BWP;
2> not transmit PUCCH on the BWP;
2> not report CSI for the BWP;
2> not transmit SRS on the BWP;
2> not receive DL-SCH on the BWP;
2> clear any configured downlink assignment and configured uplink grant of configured grant Type 2 on the BWP;
2> suspend any configured uplink grant of configured grant Type 1 on the inactive BWP.

Upon initiation of the Random Access procedure on a Serving Cell, after the selection of carrier for performing Random Access procedure as specified in clause 5.1.1, the MAC entity shall for the selected carrier of this Serving Cell:

1> if PRACH occasions are not configured for the active UL BWP:
2> switch the active UL BWP to BWP indicated by initialUplinkBWP;
2> if the Serving Cell is an SpCell:
3> switch the active DL BWP to BWP indicated by initialDownlinkBWP. 1> else:
2> if the Serving Cell is an SpCell:
3> if the active DL BWP does not have the same bwp-Id as the active UL BWP:
4> switch the active DL BWP to the DL BWP with the same bwp-Id as the active UL BWP.
1> stop the bwp-InactivityTimer associated with the active DL BWP of this Serving Cell, if running.
1> if the Serving Cell is SCell:
2> stop the bwp-InactivityTimer associated with the active DL BWP of SpCell, if running.
1> perform the Random Access procedure on the active DL BWP of SpCell and active UL BWP of this Serving Cell.

If the MAC entity receives a PDCCH for BWP switching of a Serving Cell, the MAC entity shall:

1> if there is no ongoing Random Access procedure associated with this Serving Cell; or
1> if the ongoing Random Access procedure associated with this Serving Cell is successfully completed upon reception of this PDCCH addressed to C-RNTI (as specified in clauses 5.1.4, 5.1.4a, and 5.1.5):
2> cancel, if any, triggered consistent LBT failure for this Serving Cell;
2> perform BWP switching to a BWP indicated by the PDCCH.

If the MAC entity receives a PDCCH for BWP switching for a Serving Cell(s) or a dormancy SCell group(s) while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion (as specified in clauses 5.1.4, 5.1.4a, and 5.1.5) in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the Serving Cell.

Upon reception of RRC (re-)configuration for BWP switching for a Serving Cell while a Random Access procedure associated with that Serving Cell is ongoing in the MAC entity, the MAC entity shall stop the ongoing Random Access procedure and initiate a Random Access procedure after performing the BWP switching.

Upon reception of RRC (re-)configuration for BWP switching for a Serving Cell, cancel any triggered LBT failure in this Serving Cell.

The MAC entity shall for each activated Serving Cell configured with bwp-InactivityTimer:

1> if the defaultDownlinkBWP-Id is configured, and the active DL BWP is not the BWP indicated by the defaultDownlinkBWP-Id, and the active DL BWP is not the BWP indicated by the dormantDownlinkBWP-Id if configured; or 1> if the defaultDownlinkBWP-Id is not configured, and the active DL BWP is not the initialDownlinkBWP, and the active DL BWP is not the BWP indicated by the dormantDownlinkBWP-Id if configured:

2> if a PDCCH addressed to C-RNTI or CS-RNTI indicating downlink assignment or uplink grant is received on the active BWP; or 2> if a PDCCH addressed to C-RNTI or CS-RNTI indicating downlink assignment or uplink grant is received for the active BWP; or 2> if a MAC PDU is transmitted in a configured uplink grant or received in a configured downlink assignment:

3> if there is no ongoing Random Access procedure associated with this Serving Cell; or 3> if the ongoing Random Access procedure associated with this Serving Cell is successfully completed upon reception of this PDCCH addressed to C-RNTI (as specified in clauses 5.1.4, 5.1.4a and 5.1.5):

4> start or restart the bwp-InactivityTimer associated with the active DL BWP.

2> if the bwp-InactivityTimer associated with the active DL BWP expires:

3> if the defaultDownlinkBWP-Id is configured:

4> perform BWP switching to a BWP indicated by the defaultDownlinkBWP-Id.

3> else:

4> perform BWP switching to the initialDownlinkBWP.

NOTE: If a Random Access procedure is initiated on an SCell, both this SCell and the SpCell are associated with this Random Access procedure.

1> if a PDCCH for BWP switching is received, and the MAC entity switches the active DL BWP:

2> if the defaultDownlinkBWP-Id is configured, and the MAC entity switches to the DL BWP which is not indicated by the defaultDownlinkBWP-Id and is not indicated by the dormantDownlinkBWP-Id if configured; or 2> if the defaultDownlinkBWP-Id is not configured, and the MAC entity switches to the DL BWP which is not the initialDownlinkBWP and is not indicated by the dormantDownlinkBWP-Id if configured:

3> start or restart the bwp-InactivityTimer associated with the active DL BWP.

5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

RRC controls DRX operation by configuring the following parameters:

drx-onDurationTimer: the duration at the beginning of a DRX Cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX Cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity;

ps-Wakeup (optional): the configuration to start associated drx-onDurationTimer in case DCP is monitored but not detected;

ps-Periodic_CSI_Transmit (optional): the configuration to report periodic CSI during the time duration indicated by drx-onDurationTimer in case DCP is configured but associated drx-onDurationTimer is not started;

ps-TransmitPeriodicL1-RSRP (optional): the configuration to transmit periodic L1-RSRP report(s) during the time duration indicated by drx-onDurationTimer in case DCP is configured but associated drx-onDurationTimer is not started.

When a DRX cycle is configured, the Active Time includes the time while:

drx-onDurationTimer or drx-InactivityTimer or drx-RetransmissionTimerDL or drx-RetransmissionTimerUL or ra-ContentionResolutionTimer (as described in clause 5.1.5) is running; or a Scheduling Request is sent on PUCCH and is pending (as described in clause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

In RAN1 #98 meeting, RAN1 has some agreements about NR MR-DC (Multi-Radio Access Technology (RAT) Dual-Connectivity) and power saving. At least some of the agreements are quoted from R1-1909942 below:

Agreements:
  From RAN1 perspective, L1 based mechanism for transitioning between 'dormancy-like' and 'non dormancy-like' behavior on activated Scells can be supported
    'dormancy-like'=>sparse/no PDCCH monitoring on activated Scell while maintaining CSI measurements/reporting
In RAN1 #98b meeting, RAN1 has some agreements about NR MR-DC and power saving. At least some of the agreements are quoted from R1-1913275 below:
Agreements:
  When the UE is outside Active Time, for the L1 based mechanism for transitioning from 'dormancy-like' to 'non-dormancy like' behaviour on activated Scells, an explicit information field for the UE is introduced to the PDCCH WUS
    The explicit information field is configurable within a range of 0 to X1 bits
      X1<<15
  When the UE is in the Active Time, for the L1 based mechanism for transitioning between 'dormancy-like' and 'non-dormancy like' behaviour on activated Scells, an explicit information field is newly introduced to at least DCI formats 0-1 and 1-1 for the primary cell
    The explicit information field is configurable within a range of 0 to X2 bits
      X2<<15
Agreements:
  For the L1 based Scell dormancy indication sent on primary cell within active time
    UE is configured with at least two BWPs for an Scell
      The explicit information field in DCI indicates switching to/from dormant BWP configured for the Scell
      FFS definition of dormant BWP
      FFS whether or not to the same BWP switching delay to the non-dormant to dormant transition delay
Agreements:
  For the L1 based Scell dormancy indication sent on primary cell outside active time in WUS PDCCH
    The explicit information field in DCI is a bitmap with up to X1 bits and 1 bit per group of configured Scells
    Each Scell group can have one/multiple Scells and up to X1 Scell groups are configured via RRC.
      The Scell group configuration is independent from the Scell group configuration for dormancy indication within active time (if supported)
    X1=[5]
      Note: X1 is upper bound.
    Note: Number of bits used for explicit information field in WUS PDCCH is based on configuration
Working assumption
  For the L1 based Scell dormancy indication sent on primary cell within active time
    Support the following two cases for the PDCCH with dormancy indication
      Case 1: The PDCCH schedules data for primary cell and also indicates dormancy for Scell(s)
        X2=5 (Note: X2 is upper bound)
        Discuss detailed design of explicit information field in DCI and associated RRC signaling in RAN1 #99
      Case 2: The PDCCH indicates dormancy for Scell(s) without scheduling data
        Discuss detailed design of explicit information field in DCI in RAN1 #99
      UE is indicated whether the PDCCH with dormancy indication is according to Case 1 or Case 2
        FFS details: e.g. a dedicated bit for the differentiation, a reserved combination of DCI fields etc.
        Note: no new RRC signaling introduced specifically for this indication
In RAN1 #99 meeting, RAN1 has some agreements about NR MR-DC and power saving. At least some of the agreements are quoted from Draft Report of 3GPP TSG RAN WG1 #99 v0.1.0 below:
Agreements:
  At least for the case when PDCCH schedules data for primary cell and also indicates dormancy for Scell(s) (i.e., Case 1),
    N (0≤N≤X2) Scell groups are configured for the UE where each Scell group can have one or multiple Scells
      Note: The Scell group configuration is independent from the agreed Scell group configuration for dormancy indication outside active time
      Note: X2=5 per RAN1 #98bis working assumption.
    The explicit information field for SCell dormancy indication is a bitmap of length N with each bit corresponding to one Scell group.
    The bitmap is appended to existing fields of DCI format 0-1,1-1 (i.e., size of DCI format 0-1, 1-1 is increased by N (0≤N≤X2) bits).
Agreements:
Fall back DCI formats (0_0 & 1_0) are not used for dormancy indication
Agreements:
  When PDCCH with DCI formats 1-1 is used for indicating dormancy for SCells,
    UE expects that the PDCCH is not used for PDSCH scheduling
      If FDRA field in PDCCH DCI format 1-1 is set to all 1s (when type 1 RA is used for UE) or
      If FDRA field in PDCCH DCI format 1-1 is set to all 0s (when only type 0 RA is used for UE)
Agreements:
  For SCell dormancy indication outside active time, confirm X1=5
Agreements:
  For the case when PDCCH with DCI format 1-1 is used for indicating dormancy for SCells, and when UE is indicated that the PDCCH is not used for PDSCH scheduling (i.e., Case 2)
    The explicit information field for SCell dormancy indication is a bitmap of length N1 where N1 is the number of configured Scells for the UE, and each bit in the bitmap corresponds to one configured SCell
    The following fields are re-purposed in the PDCCH for dormancy indication—MCS (5), NDI (1), RV(2), HARQ process number(4), Antenna port(s) (at least 4), DMRS sequence initialization
    Other fields are not re-purposed
      FFS whether or not CIF, if present, can indicate a Scell or not
    Note: the DCI format size is same as that of Case 1 (i.e., if RRC configures N (0≤N≤X2) SCell groups, N bits are added to the DCI)
Agreements:
  When UE is outside Active Time, for the L1 based mechanism for transitioning between 'dormancy-like' and 'non-dormancy like' behaviour, the same BWP framework as inside active time is used Agreements:
　At least for case of dormancy indication within active time
　　If '0' is indicated by DCI field
　　　If 'UE is in non-dormant BWP, UE switches to dormant BWP
　　　If 'UE is in dormant BWP, UE continues with dormant BWP
　　If '1' is indicated by DCI field
　　　If 'UE is in non-dormant BWP, UE continues with the same non-dormant BWP
　　　If UE is in dormant BWP, switch to a specific non-dormant BWP explicitly configured by RRC
Agreements
For dormancy indication outside active time, for interpreting '0', '1' in the SCell dormancy indication field,
　reuse same approach as that of inside active time
Agreements:
　DCI format 0-1 is not used for Case 2 dormancy indication
Agreements:
　For Type 2 codebook, ACK is transmitted by the UE in response to detection of Case 2 PDCCH with SCell dormancy indication
　For type 1 codebook, no HARQ response is supported in response to detection of Case 2 PDCCH with SCell dormancy indication
Agreements:
　If the default BWP is not the dormant BWP, BWP inactivity timer is not used for transitioning from dormant BWP to another BWP In RAN1 #100-e meeting, RAN1 has some agreements about NR MR-DC and power saving. At least some of the agreements are quoted from Draft Report of 3GPP TSG RAN WG1 #100-e v0.2.0 below:

Agreements:
　When UE is configured with CIF, 'DCI format 0-1/1-1 on primary cell with CIF≠0' is not used for Case 1 Scell dormancy indication.
　Case 2 dormancy indication using DCI format 1-1 is not supported for the case when DCI CRC is scrambled by CS-RNTI In 3GPP TS 38.331 V16.0.0, some information elements are provided. For cross-carrier scheduling and/or cross-cell scheduling, the network may enable or configure cif-Presence for a configuration of a scheduling cell (e.g., a primary cell (PCell), a primary secondary cell (PSCell) and/or a secondary cell (SCell)) and provide a scheduling cell ID and an associated carrier indicator field (CIF) value (in downlink control information (DCI), for example) for configuration of a scheduled cell (e.g., a SCell). Parts of 3GPP TS 38.331 V16.0.0, comprising at least some of the information elements, are quoted below:

CellGroupConfig

The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

| CellGroupConfig information element |
|---|

```
-- ASN1START
-- TAG-CELLGROUPCONFIG-START
-- Configuration of one Cell-Group:
CellGroupConfig ::=                                              SEQUENCE {
    cellGroupId                                                      CellGroupId,
    ...
    mac-CellGroupConfig                                              MAC-CellGroupConfig
OPTIONAL,   -- Need M
    physicalCellGroupConfig                                          PhysicalCellGroupConfig
OPTIONAL,   -- Need M
    spCellConfig                                                     SpCellConfig
OPTIONAL,   -- Need M
    sCellToAddModList                                                SEQUENCE (SIZE
(1..maxNrofSCells)) OF SCellConfig                                                 OPTIONAL,   --
Need N
    sCellToReleaseList                                               SEQUENCE (SIZE
(1..maxNrofSCells)) OF SCellIndex                                                  OPTIONAL,   --
Need N
    ...,
    ...
}
DormancySCellGroups::=                                           SEQUENCE {
    withinActiveTimeToAddModList                                     SEQUENCE (SIZE
(1..maxNrofDormancyGroups)) OF DormancyGroup-r16                                   OPTIONAL,   --
Need N
    withinActiveTimeToReleaseList                                    SEQUENCE (SIZE
(1..maxNrofDormancyGroups)) OF DormancyGroupID-r16                                 OPTIONAL,   --
Need N
    outsideActiveTimeToAddModList                                    SEQUENCE (SIZE
(1..maxNrofDormancyGroups)) OF DormancyGroup-r16                                   OPTIONAL,   --
Cond DormancyWUS
    outsideActiveTimeToReleaseList                                   SEQUENCE (SIZE
(1..maxNrofDormancyGroups)) OF DormancyGroupID-r16                                 OPTIONAL    --
Need N
}
-- Serving cell specific MAC and PHY parameters for a SpCell:
SpCellConfig ::=                                                 SEQUENCE {
    servCellIndex                                                    ServCellIndex
```

| CellGroupConfig information element |
| --- |
| OPTIONAL, -- Cond SCG |
| ... |
|     spCellConfigDedicated                           ServingCellConfig<br>OPTIONAL, -- Need M |
| ... |
| } |
| ... |
| SCellConfig ::=                                       SEQUENCE {<br>    sCellIndex                                              SCellIndex,<br>    sCellConfigCommon                                 ServingCellConfigCommon<br>OPTIONAL, -- Cond SCellAdd<br>    sCellConfigDedicated                           ServingCellConfig<br>OPTIONAL, -- Cond SCellAddMod<br>    ...,<br>    [[<br>    smtc                                                        SSB-MTC<br>OPTIONAL -- Need S<br>    ]],<br>    [[<br>    sCellState-r16                                    ENUMERATED {activated}<br>OPTIONAL -- Need SCellAddSync<br>    ]]}<br>DormancyGroup-r16 ::=                           SEQUENCE {<br>    dormancyGroupID-r16                            DormancyGroupID-r16,<br>    dormancySCellList-r16                          SEQUENCE (SIZE<br>(1..maxNrofSCells)) OF SCellIndex<br>}<br>DormancyGroupID-r16 ::=                       INTEGER (0..4)<br>-- TAG-CELLGROUPCONFIG-STOP<br>-- ASN1STOP |

| CellGroupConfig field descriptions |
| --- |
| mac-CellGroupConfig |
| MAC parameters applicable for the entire cell group.<br>sCellState |
| Indicates whether the SCell shall be considered to be in activated state upon SCell configuration.<br>sCellToAddModList |
| List of secondary serving cells (SCells) to be added or modified.<br>sCellToReleaseList |
| List of secondary serving cells (SCells) to be released.<br>spCellConfig |
| Parameters for the SpCell of this cell group (PCell of MCG or PSCell of SCG). |

| DormancyGroup field descriptions |
| --- |
| dormancySCellList |
| List of SCells within the same SCell dormancy group.<br>dormancyGroupID |
| The field indicates an SCell group corresponding to the explicit information field in DCI, i.e., bitmap with 1 bit per DormancyGroup for indicating dormancy/non-dormancy of SCells, as specified in TS 38.213. |

| DormancySCellGroups field descriptions |
| --- |
| outsideActiveTimeToAddModList |
| List of Dormancy outside active time SCell groups to be added or modified. The use of the Dormancy outside active time SCell groups is specified in TS 38.213 [13].<br>withinActiveTimeToAddModList |
| List of Dormancy within active time SCell groups SCell groups to be added or modified. The use of the Dormancy within active time SCell groups is specified in TS 38.213 [13]. |

| SCellConfig field descriptions<br>smtc |
| --- |
| The SSB periodicity/offset/duration configuration of target cell for NR SCell addition. The network sets the periodicityAndOffset to indicate the same periodicity as ssb-periodicityServingCell in sCellConfigCommon. The smtc is based on the timing of the SpCell of associated cell group. In case of inter-RAT handover to NR, the timing reference is the NR PCell. In case of intra-NR PCell change (standalone NR) or NR PSCell change (EN-DC), the timing reference is the target SpCell. If the field is absent, the UE uses the SMTC in the measObjectNR having the same SSB frequency and subcarrier spacing, as configured before the reception of the RRC message. |

| SpCellConfig field descriptions<br>servCellIndex |
| --- |
| Serving cell ID of a PSCell. The PCell of the Master Cell Group uses ID = 0. |

SCellIndex
The IE SCellIndex concerns a short identity, used to identify an SCell or PSCell. The value range is shared across the Cell Groups.

| SCellIndex information element |
| --- |
| -- ASN1START<br>-- TAG-SCELLINDEX-START<br>SCellIndex ::=  INTEGER (1..31)<br>-- TAG-SCELLINDEX-STOP<br>-- ASN1STOP |

CrossCarrierSchedulingConfig
The IE CrossCarrierSchedulingConfig is used to specify the configuration when the cross-carrier scheduling is used in a cell.

| CrossCarrierSchedulingConfig information element |
| --- |
| -- ASN1START<br>-- TAG-CrossCarrierSchedulingConfig-START<br>CrossCarrierSchedulingConfig ::=   SEQUENCE {<br>    schedulingCellInfo   CHOICE {<br>        own   SEQUENCE {<br>-- Cross carrier scheduling: scheduling cell<br>            cif-Presence   BOOLEAN<br>        },<br>        other   SEQUENCE {<br>-- Cross carrier scheduling: scheduled cell<br>            schedulingCellId   ServCellIndex,<br>            cif-InSchedulingCell   INTEGER (1..7)<br>        }<br>    },<br>    ...,<br>    [[<br>    carrierIndicatorsize   SEQUENCE {<br>        carrierIndicatorSizeForDCI-Format1-2-r16   INTEGER (0..3),<br>        carrierIndicatorSizeForDCI-Format0-2-r16   INTEGER (0..3)<br>    }   OPTIONAL  --<br>Cond CIF-PRESENCE<br>    ]]<br>}<br>-- TAG-CrossCarrierSchedulingConfig-STOP<br>-- ASN1STOP |

| CrossCarrierSchedulingConfig field descriptions |
| --- |
| carrierIndicatorSizeForDCI-Format0-2, carrierIndicatorSizeForDCI-Format1-2<br><br>Configures the number of bits for the field of carrier indicator in PDCCH DCI format 0_2/1_2. The field carrierIndicatorSizeForDCI-Format0-2 refers to DCI format 0_2 and the field carrierIndicatorSizeForDCI-Format1-2 refers to DCI format 1_2, respectively (see TS 38.212 [17], clause 7.3.1 and TS 38.213 [13], clause 10.1).<br>cif-Presence<br><br>The field is used to indicate whether carrier indicator field is present (value true) or not (value false) in PDCCH DCI formats, see TS 38.213 [13]. If cif-Presence is set to true, the CIF value indicating a grant or assignment for this cell is 0.<br>cif-InSchedulingCell<br><br>The field indicates the CIF value used in the scheduling cell to indicate a grant or assignment applicable for this cell, see TS 38.213 [13].<br>other<br><br>Parameters for cross-carrier scheduling, i.e., a serving cell is scheduled by a PDCCH on another |

| CrossCarrierSchedulingConfig field descriptions |
| --- |
| (scheduling) cell. The network configures this field only for SCells. When SCS of scheduling PDCCH is different from SCS of scheduled PDSCH, the time gap delta-values between the end of the PDCCH and start of the PDSCH is required to be not smaller than the minimal values specified in TS 38.214 [19].<br>own<br><br>Parameters for self-scheduling, i.e., a serving cell is scheduled by its own PDCCH.<br>schedulingCellId<br><br>Indicates which cell signals the downlink allocations and uplink grants, if applicable, for the concerned SCell. In case the UE is configured with DC, the scheduling cell is part of the same cell group (i.e. MCG or SCG) as the scheduled cell. |

ServCellIndex
The IE ServCellIndex concerns a short identity, used to identify a serving cell (i.e. the PCell, the PSCell or an SCell). Value 0 applies for the PCell, while the SCellIndex that has previously been assigned applies for SCells.

| ServCellIndex information element |
| --- |
| -- ASN1START<br>-- TAG-SERVCELLINDEX-START<br>ServCellIndex ::=   INTEGER (0..maxNrofServingCells-1)<br>-- TAG-SERVCELLINDEX-STOP<br>-- ASN1STOP |

Some and/or all of the following terminology and/or assumptions may be used hereafter:

BS: a network central unit and/or a network node in New Radio Access Technology (NR) which is used to control one or more transmission and reception points (TRPs) which are associated with one or more cells. Communication between BS and TRP(s) is via fronthaul. BS may be referred to as central unit (CU), eNB, gNB, and/or NodeB.

TRP: a TRP provides network coverage and directly communicates with UEs. TRP may be referred to as distributed unit (DU) and/or network node.

Cell: a cell is composed of one or more associated TRPs, i.e. coverage of the cell comprises coverage of some and/or all associated TRP(s). One cell is controlled by one BS. Cell may be referred to as TRP group (TRPG).

NR-Physical Downlink Control Channel (PDCCH): A channel carries downlink control signal which is used to control communication between a UE and a network side. A network transmits NR-PDCCH on a configured control resource set (CORESET) to the UE.

Uplink-control signal (UL-control signal): A UL-control signal may be at least one of scheduling request (SR), Channel State Information (CSI), Hybrid Automatic Repeat reQuest (HARQ)-Acknowledgement (HARQ-ACK) and/or HARQ-Negative Acknowledgement (HARQ-NACK) for downlink transmission, etc.

Slot: a scheduling unit in NR. Slot duration may be 14 OFDM symbols.

DL common signal: data channel carrying common information that targets for multiple UEs in a cell and/or some and/or all UEs in a cell. Example of DL common signal may be at least one of system information, paging, Random Access Response (RAR), etc.

For network side:
Downlink timing of TRPs in the same cell are synchronized.
Radio Resource Control (RRC) layer of network side is in BS.

For UE side:
There are at least two UE (RRC) states: connected state (also called active state) and non-connected state (also called inactive state and/or idle state). Inactive state may be an additional state and/or belong to connected state and/or non-connected state.

Power saving is an important feature for devices and/or UEs in a wireless communication system. Reducing power consumption can extend and/or save battery life of devices and/or UEs and provide for devices and/or UEs that are environmentally friendly. In a LTE system and/or a NR Rel-15 system, a UE may be configured with Discontinuous Reception (DRX). For example, the UE may perform PDCCH monitoring in active time of a DRX cycle and may not perform PDCCH monitoring outside active time of the DRX cycle. Accordingly, power consumption of the UE may be reduced by performing PDCCH monitoring based on the active time of the DRX cycle. An amount of power consumption may be based on a proportion of the DRX cycle that corresponds to the active time.

In NR Rel-16, additional power saving schemes have been introduced for reducing power consumption of UEs and/or devices. For example, one mechanism for reducing power consumption corresponds to configuring a dormant Bandwidth Part (BWP) in a secondary cell (SCell). In some examples, configuring a dormant BWP in a SCell provides for a reduction of power consumption of a UE and/or a network, such as when the UE and/or the network have less than a threshold amount of data to transmit or receive. In some examples, when a UE is in a dormant BWP in a SCell, the UE may be in power saving state. For example, the UE may not monitor PDCCH associated with (e.g., on and/or for) the SCell when the UE is in the dormant BWP.

SCell dormancy information may be indicated using Layer 1 (L1) signaling (e.g., Downlink Control Information (DCI)). For example, the L1 signaling (e.g., a DCI) may be used to indicate, to a UE, SCell dormancy information for a cell (e.g., a SCell). In some examples, the L1 signaling may comprise a DCI format 2_6, a DCI format 1_1 and/or a DCI format 0_1.

Throughout the present disclosure, one, some and/or all instances of "dormant status" as used herein may correspond to and/or be replaced by "dormancy", "dormant", "dormant indication" and/or "dormancy indication".

Throughout the present disclosure, one, some and/or all instances of "non-dormant status" as used herein may correspond to and/or be replaced by "non-dormancy", "non-dormant", "non-dormant indication" and/or "non-dormancy indication".

Throughout the present disclosure, in a scenario in which data (e.g., a DCI, a DCI format, one or more bit-fields and/or a bit-map) indicates dormancy status of a cell, the data (e.g., the DCI, the DCI format, the one or more bit-fields and/or the bit-map) may comprise and/or indicate at least one of: an indication of dormancy or non-dormancy for the cell; a dormancy indication or a non-dormancy indication for the cell; a dormant indication or a non-dormant indication for the cell; an indication of whether the cell is dormant or non-dormant; an indication of whether or not the cell switches to dormant; etc.

Throughout the present disclosure, in a scenario in which data (e.g., a DCI, a DCI format, one or more bit-fields and/or a bit-map) indicates dormancy status of a cell, the data (e.g., the DCI, the DCI format, the one or more bit-fields and/or the bit-map) may comprise and/or indicate at least one of dormancy for the cell, a dormancy indication for the cell, a dormant indication for the cell, an indication that the cell is dormant, etc.

Throughout the present disclosure, in a scenario in which data (e.g., a DCI, a DCI format, one or more bit-fields and/or a bit-map) indicates non-dormant status of a cell, the data (e.g., the DCI, the DCI format, the one or more bit-fields and/or the bit-map) may comprise and/or indicate at least one of non-dormancy for the cell, a non-dormancy indication for the cell, a non-dormant indication for the cell, an indication that the cell is non-dormant, etc.

In some examples, a DCI format 2_6 may be indicative of SCell dormancy information for a SCell and/or whether or not one or more UEs enter and/or switch to a dormant BWP of the SCell. For example, the DCI format 2_6 and/or the SCell dormancy information may be indicative of SCell dormancy status, of the SCell, for the one or more UEs. The SCell dormancy status may be indicative of dormant status (e.g., dormant SCell status and/or dormant BWP status) or non-dormant status (e.g., non-dormant SCell status and/or non-dormant BWP status). In some examples, the SCell dormancy status of the SCell being indicative of dormant status may correspond to an indication and/or instruction that the one or more UEs use a dormant BWP of the SCell, continue using a dormant BWP of the SCell, switch and/or enter into a dormant BWP of the SCell, not use a non-dormant BWP of the SCell and/or switch from an active BWP of the SCell into a dormant BWP of the SCell. Alternatively and/or additionally, the SCell dormancy status being indicative of non-dormant status may correspond to an indication and/or instruction that the one or more UEs use a non-dormant BWP of the SCell, continue using a non-dormant BWP of the SCell, switch and/or enter into a non-dormant BWP of the SCell, not use a dormant BWP of the SCell and/or switch from a dormant BWP of the SCell into a non-dormant BWP of the SCell. For example, a UE of the one or more UEs may determine, based on the DCI format 2_6, whether or not to enter and/or switch into the dormant BWP of the SCell. In some examples, in response to receiving the DCI format 2_6, the UE may enter and/or switch into the dormant BWP if the DCI format 2_6 indicates to enter and/or switch into the dormant BWP (e.g., if the SCell dormancy status of the SCell is indicative of dormant status). Alternatively and/or additionally, the DCI format 2_6 may be indicative of SCell dormancy information (e.g., SCell dormancy statuses) associated with multiple SCells. Alternatively and/or additionally, for each SCell of the multiple SCells, the DCI format 2_6 may be indicative of a SCell dormancy status associated with the SCell (and/or whether or not the one or more UEs are instructed and/or indicated to enter and/or switch into a dormant BWP of the SCell). In some examples, the DCI format 2_6 may be received outside active time (e.g., active time of a DRX cycle) of the one or more UEs. For example, the DCI format 2_6 may be used for indicating SCell dormancy information associated with one or more SCells (and/or indicating other information) to one or more UEs outside active time of the one or more UEs.

In some examples, a UE may monitor DCI format 2_6 based on a search space configuration (e.g., a search space configuration with which the UE is configured) and/or a DRX configuration (e.g., a DRX configuration with which the UE is configured). In some examples, the UE monitors DCI format 2_6 outside active time (e.g., the UE may monitor DCI format 2_6 only outside the active time of the UE and/or may not monitor DCI format 2_6 during the active time of the UE). In some examples, a DCI format 2_6 may be for (and/or indicated to and/or transmitted to) a group of UEs comprising the UE (e.g., the group of UEs may monitor and/or receive the DCI format 2_6 and/or the group of UEs may be intended recipients of the DCI format 2_6). The UE may receive the DCI format 2_6 before an active time of a DRX cycle (e.g., a DRX cycle of the UE), such as a most recent DRX cycle, a current DRX cycle and/or a next DRX cycle. The DCI format 2_6 may indicate (and/or instruct), to the UE and/or the group of UEs, one or more SCell dormancy statuses of one or more SCells that is applicable to an active time (e.g., a next active time, such as an upcoming active time of a current DRX cycle and/or an active time of a next DRX cycle following the current DRX cycle). For example, DCI format 2_6 may indicate (and/or instruct), to the UE and/or the group of UEs, whether or not to enter and/or switch into one or more dormant BWPs of one or more SCells in an active time (e.g., a next active time, such as an upcoming active time of a current DRX cycle and/or an active time of a next DRX cycle following the current DRX cycle). In some examples, a network (e.g., gNB) may provide a search space configuration for (e.g., indicative of) one or more monitoring occasions of DCI format 2_6. In some examples, at least one DCI format 2_6 (e.g., at least one DCI format 2_6 monitoring occasion and/or at least one DCI format 2_6 reception) may be associated with (and/or during) one DRX cycle. For example, the search space configuration may be indicative of one or more DCI format 2_6 monitoring occasions for each DRX cycle of multiple DRX cycles. Alternatively and/or additionally, a periodicity of DCI format 2_6 (e.g., a time period between DCI format 2_6 monitoring occasions and/or a time period between DCI format 2_6 receptions) may be configured the same as a periodicity of DRX cycles of a UE (e.g., a time period of a DRX cycle).

Within active time, there are multiple cases for indicating SCell dormancy information. In a first case (case 1) of the multiple cases, SCell dormancy information may be indicated using a DCI indicating SCell dormancy information with scheduling information (e.g., the DCI may indicate SCell dormancy information and scheduling information). In a second case (case 2) of the multiple cases, SCell dormancy information may be indicated using a DCI indicating SCell dormancy information without scheduling information (e.g., the DCI may indicate SCell dormancy information and/or may not indicate scheduling information). For example, in the second case, a DCI may indicate SCell dormancy information without scheduling PDSCH and/or without indicating Semi-Persistent Scheduling (SPS) Physical Downlink Shared Channel (PDSCH) release. In some examples, the DCI of the second case may indicate an invalid frequency resource allocation.

In some examples, in the first case, SCell dormancy information may be indicated using a DCI format comprising DCI format 0_1 and/or DCI format 1_1, wherein a field (e.g., an SCell dormancy indication field, such as an explicit SCell dormancy indication field), such as one field, in the DCI format with a bit-map (e.g., a bit-map form) indicates one or more SCell dormancy statuses associated with one or more SCell groups, such as one or more groups of SCells (e.g., the field and/or the bit-map indicates whether or not the one or more SCell groups switch to dormant BWP). The field (e.g., the SCell dormancy indication field) may comprise the bit-map. In some examples, a bit of the bit-map is associated with a SCell group (e.g., a group of one or more SCells) of the one or more SCell groups (e.g., the bit may be indicative of a SCell dormancy status of the SCell group). Alternatively and/or additionally, each bit of the bit-map may be associated with a SCell group of the one or more SCell groups (e.g., each bit of the bit-map may be indicative of a SCell dormancy status of a SCell group of the one or more SCell groups). In some examples, a SCell group of the one or more SCell groups may be configured by a parameter (e.g., a higher layer parameter such as a Scell-groups-for-dormancy-within-active-time parameter). In some examples, a bit of the bit-map having a value (e.g., 0 or 1) indicates dormant status of SCells of a SCell group associated with the bit (e.g., the bit having the value indicates dormant status of all SCells of the SCell group associated with the bit). For example, a bit of the bit-map having the value indicates and/or instructs a SCell group, associated with the bit, to enter and/or switch into a dormant BWP of each SCell in the SCell group. Alternatively and/or additionally, a bit of the bit-map having the value corresponds to an indication and/or instruction to enter and/or switch into a dormant BWP of each SCell in a SCell group associated with the bit. The field (e.g., the SCell dormancy indication field) may be included in a DCI (and/or may exist in the DCI) if the DCI (with the DCI format, such as DCI format 0_1 and/or DCI format 1_1, for example) is configured and/or transmitted in a primary cell (PCell) and/or a primary secondary cell (PSCell). Alternatively and/or additionally, the field (e.g., the explicit SCell dormancy indication field) may be included in a DCI (and/or may exist in the DCI) only if the DCI (with the DCI format, such as DCI format 0_1 and/or DCI format 1_1, for example) is configured and/or transmitted in a PCell and/or PSCell.

In some examples, in the second case, SCell dormancy information may be indicated using DCI format 1_1, wherein one or more fields in the DCI format 1_1 may be used for indicating one or more SCell dormancy indications. For example, the one or more fields may be re-purposed for SCell dormancy indication (e.g., indicating SCell dormancy information). For example, the one or more fields (e.g., one or more re-purposed fields) may be used for one or more purposes other than SCell dormancy indication (such as to indicate information other than SCell dormancy information). In some examples, the one or more fields (e.g., the one or more re-purposed fields) in the DCI format 1_1 may comprise a Modulation and Coding Scheme (MCS) field, a New Data Indicator (NDI) field, a redundancy version (rv) field of a transport block (TB) (e.g., rv of transport block 1 (TB1) field), a HARQ process number field, one or more antenna port fields, and/or a Demodulation Reference Signal (DMRS) sequence initialization field. The one or more fields (e.g., the one or more re-purposed fields) may be in bit-map form (and/or may comprise a bit-map). In some examples, a bit of the bit-map is associated with a SCell (e.g., the bit may be indicative of a SCell dormancy status of the SCell). Alternatively and/or additionally, each bit of the bit-map may be associated with a SCell (e.g., a SCell of a cell group, such as a master cell group (MCG) and/or a secondary cell group (SCG)), wherein an association of a bit of the bit-map with an associated SCell associated with the bit may be based on an ascending (or descending) SCell index (e.g., SCellIndex). For example, each bit of the bit-map may be indicative of a dormancy status of a SCell, such as where a first bit of the bit-map is indicative of a first dormancy status of a first SCell of a cell group, a second bit of the bit-map is indicative of a second dormancy status of a second SCell of the cell group, etc. In some examples, for a MCG, comprising one or more PCells and/or one or more SCells, there may be up to 15 SCells in the MCG. In some examples, for a SCG, comprising one or more PSCells and/or one or more SCells, there may be up to 16 Cells (e.g., 16 SCells) in the SCG. Accordingly, the one or more fields (e.g., the one or more re-purposed fields), which may comprise between about 15 bits to about 17 bits, may be enough and/or sufficient for indicating SCell dormancy information in a cell group (such as a MCG and/or a SCG). In some examples, whether the DCI format 1_1 comprises an explicit field (e.g., an explicit SCell dormancy indication field) or one or more re-purposed fields for SCell dormancy indication is determined and/or configured based on whether or not the DCI with the DCI format 1_1 is configured and/or transmitted in a PCell and/or PSCell (of a UE, for example). For example, the DCI may with the DCI format 1_1 may comprise the explicit field if the DCI is configured and/or transmitted in a PCell and/or PSCell, and/or the DCI with the DCI format 1_1 may comprise the one or more re-purposed fields if the DCI is configured and/or transmitted in a cell other than a PCell and/or PSCell.

In RP-193260, a Dynamic Spectrum Sharing (DSS)-related study object is allowing a SCell to schedule (via cross-carrier scheduling and/or cross-cell scheduling, for example) a PCell and/or allowing a SCell to schedule (via cross-carrier scheduling and/or cross-cell scheduling, for example) a PSCell. In one possible scenario, the PCell or the PSCell is in LTE-NR coexistence and/or control overhead in the PCell or the PSCell may be transferred and/or switched to the SCell (e.g., scheduling SCell). Although such a DSS mechanism may provide flexibility for a network vendor to provide service via a NR and/or LTE system, the DSS mechanism may have an impact on power saving (such as one or more power saving mechanisms introduced above). There are one or more issues for implementing the DSS mechanism indicating SCell dormancy information via L1 signaling (e.g., a DCI), such as in case 1 and case 2. For case 1, it is unclear whether or not a SCell group (and/or each SCell group of one or more SCell groups associated with a field, such as a SCell dormancy indication field) may comprise the scheduling SCell that schedules the PCell or the PSCell. For case 2, when a UE receives a DCI format 1_1 indicating SCell dormancy information in the scheduling SCell that schedules PCell, it is unclear how (and/or whether) to interpret an associated bit associated with the scheduling SCell (where the associated bit indicates SCell dormancy status for the scheduling SCell, for example). If the associated bit has a value (e.g., 0 or 1) indicative of dormant status, there may no UE-specific control signaling for scheduling the PCell or the PSCell (such as due to UE entering and/or switching into a dormant BWP for the scheduling SCell, that schedules the PCell or the PSCell, based on the associated bit having the value).

Figure 5:
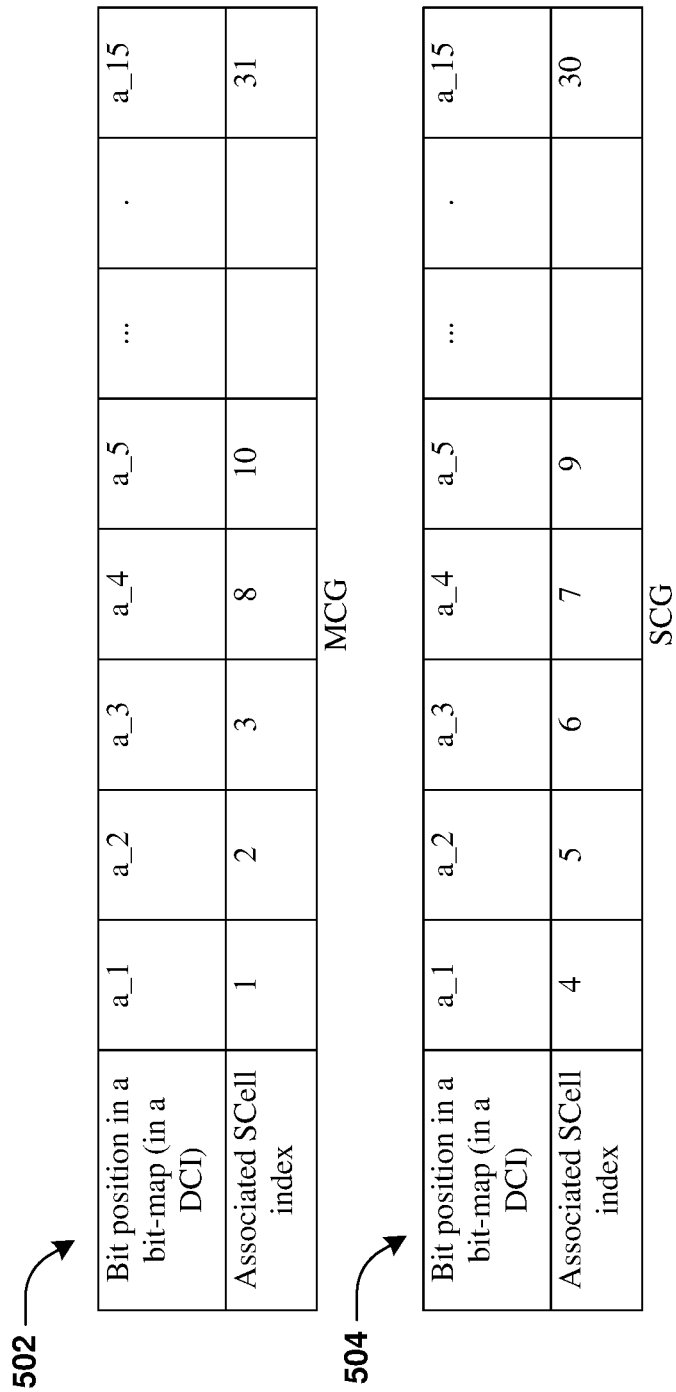
FIG. 5 illustrates tables associated with bit-maps indicating dormancy information according to one exemplary embodiment.
Figure 6:
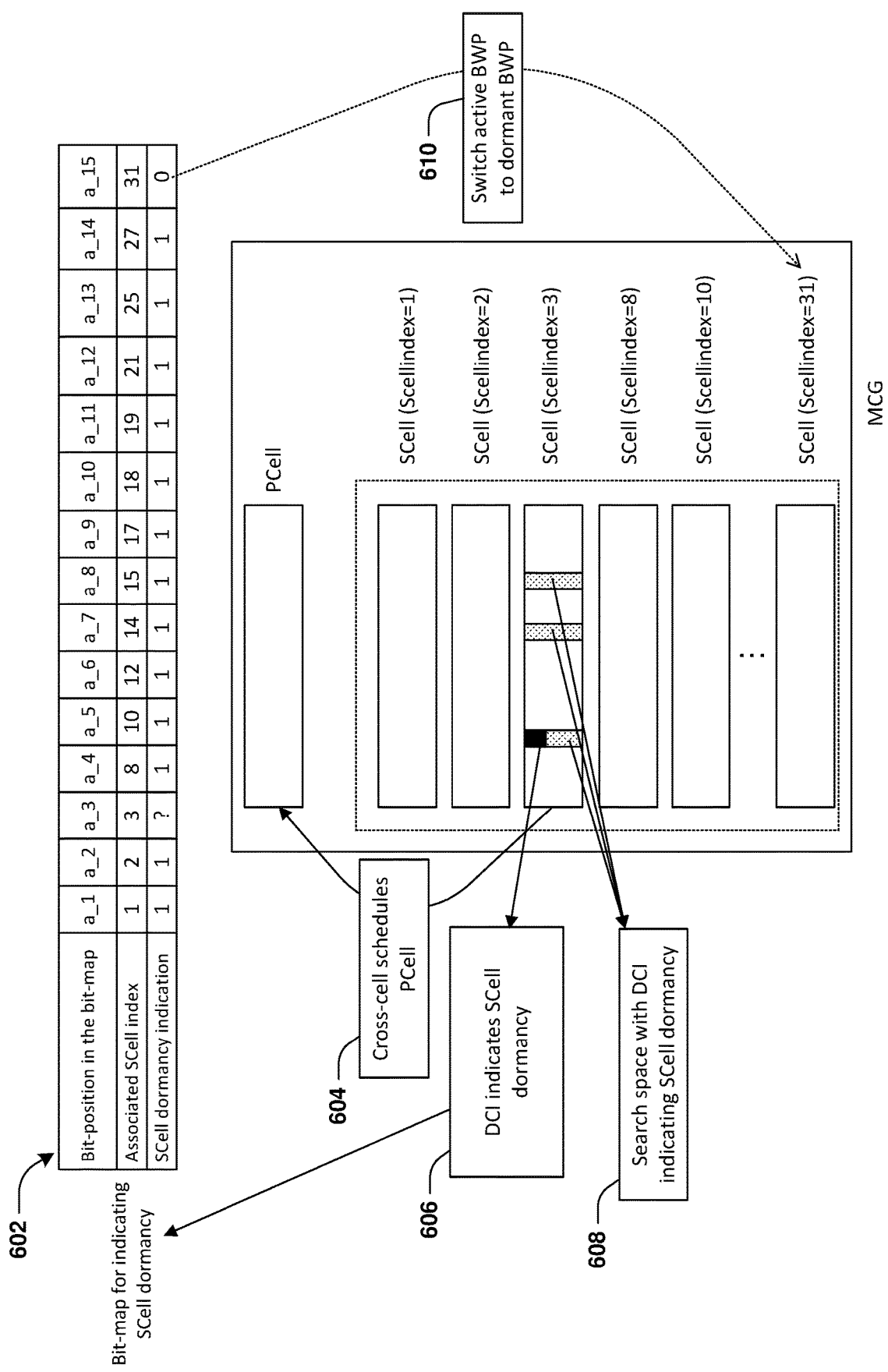
FIG. 6 is a diagram illustrating an exemplary scenario associated with indicating dormancy information according to one exemplary embodiment.

Examples are illustrated in FIGS. 5-6. FIG. 5 illustrates a first table 502 representative of a first bit-map and a second table 504 representative of a second bit-map. The first bit-map may be associated with a MCG and/or the second bit-map may be associated with a SCG. For example, a field (e.g., a SCell dormancy indication field associated with case 1 and/or one or more re-purposed bit-fields associated with case 2) of a DCI (e.g., a DCI with DCI format 1_1) received by a UE may comprise the first bit-map in a scenario in which the field is associated with a MCG and/or the field may comprise the second bit-map in a scenario in which the field is associated with a SCG. With respect to the first bit-map associated with a MCG, in an example in which the scheduling SCell (that schedules the PCell) has SCell index 3, and an associated bit corresponding to bit position a_3 of the first bit-map is indicative of dormant status, the DCI may result in there being no UE-specific PDCCH scheduling for the PCell (such as due to the UE entering and/or switching into a dormant BWP for the scheduling SCell, that schedules the PCell, based on the associated bit indicating dormant status of the scheduling SCell which may cause there to be no PDCCH monitoring and/or reception for and/or on the scheduling SCell). Accordingly, entering and/or switching into a dormant BWP for the scheduling SCell and/or there being no UE-specific PDCCH scheduling for the PCell may impact a network's scheduling flexibility for scheduling the PCell (that is to be scheduled using the scheduling SCell, for example). Such issues may also arise in a SCG, such as where the second bit field indicates dormant status of a scheduling SCell that schedules a PSCell, causing there to be no UE-specific PDCCH scheduling for the PSCell, for example.

FIG. 6 illustrates a scenario in which a UE receives a DCI 606 indicating SCell dormancy associated with one or more SCells of the UE. The DCI 606 may be received via a search space 608. The DCI 606 may have DCI format 1_1 with a bit-map for indicating SCell dormancy. A table 602 of FIG. 6 is representative of the bit-map. In some examples, the bit-map is indicative dormant status a first SCell with SCell index 31. For example, the UE may switch 610 from an active BWP for the first SCell to a dormant BWP for the first SCell based on the bit-map. The UE may switch 610 from the active BWP for the first SCell to the dormant BWP for the first SCell based on an associated bit, at bit position a_15 of the bit-map, being equal to a value (e.g., 0), where the associated bit is associated with (e.g., indicates a dormancy status of) the first SCell with SCell index 31.

In some examples, a scheduling SCell of the UE, that schedules 604 (e.g., cross-cell schedules) a PCell of the UE, may have SCell index 3. If an associated bit corresponding to bit position a_3 of the bit-map is indicative of dormant status (e.g., if the associated bit, associated with the scheduling SCell, is equal to the value, such as 0), the DCI may result in there being no UE-specific PDCCH scheduling for the PCell (such as due to the UE entering and/or switching into a dormant BWP for the scheduling SCell, that schedules the PCell, based on the associated bit indicating dormant status of the scheduling SCell which may cause there to be no PDCCH monitoring and/or reception for and/or on the scheduling SCell). The bit-map may be associated with SCells of a MCG. Such issues may also arise in a SCG. In a SCG, the PCell of the example scenario of FIG. 6 may be replaced with a PSCell.

One or more techniques are provided herein to solve one or more of the aforementioned issues and/or to avoid a UE from not having and/or receiving UE-specific control signaling for scheduling a PCell or a PSCell (e.g., the UE may not have and/or may not receive UE-specific control signaling for scheduling the PCell or the PSCell if the UE enters and/or switches into a dormant BWP for a scheduling SCell, that schedules the PCell or the PSCell, based on dormancy information received by the UE).

Embodiment 1

In Embodiment 1 of the present disclosure, a field (e.g., a field of a DCI) may not indicate dormancy status for a scheduling SCell that schedules a PCell or a PSCell (e.g., no field indicates dormancy status for the scheduling SCell).

In some examples, in a bit-map indicating SCell dormancy information, there may be no bit position in the bit-map that is associated with (and/or that addresses and/or indicates) a first SCell. Alternatively and/or additionally, a UE may ignore a value (e.g., an indicating value indicated by a bit) of a bit position in the bit-map that is associated with (and/or that addresses and/or that indicates) the first SCell (e.g., the UE may ignore a value of a bit that indicates a SCell dormancy status of the first SCell). In some examples, the first SCell is a scheduling SCell that schedules (e.g., cross-carrier schedules and/or cross-cell schedules) a PCell (in a scenario in which the SCell is in a MCG, for example) or a PSCell (in a scenario in which the SCell is in a SCG, for example). Alternatively and/or additionally, the first SCell may be used for receiving one or more DCIs indicating SCell dormancy information (e.g., one or more DCIs indicating SCell dormancy information may be received in the first SCell).

In some examples, in a scenario in which a PCell or a PSCell schedules (e.g., cross-carrier schedules and/or cross-cell schedules) one or more SCells, a size and/or number of bits of the bit-map (indicating SCell dormancy) may be a first size and/or a first number of bits. Alternatively and/or additionally, in a scenario in which a SCell schedules (e.g., cross-carrier schedules and/or cross-cell schedules) a PCell (if the SCell is in a MCG and/or the bit-map is indicative of dormancy information associated with SCells of the MCG, for example) or a PSCell (if the SCell is in a SCG and/or the bit-map is indicative of dormancy information associated with SCells of the SCG, for example), a size and/or number of bits of the bit-map may be a second size and/or a second number of bits. In some examples, the second size and/or the second number of bits are less than and/or smaller than the first size and/or the first number of bits. In an example, the second number of bits may be equal to the first number of bits minus one.

In some examples, a size and/or a number of bits of the bit-map may correspond to (e.g., be equal to) a number of configured SCells in a same cell group (e.g., a MCG or a SCG comprising SCells for which the bit-map indicates dormancy information), wherein the configured SCells may not comprise a PCell, a PSCell, a SCell that schedules a PCell or a PSCell (e.g., the SCell cross-carrier schedules and/or cross-cell schedules the PCell or the PSCell), and/or a SCell that receives one or more DCIs indicating SCell dormancy information (e.g., one or more DCIs indicating SCell dormancy information may be received in the SCell, wherein a DCI of the one or more DCIs may be indicative of the bit-map). In an example, the configured SCells (a number of which amounts to the number of bits of the bit-map, for example) may comprise configured SCells of the same cell group (e.g., all configured SCells of the same cell group) except for a PSCell, a SCell that schedules a PCell or a PSCell (e.g., the SCell cross-carrier schedules and/or cross-cell schedules the PCell or the PSCell), and/or a SCell that receives one or more DCIs indicating SCell dormancy information. Alternatively and/or additionally, the bit-map may be indicative of a dormancy status of a SCell of the configured SCells (and/or the bit-map may be indicative of a dormancy status of each SCell of the configured SCells).

In some examples, a UE receives a DCI indicating SCell dormancy information via a bit-map (e.g., the DCI may comprise the bit-map indicating SCell dormancy information). Each bit position in the bit-map may be associated with a SCell group (e.g., a group of one or more SCells), where SCell groups associated with the bit-map may be in a same cell group, such as a MCG or SCG. Each bit position in the bit-map may indicate, via a bit at the bit position, a SCell dormancy status associated with an associated SCell group associated with the bit position. For example, each bit position in the bit-map may indicate, via a bit at the bit position, whether or not an associated SCell group, associated with the bit position, switches into (and/or enters and/or remains in) dormant state, such as a state in which SCells of the SCell group are each in dormant state (e.g., for each SCell of the SCells, the UE switches and/or enters into and/or remains in a dormant BWP of the SCell). If the bit-map indicates dormant status for a first SCell group comprising a first SCell (e.g., if a bit of the bit-map, having a bit position associated with the first SCell group, is indicative of dormant status), the UE may not consider the first SCell to have dormant status (and/or the UE may not apply the dormant status to the first SCell and/or may not switch the first SCell from an active BWP to a dormant BWP of the first SCell), wherein the UE may consider one or more other SCells of the first SCell group, other than the first SCell, to have dormant status based on the bit-map (and/or the UE may apply the dormant status to the one or more other SCells of the first SCell group, and/or for each SCell of the one or more other SCells, the UE may switch from an active BWP to a dormant BWP of the SCell). The first SCell may be used for scheduling (e.g., cross-cell scheduling and/or cross-carrier scheduling) a PCell and/or a PSCell. For example, the UE may not consider the first SCell to have dormant status (and/or the UE may not apply the dormant status to the first SCell and/or may not switch the first SCell from a non-dormant BWP to a dormant BWP) based on the first SCell being used for scheduling (e.g., cross-cell scheduling and/or cross-carrier scheduling) a PCell and/or a PSCell.

The bit-map comprises (and/or is generated from and/or is determined using) one or more bit-fields in a DCI indicating dormancy information (e.g., SCell dormancy information).

The one or more bit-fields may be a SCell dormancy indication field.

Alternatively and/or additionally, the one or more bit-fields may comprise at least one of a MCS field, a NDI field, a rv field of a TB (e.g., rv of TB1 field), a HARQ process number field, one or more antenna port fields, a DMRS sequence initialization field, etc. in the DCI indicating dormancy information and/or in a DCI format (of the DCI, for example). Alternatively and/or additionally, the one or more bit-fields may comprise one or more other fields in the DCI indicating dormancy information and/or a DCI format (of the DCI, for example). In some examples, the one or more other fields may not be used for HARQ-ACK related feedback for confirming whether or not the DCI indicating dormancy information is received successfully.

The DCI indicating dormancy information may be used for scheduling data (such as for scheduling transmission and/or reception of data). Alternatively and/or additionally, the DCI indicating dormancy information may not schedule data (e.g., the DCI may not schedule transmission and/or reception of data).

In an example scenario associated with FIG. 7 and/or FIG. 8, a scheduling SCell that schedules a PCell has SCell index 3 (where the scheduling SCell is in a MCG) and SCells with SCell indexes 1, 2, 3, 8, 10, . . . , 31 are in the MCG. A UE receives a DCI with a bit-map for indicating SCell dormancy information. The DCI is received in the scheduling SCell with SCell index 3. The bit-map is from and/or comprised in (and/or determined using) one or more bit-fields that are in the DCI and/or in a DCI format of the DCI. The one or more bit-fields may comprise at least one of a MCS field, a NDI field, a rv field of a TB (e.g., rv of TB1 field), a HARQ process number field, one or more antenna port fields, a DMRS sequence initialization field, etc. In some examples, a bit of the bit-map indicates a dormancy status of an associated SCell (e.g., a SCell associated with the bit and/or a bit position of the bit). For example, each bit of the bit-map (and/or each bit-part, such as a part of a bit of the bit-map, of the bit-map) may indicate a dormancy status of an associated SCell (e.g., a SCell associated with the bit and/or the bit-part). Alternatively and/or additionally, bits (and/or bit-parts) of the bit-map may be associated with (and/or may indicate dormancy statuses of) configured SCells in the MCG (e.g., each configured SCell in the MCG) excluding the SCell with SCell index 3. An association of a bit of the bit-map with an associated SCell associated with the bit may be based on an ascending or descending SCell index.

FIG. 7 illustrates a table 702 associated with the bit-map. In an example shown in FIG. 7, the bit-map may comprise 14 bits (e.g., there may be 14 bits for the one or more bit-fields), such as bits with bit positions a_1, a_2, . . . , a_14. The table 702 shows bit positions of the bit-map and SCell indexes of SCells associated with the bit positions. In the example shown in FIG. 7, associations between bits of the bit-map and SCells may be based on ascending SCell index from a most significant bit (MSB) (e.g., high-order bit and/or left-most bit) of the bit-map, such as where a bit of a higher-order (e.g., further left) bit position (e.g., bit position a_1) is associated with (e.g., indicates a dormancy status of) a SCell associated with a lower SCell index (e.g., SCell index 1) and/or a bit of a lower-order (e.g., further right) bit position (e.g., bit position a_14) is associated with (e.g., indicates a dormancy status of) a SCell associated with a higher SCell index (e.g., SCell index 31). It may be appreciated that the associations between the bits of the bit-map and the SCells may be different than that shown in the table 702 of FIG. 7. For example, embodiments are contemplated in which the associations between the bits of the bit-map and the SCells are based on ascending SCell index from a least significant bit (LSB) (e.g., low-order bit and/or right-most bit) of the bit-map (such as opposite to the arrangement of the associations shown in the table 702 of FIG. 7). In some examples, each bit of the 14 bits may indicate a dormancy status of an associated SCell associated with the bit. For example, the UE may consider and/or interpret a bit, of the 14 bits, equal to a value (e.g., 0 or 1) as an indication of dormant status of an associated SCell associated with the bit. For example, for each bit of the 14 bits that is equal to the value, the UE may consider and/or interpret the bit to be an indication of dormant status of an associated SCell associated with the bit. In an example with respect to the table 702, if a bit corresponding to bit-position a_2 is equal to the value, the UE may consider and/or interpret the bit to be an indication of dormant status of an SCell having SCell index 2 associated with the bit position a_2 (and/or the UE may switch and/or enter into a dormant BWP for the SCell having SCell index 2 based on the bit). In an example shown in FIG. 7, a bit corresponding to a bit position a_3 is associated with a SCell having SCell index 8, rather than the bit being associated with the SCell having SCell index 3. For example, the bit corresponding to the bit position a_3 may be associated with the SCell having SCell index 8 rather than the SCell having SCell index 3 because (e.g., based on a determination that) the SCell having SCell index 3 is used for scheduling PCell and/or because (e.g., based on a determination that) the SCell with SCell index 3 is used for receiving the DCI indicating SCell dormancy information. In some examples, in a scenario in which a SCell schedules a PCell and/or the DCI for indicating SCell dormancy information is received in a SCell, a first size and/or a first number of bits of the one or more bit-fields and/or the bit-map is less than and/or smaller than a second size and/or a second number of bits of the one or more bit-fields and/or the bit-map in a scenario in which a PCell schedules one or more SCells and/or the DCI for indicating SCell dormancy information is received in a PCell. For example, the first size and/or the first number of bits being less than and/or smaller than the second size and/or the second number of bits may be due to the bit-map not comprising a bit associated with a SCell (e.g., the SCell associated with SCell index 3, such as discussed with respect to FIG. 7) that schedules a PCell and/or that is used to receive the DCI for indicating SCell dormancy information.

FIG. 8 illustrates a table 802 associated with the bit-map. In an example shown in FIG. 8, the bit-map may comprise 15 bits (e.g., there may be 15 bits for the one or more bit-fields), such as bits with bit positions a_1, a_2, . . . , a_15. The table 802 shows bit positions of the bit-map. The table 802 shows SCell indexes of SCells associated with 14 bit positions of the bit-map. In some examples, each bit of 14 bits associated with the 14 bit positions may indicate a dormancy status of an associated SCell associated with the bit. For example, the UE may consider and/or interpret a bit, of the 14 bits, equal to a value (e.g., 0 or 1) as an indication of dormant status of an associated SCell associated with the bit. For example, for each bit of the 14 bits that is equal to the value, the UE may consider and/or interpret the bit to be an indication of dormant status of an associated SCell associated with the bit. In some examples, the bit-map may comprise a first bit, other than the 14 bits, that does not indicate a dormancy status of an SCell. In some examples, the first bit may correspond to a MSB (e.g., high-order bit and/or left-most bit) or a LSB (e.g., low-order bit and/or right-most bit) of the bit-map. In an example, such as shown in FIG. 8, the first bit may have bit position a_15 of the bit-map. In some examples, the bit-map comprises the first bit (that does not indicate a dormancy status of an SCell) based on a SCell (e.g., the SCell with SCell index 3) scheduling a PCell and/or based on the DCI for indicating SCell dormancy information being received in a SCell (e.g., the SCell with SCell index 3). In some examples, in a scenario in which a SCell (e.g., the SCell with SCell index 3) schedules a PCell and/or the DCI for indicating SCell dormancy information is received in a SCell (e.g., the SCell with SCell index 3), a first size and/or a first number of bits of the one or more bit-fields and/or the bit-map is the same as a second size and/or a second number of bits of the one or more bit-fields and/or the bit-map in a scenario in which a PCell schedules one or more SCells and/or the DCI for indicating SCell dormancy information is received in a PCell.

In some examples, a UE is configured with one or more cells (e.g., one or more serving cells) comprising a second cell.

In some examples, the UE is configured to receive, in the second cell, DCI for scheduling data in a first cell.

Alternatively and/or additionally, the UE may be configured to receive, in the second cell, DCI for indicating dormancy information (e.g., SCell dormancy information) for one or more configured cells in a cell group (e.g., one or more configured cells in a same cell group, such as the same cell group that comprises the second cell).

In some examples, the UE receives, in the second cell, a DCI with a DCI format.

In some examples, the DCI and/or the DCI format are indicative of dormancy information (e.g., one or more dormancy statuses) for one or more configured cells in a cell group (e.g., one or more configured cells in a same cell group, such as the same cell group that comprises the second cell).

In some examples, the same cell group means and/or implies that the cell group comprises the second cell.

In some examples, dormancy information (e.g., SCell dormancy information comprising one or more dormancy statuses) is indicated by one or more bit-fields in the DCI and/or the DCI format. The one or more bit-fields may be re-purposed for dormancy indication (e.g., indicating the dormancy information). For example, the dormancy information may be indicated by re-purposing the one or more bit-fields for SCell dormancy indication. For example, the one or more bit-fields may comprise a bit-field that is used to indicate other information, other than SCell dormancy information, in other receptions of DCI formats corresponding to the DCI format. The one or more bit-fields comprises one or more bits associated with (e.g., indicating a dormancy status of) one or more configured cells in a cell group (e.g., one or more configured cells in a same cell group, such as the same cell group that comprises the second cell). Each bit of the one or more bit-fields (and/or each bit from and/or in the one or more bit-fields) is associated with (e.g., indicates a dormancy status of) a configured cell of the one or more configured cells. In some examples, the one or more configured cells do not comprise the first cell and do not comprise the second cell. In some examples, the one or more configured cells comprise each cell in the cell group except for the first cell and the second cell.

In some examples, associations (between one or more bits of the one or more bit-fields and one or more configured cells that do not comprise the first cell and the second cell) correspond to one-to-one mapping (e.g., strictly one-to-one mapping), such as where one bit of the one or more bit-fields is associated with (e.g., indicates a dormancy status of) one configured cell of the one or more configured cells. Alternatively and/or additionally, the associations may be based on an ascending order of SCell indexes (such as from MSB or LSB of the one or more bit-fields), examples of which are discussed herein with respect to FIG. 7.

In some examples, the one or more bit-fields do not comprise a bit and/or bit position that indicates a dormancy status of the second cell (e.g., there is no bit and/or bit position in the one or more bit-fields that indicates a dormancy status of the second cell).

In some examples, the DCI is indicative of dormant status of one or more cells. After and/or in response to receiving the DCI, the UE switches from one or more active BWPs (e.g., an active downlink and/or uplink BWP) of the one or more cells into one or more dormant BWPs for the one or more cells and/or the UE communicates with the network in a dormant BWP, of the one or more dormant BWPs, of the one or more cells. The one or more dormant BWPs may comprise a dormant BWP of the one or more cells. Alternatively and/or additionally, the one or more dormant BWPs may comprise each dormant BWP of the one or more cells. Alternatively and/or additionally, for each cell of the one or more cells, the one or more dormant BWPs comprise a dormant BWP of the cell.

In some examples, when the UE is in a dormant BWP of a configured cell (e.g., a configured serving cell) (and/or after the UE switches from an active BWP of a configured cell into the dormant BWP of the configured cell), the UE skips monitoring DCI for and/or on the dormant BWP of the cell.

In some examples, the UE is configured with dormant BWPs for cells (e.g., serving cells with which the UE is configured).

In some examples, for each cell (e.g., each serving cell with which the UE is configured) except the first cell, the UE is configured with a dormant BWP.

In some examples, for each cell (e.g., each serving cell with which the UE is configured) in a cell group except the first cell, the UE is configured with a dormant BWP.

In some examples, for each cell (e.g., each serving cell with which the UE is configured) except the first cell and the second cell, the UE is configured with a dormant BWP.

In some examples, for each cell (e.g., each serving cell with which the UE is configured) in a cell group except the first cell and the second cell, the UE is configured with a dormant BWP.

In some examples, for each SCell (e.g., each serving SCell with which the UE is configured) in a cell group, the UE is configured with a dormant BWP.

In some examples, for each SCell (e.g., each serving SCell with which the UE is configured) in a cell group except the second cell, the UE is configured with a dormant BWP.

In some examples, the UE is configured to receive DCI in the second cell, wherein the DCI can schedule the second cell (e.g., self-scheduling) and/or the first cell (e.g., cross-carrier scheduling and/or cross-cell scheduling). The DCI may be UE-specific and/or in a UE-specific search space. Alternatively and/or additionally, the DCI may be associated with a UE-specific search space in the first cell or the second cell.

In some examples, the UE camps into and/or accesses a NR system via the first cell.

In some examples, the UE receives a Synchronization Signal Block (SSB) in the first cell for accessing a NR system (in idle mode, for example).

In some examples, the UE enters connected mode from idle mode via accessing the first cell.

In some examples, in the first cell, the UE receives common control information (e.g., group common control information and/or cell common control information) such as common DCI, and/or control information (e.g., DCI) in a common search space.

In some examples, in the first cell, the UE only receives common control information (e.g., group common control information and/or cell common control information) such as common DCI, and/or control information (e.g., DCI) in a common search space.

In some examples, the UE does not receive UE-specific control information (e.g., UE-specific DCI) in the first cell and the UE does not receive control information (e.g., DCI) in a UE-specific search space in the first cell.

In some examples, the first cell is a PSCell or a PCell.

In some examples, the second cell is SCell.

In some examples, the second cell is not a PSCell.

In some examples, the first cell and the second cell are in a same cell group (e.g., the first cell and the second cell are in a MCG, or the first cell and the second cell are in a SCG).

In some examples, a size and/or a number of bits of the one or more bit-fields used for indicating dormancy information may be based on whether the first cell schedules the second cell or the second cell schedules the first cell.

In some examples, in a scenario in which the second cell schedules the first cell, the one or more bit-fields used for indicating dormancy information has a first size and/or a first number of bits. In a scenario in which the first cell schedules the second cell, the one or more bit-fields used for indicating dormancy information has a second size and/or a second number of bits. The first size and/or the first number of bits may be less than and/or smaller than the second size and/or the second number of bits.

In some examples, a size and/or a number of bits of the one or more bit-fields used for indicating dormancy information may not be based on whether the first cell schedules the second cell or the second cell schedules the first cell.

In some examples, a size and/or a number of bits of the one or more bit-fields used for indicating dormancy information in a scenario in which the second cell schedules the first cell is the same as the size and/or the number of bits of the one or more bit-fields used for indicating dormancy information in a scenario in which the first cell schedules the second cell.

In some examples, in a scenario in which the second cell schedules the first cell, the UE uses first bits, amounting to a first number of bits, of the one or more bit-fields for determining dormancy information associated with one or more configured cells (e.g., the UE determines the dormancy information based on the first bits amounting to the first number of bits). Alternatively and/or additionally, in the scenario in which the second cell schedules the first cell, a network indicates the dormancy information to the UE using the first bits, amounting to the first number of bits, of the one or more bit-fields. In some examples, in a scenario in which the first cell schedules the second cell, the UE uses second bits, amounting to a second number of bits, of the one or more bit-fields for determining dormancy information associated with one or more configured cells (e.g., the UE determines the dormancy information based on the second bits amounting to the second number of bits). Alternatively and/or additionally, in the scenario in which the second cell schedules the first cell, a network indicates the dormancy information to the UE using the second bits, amounting to the second number of bits, of the one or more bit-fields. In some examples, the first number of bits is less than the second number of bits. In some examples, the first bits do not comprise a bit (e.g., one bit) associated with the second cell and/or the first bits do not comprise a bit (e.g., one bit) that indicates dormancy status of the second cell. The second bits comprise a bit (e.g., one bit) associated with the second cell and/or the second bits comprise a bit (e.g., one bit) that indicates dormancy status of the second cell. The first bits and/or the second bits do not comprise a bit (e.g., one bit) associated with the first cell, and/or the first bits and/or the second bits do not comprise a bit (e.g., one bit) that indicates dormancy status of the first cell.

In some examples, cross-cell scheduling and/or cross-carrier scheduling may imply and/or mean that scheduling control information and/or a control channel is in a first cell and/or a first carrier different than a second cell and/or a second carrier associated with scheduled data (e.g., scheduled data scheduled for the second cell and/or the second carrier via the scheduling control information and/or the control channel).

In some examples, self-scheduling may imply and/or mean that scheduling control information and/or a control channel is in a same cell and/or a same carrier as scheduled data (e.g., scheduled data scheduled for the same cell and/or the same carrier via the scheduling control information and/or the control channel).

To enhance 3GPP MAC specification for wireless communication in accordance with some embodiments herein, Enhancements 1-2 are provided herein. Enhancements 1-2 are reflective of implementation in accordance with some embodiments herein, and comprise additions to Section 10.3 of 3GPP TS 38.213 V16.1.0. According to some embodiments, one and/or both of Enhancements 1-2 may be implemented. A portion of Section 10.3 of 3GPP TS 38.213 V16.1.0, without any additions of Enhancements 1-2, is quoted below:

If a UE is provided search space sets to monitor PDCCH for detection of DCI format 1_1, and if
    the CRC of DCI format 1_1 is scrambled by a C-RNTI or a MCS-C-RNTI, and if
    resourceAllocation=resourceAllocationType0 and all bits of the frequency domain resource assignment field in DCI format 1_1 are equal to 0, or
    resourceAllocation=resourceAllocationType1 and all bits of the frequency domain resource assignment field in DCI format 1_1 are equal to 1
    resourceAllocation=dynamicSwitch and all bits of the frequency domain resource assignment field in DCI format 1_1 are equal to 0 or 1
the UE considers the DCI format 1_1 as indicating SCell dormancy, not scheduling a PDSCH reception or indicating a SPS PDSCH release, and for transport block 1 interprets the sequence of fields of
    modulation and coding scheme
    new data indicator
    redundancy version
and of
    HARQ process number
    antenna port(s)
    DMRS sequence initialization
as providing a bitmap to each configured SCell in an ascending order of the SCell index, where
    a '0' value for a bit of the bitmap indicates an active DL BWP, provided by dormant-BWP, for the UE for a corresponding activated SCell
    a '1' value for a bit of the bitmap indicates an active DL BWP, provided by first-non-dormant-BWP-ID-for-DCI-inside-active-time, for the UE for a corresponding activated SCell, if a current active DL BWP is the dormant DL BWP a current active DL BWP, for the UE for a corresponding activated SCell, if the current active DL BWP is not the dormant DL BWP the UE sets the active DL BWP to the indicated active DL BWP In Enhancement 1, addition 1 is made to the portion of Section 10.3 of 3GPP TS 38.213 V16.1.0 in accordance with some embodiments of the present disclosure, such as one or more embodiments described with respect to Embodiment 1. The addition 1 provides that, when providing a bit-map (indicative of dormancy information, for example) to a UE, the bit-map comprises bits associated with (e.g., indicating dormancy statuses of) configured SCells that exclude a SCell scheduling a PCell and/or a PSCell, or exclude a SCell that receives a DCI format 1_1 (comprising the bit-map, for example). Without the addition 1 of Enhancement 1, Section 10.3 of 3GPP TS 38.213 V16.1.0 provides that the bit-map comprises bits associated with (e.g., indicating dormancy statuses of) each configured SCell. Accordingly, by performing operations in accordance with the portion of Section 10.3 (as originally provided in 3GPP TS 38.213 V16.1.0), the bit-map may comprise a bit indicating a dormant status of a SCell scheduling a PCell and/or a PSCell, and thus, there may no UE-specific control signaling for scheduling the PCell or the PSCell.

The addition 1 of Enhancement 1 is in bold, and is preceded by the term "ADDITION 1 STARTS:" and followed by the term "ADDITION 1 ENDS" to distinguish the addition 1 from what is originally included in Section 10.3 of 3GPP TS 38.213 V16.1.0.

Enhancement 1

If a UE is provided search space sets to monitor PDCCH for detection of DCI format 1_1, and if the CRC of DCI format 1_1 is scrambled by a C-RNTI or a MCS-C-RNTI, and if resourceAllocation=resourceAllocationType0 and all bits of the frequency domain resource assignment field in DCI format 1_1 are equal to 0, or resourceAllocation=resourceAllocationType1 and all bits of the frequency domain resource assignment field in DCI format 1_1 are equal to 1 resourceAllocation=dynamicSwitch and all bits of the frequency domain resource assignment field in DCI format 1_1 are equal to 0 or 1 the UE considers the DCI format 1_1 as indicating SCell dormancy, not scheduling a PDSCH reception or indicating a SPS PDSCH release, and for transport block 1 interprets the sequence of fields of modulation and coding scheme
new data indicator
redundancy version and of HARQ process number
antenna port(s)
DMRS sequence initialization as providing a bitmap to each configured SCell ADDITION 1 STARTS:, except SCell scheduling PCell and/or PSCell, or SCell for receiving the DCI format 1_1, ADDITION 1 ENDS in an ascending order of the SCell index, where a '0' value for a bit of the bitmap indicates an active DL BWP, provided by dormant-BWP, for the UE for a corresponding activated SCell a '1' value for a bit of the bitmap indicates an active DL BWP, provided by first-non-dormant-BWP-ID-for-DCI-inside-active-time, for the UE for a corresponding activated SCell, if a current active DL BWP is the dormant DL BWP a current active DL BWP, for the UE for a corresponding activated SCell, if the current active DL BWP is not the dormant DL BWP the UE sets the active DL BWP to the indicated active DL BWP Embodiment 2

In Embodiment 2 of the present disclosure, a field (e.g., a field of a DCI) may indicate dormancy status for a scheduling SCell that schedules a PCell or a PSCell, where a network may set the field to indicate non-dormant status for the scheduling SCell.

In some examples, there may be a restriction and/or a limitation on a network with respect to scheduling, indicating and/or configuring SCell dormancy information. In an example, a network (e.g., gNB) shall, for a bit-map indicating SCell dormancy information, set a first bit of a first bit position in the bit-map to be indicative of non-dormant status and/or set the first bit of the first bit position to indicate a first value (e.g., 1). For example, the network may set the first bit to be indicative of non-dormant status and/or the network may set the first bit to the first value (e.g., the first bit being set to the first value may indicate non-dormant status of a SCell associated with the first bit and/or the first bit position). Alternatively and/or additionally, the network may not set (e.g., the network is not allowed to set and/or is not configured to set and/or is prohibited from setting and/or is prevented from setting) the first bit of the first bit position in the bit-map to be indicative of dormant status and the network may not set (e.g., the network is not allowed to set and/or is not configured to set and/or is prohibited from setting and/or is prevented from setting) the first bit to indicate a second value (e.g., 0). In some examples, the first bit being set to the second value may indicate dormant status of a SCell associated with the first bit and/or the first bit position. Alternatively and/or additionally, a UE does not expect and/or is not expected to receive the bit-map with the first bit and/or the first bit position in the bit-map indicative of dormant status. In some examples, the first bit and/or the first bit position are associated with (and/or address and/or indicate) a first SCell. For example, the first bit and/or the first bit position indicate a dormancy status of the first SCell. In some examples, the first SCell is a scheduling SCell that schedules (e.g., cross-carrier schedules and/or cross-cell schedules) a PCell (in a scenario in which the SCell is in a MCG, for example) or a PSCell (in a scenario in which the SCell is in a SCG, for example). Alternatively and/or additionally, the first SCell may be used for receiving one or more DCIs indicating SCell dormancy information (e.g., one or more DCIs indicating SCell dormancy information may be received in the first SCell, wherein a DCI of the one or more DCIs may comprise the first bit and/or the first bit position associated with the first SCell).

In some examples, a bit-map may indicate SCell dormancy information, where a bit in the bit-map is indicative of a dormancy status of a SCell group (e.g., a group of one or more SCells) and/or where each bit in the bit-map is indicative of a dormancy status of a SCell group. In some examples, a network (e.g., gNB) may not configure (e.g., the network is not allowed to configure and/or is not configured to configure and/or is prohibited from configuring and/or is prevented from configuring) a first SCell to be associated with any bit and/or bit position in the bit-map. The first SCell may be used for scheduling (e.g., cross-cell scheduling and/or cross-carrier scheduling) a PCell and/or a PSCell. For example, the UE may not expect that the first SCell is configured into (and/or is part of) a SCell group (e.g., any SCell group) associated with the bit-map. Alternatively and/or additionally, the UE may not expect that the first SCell is configured into (and/or is part of) a SCell group (e.g., any SCell group) for which a dormancy status is indicated by the bit-map. Alternatively and/or additionally, the UE may not consider the first SCell to be part of a SCell group (e.g., any SCell group) associated with the bit-map. Alternatively and/or additionally, the UE may not consider the first SCell to be part of a SCell group (e.g., any SCell group) for which a dormancy status is indicated by the bit-map. Alternatively and/or additionally, the first SCell may not be configured into (and/or may not be part of) a SCell group (e.g., any SCell group) associated with the bit-map. Alternatively and/or additionally, the first SCell may not be configured into (and/or may not be part of) a SCell group (e.g., any SCell group) for which a dormancy status is indicated by the bit-map. Alternatively and/or additionally, a bit of the bit-map that is indicative of dormancy status of a SCell group may not be associated with (and/or may not indicate a dormancy status of) the first SCell (and/or the bit-map may not comprise a bit, indicative of dormancy status of a SCell group, that is indicative of dormancy status of the first SCell).

In some examples, a size and/or a number of bits of the bit-map may not be based on whether a SCell (of a cell group, for example, such as a MCG or a SCG comprising SCells for which the bit-map indicates dormancy information) schedules (e.g., cross-carrier schedules and/or cross-cell schedules) a PCell or a PSCell (of the cell group, for example) or whether a PCell or a PSCell (of the cell group, for example) schedules (e.g., cross-carrier schedules and/or cross-cell schedules) one or more SCells (of the cell group, for example). Alternatively and/or additionally, a size and/or a number of bits of the bit-map may be equal to a first size and/or a first number of bits regardless of whether a SCell (of a cell group, for example, such as a MCG or a SCG comprising SCells for which the bit-map indicates dormancy information) schedules (e.g., cross-carrier schedules and/or cross-cell schedules) a PCell or a PSCell (of the cell group, for example) or whether a PCell or a PSCell (of the cell group, for example) schedules (e.g., cross-carrier schedules and/or cross-cell schedules) one or more SCells (of the cell group, for example).

In some examples, a size and/or a number of bits of the bit-map may correspond to (e.g., be equal to) a number of configured SCells in a same cell group (e.g., a MCG or a SCG comprising SCells for which the bit-map indicates dormancy information), wherein the configured SCells may not comprise a PCell, a PSCell, a SCell that schedules a PCell or a PSCell (e.g., the SCell cross-carrier schedules and/or cross-cell schedules the PCell or the PSCell), and/or a SCell that receives one or more DCIs indicating SCell dormancy information (e.g., one or more DCIs indicating SCell dormancy information may be received in the SCell, wherein a DCI of the one or more DCIs may be indicative of the bit-map). In an example, the configured SCells (a number of which amounts to the number of bits of the bit-map, for example) may comprise configured SCells of the same cell group (e.g., all configured SCells of the same cell group) except for a PSCell, a SCell that schedules a PCell or a PSCell (e.g., the SCell cross-carrier schedules and/or cross-cell schedules the PCell or the PSCell), and/or a SCell that receives one or more DCIs indicating SCell dormancy information (e.g., one or more DCIs indicating SCell dormancy information may be received in the SCell, wherein a DCI of the one or more DCIs may be indicative of the bit-map). Alternatively and/or additionally, the bit-map may be indicative of a dormancy status of a SCell of the configured SCells (and/or the bit-map may be indicative of a dormancy status of each SCell of the configured SCells).

The bit-map comprises (and/or is generated from and/or is determined using) one or more bit-fields in a DCI indicating dormancy information (e.g., SCell dormancy information).

The one or more bit-fields may be a SCell dormancy indication field.

Alternatively and/or additionally, the one or more bit-fields may comprise at least one of a MCS field, a NDI field, a rv field of a TB (e.g., rv of TB1 field), a HARQ process number field, one or more antenna port fields, a DMRS sequence initialization field, etc. in the DCI indicating dormancy information and/or in a DCI format (of the DCI, for example). Alternatively and/or additionally, the one or more bit-fields may comprise one or more other fields in the DCI indicating dormancy information and/or a DCI format (of the DCI, for example). In some examples, the one or more other fields may not be used for HARQ-ACK related feedback for confirming whether or not the DCI indicating dormancy information is received successfully.

The DCI indicating dormancy information may be used for scheduling data (such as for scheduling transmission and/or reception of data). Alternatively and/or additionally, the DCI indicating dormancy information may not schedule data (e.g., the DCI may not schedule transmission and/or reception of data).

In an example with respect to the table 502 and/or the table 504 of FIG. 5, if bit position a_3 of the bit-map is associated with a SCell that schedules (e.g., cross-carrier schedules and/or cross-cell schedules) a PCell or a PSCell and/or if the position a_3 of the bit-map is associated with a SCell that receives one or more DCIs indicating SCell dormancy information, a network may not set (e.g., the network is not allowed to set and/or is not configured to set and/or is prohibited from setting and/or is prevented from setting) a bit of the bit position a_3 to be indicative of dormant status and the network may not set (e.g., the network is not allowed to set and/or is not configured to set and/or is prohibited from setting and/or is prevented from setting) the bit of the bit position a_3 to indicate a second value (e.g., 0).

In some examples, a UE is configured with one or more cells (e.g., one or more serving cells) comprising a second cell.

In some examples, the UE is configured to receive, in the second cell, DCI for scheduling data in a first cell.

Alternatively and/or additionally, the UE may be configured to receive, in the second cell, DCI for indicating dormancy information (e.g., SCell dormancy information) for one or more configured cells in a cell group (e.g., one or more configured cells in a same cell group, such as the same cell group that comprises the second cell).

In some examples, the UE receives, in the second cell, a DCI with a DCI format.

In some examples, the DCI and/or the DCI format are indicative of dormancy information (e.g., one or more dormancy statuses) for one or more configured cells in a cell group (e.g., one or more configured cells in a same cell group, such as the same cell group that comprises the second cell).

In some examples, the same cell group means and/or implies that the cell group comprises the second cell.

In some examples, dormancy information (e.g., SCell dormancy information comprising one or more dormancy statuses) is indicated by one or more bit-fields in the DCI and/or the DCI format. The one or more bit-fields may be re-purposed for dormancy indication (e.g., indicating the dormancy information). For example, the dormancy information may be indicated by re-purposing the one or more bit-fields for SCell dormancy indication. For example, the one or more bit-fields may comprise a bit-field that is used to indicate other information, other than SCell dormancy information, in other receptions of DCI formats corresponding to the DCI format. The one or more bit-fields comprises one or more bits associated with (e.g., indicating a dormancy status of) one or more configured cells in a cell group (e.g., one or more configured cells in a same cell group, such as the same cell group that comprises the second cell). Each bit of the one or more bit-fields (and/or each bit from and/or in the one or more bit-fields) is associated with (e.g., indicates a dormancy status of) a configured cell of the one or more configured cells. In some examples, the one or more configured cells comprise each cell in the cell group. Alternatively and/or additionally, the one or more configured cells may not comprise the first cell (e.g., the one or more configured cells comprise each cell in the cell group except for the first cell).

In some examples, associations (between one or more bits of the one or more bit-fields and one or more configured cells that comprise the second cell and do not comprise the first cell) correspond to one-to-one mapping (e.g., strictly one-to-one mapping), such as where one bit of the one or more bit-fields is associated with (e.g., indicates a dormancy status of) one configured cell of the one or more configured cells. Alternatively and/or additionally, the associations may be based on an ascending order of SCell indexes (such as from MSB or LSB of the one or more bit-fields).

In some examples, for the one or more bit-fields, the UE does not expect to receive and/or be indicated of a bit-map (via the one or more bit-fields, for example) that has a bit position and/or a bit, associated with the second cell, indicative of dormant status and/or a second value (e.g., 0). For example, the UE does not expect the one or more bit-fields and/or the bit-map of the one or more bit-fields to be indicative of dormant status of the second cell.

In some examples, the DCI is indicative of dormant status of one or more cells. After and/or in response to receiving the DCI, the UE switches from one or more active BWPs (e.g., an active downlink and/or uplink BWP) of the one or more cells into one or more dormant BWPs for the one or more cells and/or the UE communicates with the network in a dormant BWP, of the one or more dormant BWPs, of the one or more cells. The one or more dormant BWPs may comprise a dormant BWP of the one or more cells. Alternatively and/or additionally, the one or more dormant BWPs may comprise each dormant BWP of the one or more cells. Alternatively and/or additionally, for each cell of the one or more cells, the one or more dormant BWPs comprise a dormant BWP of the cell.

In some examples, when the UE is in a dormant BWP of a configured cell (e.g., a configured serving cell) (and/or after the UE switches from an active BWP of a configured cell into the dormant BWP of the configured cell), the UE skips monitoring DCI for and/or on the dormant BWP of the cell.

In some examples, the UE is configured with dormant BWPs for cells (e.g., serving cells with which the UE is configured).

In some examples, for each cell (e.g., each serving cell with which the UE is configured) except the first cell, the UE is configured with a dormant BWP.

In some examples, for each cell (e.g., each serving cell with which the UE is configured) in a cell group except the first cell, the UE is configured with a dormant BWP.

In some examples, for each cell (e.g., each serving cell with which the UE is configured) except the first cell and the second cell, the UE is configured with a dormant BWP.

In some examples, for each cell (e.g., each serving cell with which the UE is configured) in a cell group except the first cell and the second cell, the UE is configured with a dormant BWP.

In some examples, for each SCell (e.g., each serving SCell with which the UE is configured) in a cell group, the UE is configured with a dormant BWP.

In some examples, for each SCell (e.g., each serving SCell with which the UE is configured) in a cell group except the second cell, the UE is configured with a dormant BWP.

In some examples, the UE is configured to receive DCI in the second cell, wherein the DCI can schedule the second cell (e.g., self-scheduling) and/or the first cell (e.g., cross-carrier scheduling and/or cross-cell scheduling). The DCI may be UE-specific and/or in a UE-specific search space. Alternatively and/or additionally, the DCI may be associated with a UE-specific search space in the first cell or the second cell.

In some examples, the UE camps into and/or accesses a NR system via the first cell.

In some examples, the UE receives a SSB in the first cell for accessing a NR system (in idle mode, for example).

In some examples, the UE enters connected mode from idle mode via accessing the first cell.

In some examples, in the first cell, the UE receives common control information (e.g., group common control information and/or cell common control information) such as common DCI, and/or control information (e.g., DCI) in a common search space.

In some examples, in the first cell, the UE only receives common control information (e.g., group common control information and/or cell common control information) such as common DCI, and/or control information (e.g., DCI) in a common search space.

In some examples, the UE does not receive UE-specific control information (e.g., UE-specific DCI) in the first cell and the UE does not receive control information (e.g., DCI) in a UE-specific search space in the first cell.

In some examples, the first cell is a PSCell or a PCell.

In some examples, the second cell is SCell.

In some examples, the second cell is not a PSCell.

In some examples, the first cell and the second cell are in a same cell group (e.g., the first cell and the second cell are in a MCG, or the first cell and the second cell are in a SCG).

In some examples, a size and/or a number of bits of the one or more bit-fields used for indicating dormancy information may not be based on whether the first cell schedules the second cell or the second cell schedules the first cell.

In some examples, a size and/or a number of bits of the one or more bit-fields used for indicating dormancy information in a scenario in which the second cell schedules the first cell is the same as the size and/or the number of bits of the one or more bit-fields used for indicating dormancy information in a scenario in which the first cell schedules the second cell.

In some examples, cross-cell scheduling and/or cross-carrier scheduling may imply and/or mean that scheduling control information and/or a control channel is in a first cell and/or a first carrier different than a second cell and/or a second carrier associated with scheduled data (e.g., scheduled data scheduled for the second cell and/or the second carrier via the scheduling control information and/or the control channel).

In some examples, self-scheduling may imply and/or mean that scheduling control information and/or a control channel is in a same cell and/or a same carrier as scheduled data (e.g., scheduled data scheduled for the same cell and/or the same carrier via the scheduling control information and/or the control channel).

In some examples, a first network configures a UE with one or more cells (e.g., one or more serving cells) comprising a second cell.

In some examples, the first network configures the UE to receive, in the second cell, DCI for scheduling data in a first cell.

Alternatively and/or additionally, the first network may configure the UE to receive, in the second cell, DCI for indicating dormancy information (e.g., SCell dormancy information) for one or more configured cells in a cell group (e.g., one or more configured cells in a same cell group, such as the same cell group that comprises the second cell).

In some examples, the first network transmits, in the second cell, a DCI with a DCI format.

In some examples, the DCI and/or the DCI format are indicative of dormancy information (e.g., one or more dormancy statuses) for one or more configured cells in a cell group (e.g., one or more configured cells in a same cell group, such as the same cell group that comprises the second cell), wherein the cell group may belong to the first network.

In some examples, the same cell group means and/or implies that the cell group comprises the second cell.

In some examples, dormancy information (e.g., SCell dormancy information comprising one or more dormancy statuses) is indicated by one or more bit-fields in the DCI and/or the DCI format. The one or more bit-fields may be re-purposed for dormancy indication (e.g., indicating the dormancy information). For example, the dormancy information may be indicated by re-purposing the one or more bit-fields for SCell dormancy indication. For example, the one or more bit-fields may comprise a bit-field that is used to indicate other information, other than SCell dormancy information, in other transmissions of DCI formats corresponding to the DCI format. The one or more bit-fields comprises one or more bits associated with (e.g., indicating a dormancy status of) one or more configured cells in a cell group (e.g., one or more configured cells in a same cell group, such as the same cell group that comprises the second cell). Each bit of the one or more bit-fields (and/or each bit from and/or in the one or more bit-fields) is associated with (e.g., indicates a dormancy status of) a configured cell of the one or more configured cells. In some examples, the one or more configured cells comprise each cell in the cell group. Alternatively and/or additionally, the one or more configured cells may not comprise the first cell (e.g., the one or more configured cells comprise each cell in the cell group except for the first cell). In some examples, the cell group (e.g., the same cell group) belongs to the first network.

In some examples, associations (between one or more bits of the one or more bit-fields and one or more configured cells that comprise the second cell and do not comprise the first cell) correspond to one-to-one mapping (e.g., strictly one-to-one mapping), such as where one bit of the one or more bit-fields is associated with (e.g., indicates a dormancy status of) one configured cell of the one or more configured cells. Alternatively and/or additionally, the associations may be based on an ascending order of SCell indexes (such as from MSB or LSB of the one or more bit-fields).

In some examples, for the one or more bit-fields, the first network is not allowed and/or is not configured to transmit and/or indicate a bit-map (via the one or more bit-fields for indicating dormancy information, for example) that has a bit position and/or a bit, associated with the second cell, indicative of dormant status and/or a second value (e.g., 0).

In some examples, the first network is not allowed and/or is not configured to transmit a DCI that is indicative of dormant status of the second cell.

In some examples, the DCI is indicative of dormant status of one or more cells. After and/or in response to transmitting the DCI and/or receiving HARQ-ACK associated with the DCI, the first network may not transmit DCI on and/or for the one or more cells.

In some examples, the first network may configure the UE with dormant BWPs for cells (e.g., serving cells with which the UE is configured).

In some examples, for each cell (e.g., each serving cell with which the UE is configured) except the first cell, the first network may configure the UE with a dormant BWP.

In some examples, for each cell (e.g., each serving cell with which the UE is configured) in a cell group except the first cell, the first network may configure the UE with a dormant BWP.

In some examples, for each cell (e.g., each serving cell with which the UE is configured) except the first cell and the second cell, the first network may configure the UE with a dormant BWP.

In some examples, for each cell (e.g., each serving cell with which the UE is configured) in a cell group except the first cell and the second cell, the first network may configure the UE with a dormant BWP.

In some examples, for each SCell (e.g., each serving SCell with which the UE is configured) in a cell group, the first network may configure the UE with a dormant BWP.

In some examples, for each SCell (e.g., each serving SCell with which the UE is configured) in a cell group except the second cell, the first network may configure the UE with a dormant BWP.

In some examples, the first network may not configure (e.g., the network is not allowed to configure and/or is not configured to configure and/or is prohibited from configuring and/or is prevented from configuring) a dormant BWP for a SCell that schedules (e.g., cross-carrier schedules and/or cross-cell schedules) a PCell or a PSCell.

In some examples, the first network may not configure (e.g., the network is not allowed to configure and/or is not configured to configure and/or is prohibited from configuring and/or is prevented from configuring) a SCell to schedule (e.g., cross-carrier schedule and/or cross-cell schedule) a PCell or a PSCell if the SCell is with a configured dormant BWP.

In some examples, the first network may not indicate (e.g., the network is not allowed to indicate and/or is not configured to indicate and/or is prohibited from indicating and/or is prevented from indicating) that a SCell schedules (e.g., cross-carrier schedules and/or cross-cell schedules) a PCell or a PSCell if the SCell is with a configured dormant BWP.

In some examples, the first network configures the UE to receive DCI in the second cell, wherein the DCI can schedule the second cell (e.g., self-scheduling) and/or the first cell (e.g., cross-carrier scheduling and/or cross-cell scheduling). The DCI may be UE-specific and/or in a UE-specific search space. Alternatively and/or additionally, the DCI may be associated with a UE-specific search space in the first cell or the second cell.

In some examples, in the first cell, the first network transmits, for one or more UEs comprising the UE, common control information (e.g., group common control information and/or cell common control information) such as common DCI, and/or control information (e.g., DCI) in a common search space.

In some examples, in the first cell, the first network only transmits, for one or more UEs comprising the UE, common control information (e.g., group common control information and/or cell common control information) such as common DCI, and/or control information (e.g., DCI) in a common search space.

In some examples, the first network does not transmit, for one or more UEs comprising the UE, UE-specific control information (e.g., UE-specific DCI) in the first cell and the first network does not transmit, for one or more UEs comprising the UE, control information (e.g., DCI) in a UE-specific search space in the first cell.

In some examples, the first cell is a PSCell or a PCell (in view of the UE, for example).

In some examples, the second cell is SCell (in view of the UE, for example).

In some examples, the second cell is not a PSCell (in view of the UE, for example).

In some examples, the first network may configure the UE to communicate with a second network.

In some examples, the first network controls cells in MCG.

In some examples, the second network controls cells in SCG.

In some examples, the second cell is configured by the first network.

In some examples, the UE communicates with the first network and the second network (via dual-connectivity (DC), for example).

In some examples, the first cell and the second cell are in a same cell group (e.g., the first cell and the second cell are in a MCG, or the first cell and the second cell are in a SCG).

In some examples, a size and/or a number of bits of the one or more bit-fields used for indicating dormancy information may not be based on whether the first cell schedules the second cell or the second cell schedules the first cell.

In some examples, a size and/or a number of bits of the one or more bit-fields used for indicating dormancy information in a scenario in which the second cell schedules the first cell is the same as the size and/or the number of bits of the one or more bit-fields used for indicating dormancy information in a scenario in which the first cell schedules the second cell.

In some examples, cross-cell scheduling and/or cross-carrier scheduling may imply and/or mean that scheduling control information and/or a control channel is in a first cell and/or a first carrier different than a second cell and/or a second carrier associated with scheduled data (e.g., scheduled data scheduled for the second cell and/or the second carrier via the scheduling control information and/or the control channel).

In some examples, self-scheduling may imply and/or mean that scheduling control information and/or a control channel is in a same cell and/or a same carrier as scheduled data (e.g., scheduled data scheduled for the same cell and/or the same carrier via the scheduling control information and/or the control channel).

In Enhancement 2, addition 2 is made to the portion of Section 10.3 of 3GPP TS 38.213 V16.1.0 in accordance with some embodiments of the present disclosure, such as one or more embodiments described with respect to Embodiment 2. The addition 2 provides that a UE does not expect a bit-map (indicative of dormancy information, for example) to comprise a bit equal to a value (e.g., 1) indicating non-dormant status, wherein the bit is associated with (e.g., indicates a dormancy status of) a SCell scheduling a PCell and/or a PSCell, or a SCell that receives a DCI format 1_1 (comprising the bit-map, for example). Without the addition 2 of Enhancement 2, the bit may indicate dormant status of a SCell scheduling a PCell and/or a PSCell (and/or the UE may expect that the bit indicates dormant status of the SCell scheduling the PCell and/or the PSCell), and thus, there may be no UE-specific control signaling for scheduling the PCell or the PSCell.

The addition 2 of Enhancement 2 is in bold, and is preceded by the term "ADDITION 2 STARTS:" and followed by the term "ADDITION 2 ENDS" to distinguish the addition 2 from what is originally included in Section 10.3 of 3GPP TS 38.213 V16.1.0.

Enhancement 2

If a UE is provided search space sets to monitor PDCCH for detection of DCI format 1_1, and if the CRC of DCI format 1_1 is scrambled by a C-RNTI or a MCS-C-RNTI, and if resourceAllocation=resourceAllocationType0 and all bits of the frequency domain resource assignment field in DCI format 1_1 are equal to 0, or resourceAllocation=resourceAllocationType1 and all bits of the frequency domain resource assignment field in DCI format 1_1 are equal to 1 resourceAllocation=dynamicSwitch and all bits of the frequency domain resource assignment field in DCI format 1_1 are equal to 0 or 1 the UE considers the DCI format 1_1 as indicating SCell dormancy, not scheduling a PDSCH reception or indicating a SPS PDSCH release, and for transport block 1 interprets the sequence of fields of modulation and coding scheme new data indicator redundancy version and of HARQ process number antenna port(s)

DMRS sequence initialization as providing a bitmap to each configured SCell in an ascending order of the SCell index, where a '0' value for a bit of the bitmap indicates an active DL BWP, provided by dormant-BWP, for the UE for a corresponding activated SCell a '1' value for a bit of the bitmap indicates an active DL BWP, provided by first-non-dormant-BWP-ID-for-DCI-inside-active-time, for the UE for a corresponding activated SCell, if a current active DL BWP is the dormant DL BWP a current active DL BWP, for the UE for a corresponding activated SCell, if the current active DL BWP is not the dormant DL BWP ADDITION 2 STARTS:
the UE does not expect a '1' value for a bit of the bitmap associated with a SCell scheduling PCell and/or PSCell, or associated with a SCell for receiving the DCI format 1_1
ADDITION 2 ENDS
the UE sets the active DL BWP to the indicated active DL BWP Embodiment 3

In Embodiment 3 of the present disclosure, a field (e.g., a field of a DCI) may indicate dormancy status for a scheduling SCell that schedules a PCell or a PSCell, where if the field indicates non-dormant status for the scheduling SCell, the PCell or the PSCell may switch to self-cell scheduling.

In some examples, for a bit-map indicating SCell dormancy information, if a first bit of a first bit position in the bit-map is indicative of dormant status, UE may consider and/or interpret the first bit and/or the first bit position to be an indication and/or instruction to switch to self-scheduling. Alternatively and/or additionally, if a scheduled cell is associated with a scheduling cell (where the scheduling cell schedules, such as cross-cell schedules and/or cross-carrier schedules, the scheduled cell, for example) and if the scheduling cell is associated with the first bit position and/or the first bit (where the first bit position and/or the first bit indicate dormant status of the scheduling cell, for example), the may UE monitor PDCCH (e.g., UE-specific PDCCH) on the scheduled cell for scheduling the scheduled cell and/or the UE may not monitor PDCCH (e.g., UE-specific PDCCH) on the scheduling cell for scheduling the scheduled cell. In some examples, the scheduling cell is a SCell and/or the scheduled cell is a PCell or a PSCell (or other cell).

In some examples, if the first bit and/or the first bit position indicate non-dormant status, the UE may consider and/or interpret the first bit and/or the first bit position to be an indication and/or instruction to switch to (and/or continue) cross-cell and/or cross-carrier scheduling. Alternatively and/or additionally, if a scheduled cell is associated with a scheduling cell (where the scheduling cell schedules, such as cross-cell schedules and/or cross-carrier schedules, the scheduled cell, for example) and if the scheduling cell is associated with the first bit position and/or the first bit (where the first bit position and/or the first bit indicate non-dormant status of the scheduling cell, for example), the UE may monitor PDCCH (e.g., UE-specific PDCCH) on the scheduling cell for scheduling the scheduled cell and/or the UE may not monitor PDCCH (e.g., UE-specific PDCCH) on the scheduled cell for scheduling the scheduled cell. In some examples, the scheduling cell is a SCell and/or the scheduled cell is a PCell or a PSCell (or other cell).

It may be appreciated that one or more techniques and/or embodiments of Embodiment 3 of the present disclosure, such as the UE switching to self-scheduling based on a bit and/or a bit position of the bit-map may enable the UE to switch to self-scheduling without RRC signaling resulting in benefits including but not limited to switching to self-scheduling more quickly and/or improving service continuity.

In some examples, in a scenario in which a PCell or a PSCell schedules (e.g., cross-carrier schedules and/or cross-cell schedules) one or more SCells, a size and/or number of bits of the bit-map (indicating SCell dormancy) may be a first size and/or a first number of bits. Alternatively and/or additionally, in a scenario in which a SCell schedules (e.g., cross-carrier schedules and/or cross-cell schedules) a PCell (if the SCell is in a MCG and/or the bit-map is indicative of dormancy information associated with SCells of the MCG, for example) or a PSCell (if the SCell is in a SCG and/or the bit-map is indicative of dormancy information associated with SCells of the SCG, for example), a size and/or number of bits of the bit-map may be a second size and/or a second number of bits. In some examples, the second size and/or the second number of bits is the same as the first size and/or the first number of bits.

In some examples, a size and/or a number of bits of the bit-map may correspond to (e.g., be equal to) a number of configured SCells in a same cell group (e.g., a MCG or a SCG comprising SCells for which the bit-map indicates dormancy information), wherein the configured SCells may not comprise a PCell, a PSCell, a SCell that schedules a PCell or a PSCell (e.g., the SCell cross-carrier schedules and/or cross-cell schedules the PCell or the PSCell), and/or a SCell that receives one or more DCIs indicating SCell dormancy information (e.g., one or more DCIs indicating SCell dormancy information may be received in the SCell, wherein a DCI of the one or more DCIs may be indicative of the bit-map). In an example, the configured SCells (a number of which amounts to the number of bits of the bit-map, for example) may comprise configured SCells of the same cell group (e.g., all configured SCells of the same cell group) except for a PSCell, a SCell that schedules a PCell or a PSCell (e.g., the SCell cross-carrier schedules and/or cross-cell schedules the PCell or the PSCell), and/or a SCell that receives one or more DCIs indicating SCell dormancy information (e.g., one or more DCIs indicating SCell dormancy information may be received in the SCell, wherein a DCI of the one or more DCIs may be indicative of the bit-map). Alternatively and/or additionally, the bit-map may be indicative of a dormancy status of a SCell of the configured SCells (and/or the bit-map may be indicative of a dormancy status of each SCell of the configured SCells).

The bit-map comprises (and/or is generated from and/or is determined using) one or more bit-fields in a DCI indicating dormancy information (e.g., SCell dormancy information).

Alternatively and/or additionally, the one or more bit-fields may comprise at least one of a MCS field, a NDI field, a rv field of a TB (e.g., rv of TB1 field), a HARQ process number field, one or more antenna port fields, a DMRS sequence initialization field, etc. in the DCI indicating dormancy information and/or in a DCI format (of the DCI, for example). Alternatively and/or additionally, the one or more bit-fields may comprise one or more other fields in the DCI indicating dormancy information and/or a DCI format (of the DCI, for example). In some examples, the one or more other fields may not be used for HARQ-ACK related feedback for confirming whether or not the DCI indicating dormancy information is received successfully.

The DCI indicating dormancy information may be used for scheduling data (such as for scheduling transmission and/or reception of data). Alternatively and/or additionally, the DCI indicating dormancy information may not schedule data (e.g., the DCI may not schedule transmission and/or reception of data).

In some examples, a UE is configured with one or more cells (e.g., one or more serving cells) comprising a second cell.

In some examples, the UE is configured to receive, in the second cell, DCI for scheduling data in a first cell.

Alternatively and/or additionally, the UE may be configured to receive, in the second cell, DCI for indicating dormancy information (e.g., SCell dormancy information) for one or more configured cells in a cell group (e.g., one or more configured cells in a same cell group, such as the same cell group that comprises the second cell).

In some examples, the UE receives, in the second cell, a first DCI with a first DCI format.

In some examples, the first DCI and/or the first DCI format are indicative of dormancy information (e.g., one or more dormancy statuses) for one or more configured cells in a cell group (e.g., one or more configured cells in a same cell group, such as the same cell group that comprises the second cell).

In some examples, the same cell group means and/or implies that the cell group comprises the second cell.

In some examples, dormancy information (e.g., SCell dormancy information comprising one or more dormancy statuses) is indicated by one or more bit-fields in the first DCI and/or the first DCI format. The one or more bit-fields may be re-purposed for dormancy indication (e.g., indicating the dormancy information). For example, the dormancy information may be indicated by re-purposing the one or more bit-fields for SCell dormancy indication. For example, the one or more bit-fields may comprise a bit-field that is used to indicate other information, other than SCell dormancy information, in other receptions of first DCI formats corresponding to the first DCI format. The one or more bit-fields comprises one or more bits associated with (e.g., indicating a dormancy status of) one or more configured cells in a cell group (e.g., one or more configured cells in a same cell group, such as the same cell group that comprises the second cell). Each bit of the one or more bit-fields (and/or each bit from and/or in the one or more bit-fields) is associated with (e.g., indicates a dormancy status of) a configured cell of the one or more configured cells. In some examples, the one or more configured cells comprise each cell in the cell group. Alternatively and/or additionally, the one or more configured cells may not comprise the first cell (e.g., the one or more configured cells comprise each cell in the cell group except for the first cell).

In some examples, associations (between one or more bits of the one or more bit-fields and one or more configured cells that comprise the second cell and do not comprise the first cell) correspond to one-to-one mapping (e.g., strictly one-to-one mapping), such as where one bit of the one or more bit-fields is associated with (e.g., indicates a dormancy status of) one configured cell of the one or more configured cells. Alternatively and/or additionally, the associations may be based on an ascending order of SCell indexes (such as from MSB or LSB of the one or more bit-fields).

In some examples, when and/or in response to receiving the one or more bit-fields, the UE may switch a scheduling cell for the first cell from the second cell to the first cell if a bit of a bit position (in the bit-map), associated with the second cell, is indicative of dormant status and/or a second value (e.g., 0). For example, the UE may switch, without RRC signaling, the scheduling cell (for the first cell) from the second cell to the first cell based on the bit and/or the bit position being indicative of dormant status of the second cell. In some examples, prior to receiving the one or more bit-fields (and/or prior to switching the scheduling cell (for the first cell) from the second cell to the first cell), the UE may receive DCI scheduling the first cell (e.g., DCI that schedules data transmission and/or reception for the first cell) on the second cell. Alternatively and/or additionally, after and/or in response to receiving the one or more bit-fields (and/or after and/or in response to switching the scheduling cell (for the first cell) from the second cell to the first cell), the UE may receive DCI scheduling the first cell (e.g., DCI that schedules data transmission and/or reception for the first cell) on the first cell. In an example, the UE may receive DCI scheduling the first cell on the first cell at least one of after a processing time passes from reception of the one or more bit-fields (e.g., reception of the first DCI and/or the first DCI format), after transmitting a HARQ (e.g., a HARQ-ACK) associated with the first DCI and/or the first DCI format, after a processing time passes from transmission of the HARQ for the first DCI, etc. Alternatively and/or additionally, after and/or in response to receiving the one or more bit-fields (and/or after and/or in response to switching the scheduling cell (for the first cell) from the second cell to the first cell), the UE may switch from an active BWP (e.g., an active downlink and/or uplink BWP) of the second cell into a dormant BWP of the second cell, and/or the UE may communicate with the network in the dormant BWP.

In some examples, when and/or in response to receiving the one or more bit-fields, the UE may switch a scheduling cell for the first cell from the first cell to the second cell if a bit of a bit position (in the bit-map), associated with the second cell, is indicative of non-dormant status and/or a first value (e.g., 1). For example, the UE may switch, without RRC signaling, the scheduling cell (for the first cell) from the first cell to the second cell based on the bit and/or the bit position being indicative of non-dormant status of the second cell. In some examples, prior to receiving the one or more bit-fields (and/or prior to switching the scheduling cell (for the first cell) from the first cell to the second cell), the UE may receive DCI scheduling the first cell (e.g., DCI that schedules data transmission and/or reception for the first cell) on the first cell. Alternatively and/or additionally, after and/or in response to receiving the one or more bit-fields (and/or after and/or in response to switching the scheduling cell (for the first cell) from the first cell to the second cell), the UE may receive DCI scheduling the first cell (e.g., DCI that schedules data transmission and/or reception for the first cell) on the second cell. In an example, the UE may receive DCI scheduling the first cell on the second cell at least one of after a processing time passes from reception of the one or more bit-fields (e.g., reception of the first DCI and/or the first DCI format), after transmitting a HARQ (e.g., a HARQ-ACK) associated with the first DCI and/or the first DCI format, after a processing time passes from transmission of the HARQ for the first DCI, etc.

Alternatively and/or additionally, when and/or in response to receiving the one or more bit-fields, the UE may maintain a current scheduling cell for the first cell to remain the second cell if a bit of a bit position (in the bit-map), associated with the second cell, is indicative of non-dormant status and/or the first value (e.g., 1). In some examples, prior to receiving the one or more bit-fields (and/or prior to switching the scheduling cell (for the first cell) from the first cell to the second cell), the UE may receive DCI scheduling the first cell (e.g., DCI that schedules data transmission and/or reception for the first cell) on the second cell. Alternatively and/or additionally, after and/or in response to receiving the one or more bit-fields (and/or after and/or in response to switching the scheduling cell (for the first cell) from the first cell to the second cell), the UE may receive DCI scheduling the first cell (e.g., DCI that schedules data transmission and/or reception for the first cell) on the second cell.

Alternatively and/or additionally, when and/or in response to receiving the one or more bit-fields, the UE may switch a scheduling cell for the first cell from the second cell to the first cell if a bit of a bit position (in the bit-map), associated with the second cell, is indicative of non-dormant status and/or a first value (e.g., 1). For example, the UE may switch, without RRC signaling, the scheduling cell (for the first cell) from the second cell to the first cell based on the bit and/or the bit position being indicative of non-dormant status of the second cell. In some examples, prior to receiving the one or more bit-fields (and/or prior to switching the scheduling cell (for the first cell) from the second cell to the first cell), the UE may receive DCI scheduling the first cell (e.g., DCI that schedules data transmission and/or reception for the first cell) on the second cell. Alternatively and/or additionally, after and/or in response to receiving the one or more bit-fields (and/or after and/or in response to switching the scheduling cell (for the first cell) from the second cell to the first cell), the UE may receive DCI scheduling the first cell (e.g., DCI that schedules data transmission and/or reception for the first cell) on the first cell. In an example, the UE may receive DCI scheduling the first cell on the first cell at least one of after a processing time passes from reception of the one or more bit-fields (e.g., reception of the first DCI and/or the first DCI format), after transmitting a HARQ (e.g., a HARQ-ACK) associated with the first DCI and/or the first DCI format, after a processing time passes from transmission of the HARQ for the first DCI, etc.

In some examples, the first DCI is indicative of dormant status of one or more cells. After and/or in response to receiving the first DCI, the UE switches from one or more active BWPs (e.g., an active downlink and/or uplink BWP) of the one or more cells into one or more dormant BWPs for the one or more cells and/or the UE communicates with the network in a dormant BWP, of the one or more dormant BWPs, of the one or more cells. The one or more dormant BWPs may comprise a dormant BWP of the one or more cells. Alternatively and/or additionally, the one or more dormant BWPs may comprise each dormant BWP of the one or more cells. Alternatively and/or additionally, for each cell of the one or more cells, the one or more dormant BWPs comprise a dormant BWP of the cell.

In some examples, when the UE is in a dormant BWP of a configured cell (e.g., a configured serving cell) (and/or after the UE switches from an active BWP of a configured cell into the dormant BWP of the configured cell), the UE skips monitoring DCI for and/or on the dormant BWP of the cell.

In some examples, the UE is configured with dormant BWPs for cells (e.g., serving cells with which the UE is configured).

In some examples, for each cell (e.g., each serving cell with which the UE is configured) except the first cell, the UE is configured with a dormant BWP.

In some examples, for each cell (e.g., each serving cell with which the UE is configured) in a cell group except the first cell, the UE is configured with a dormant BWP.

In some examples, for each SCell (e.g., each serving SCell with which the UE is configured) in a cell group, the UE is configured with a dormant BWP.

In some examples, the UE is configured to receive DCI in the second cell, wherein the DCI can schedule the second cell (e.g., self-scheduling) and/or the first cell (e.g., cross-carrier scheduling and/or cross-cell scheduling). The DCI may be UE-specific and/or in a UE-specific search space. Alternatively and/or additionally, the DCI may be associated with a UE-specific search space in the first cell or the second cell.

In some examples, the UE camps into and/or accesses a NR system via the first cell.

In some examples, the UE receives a SSB in the first cell for accessing a NR system (in idle mode, for example).

In some examples, the UE enters connected mode from idle mode via accessing the first cell.

In some examples, in the first cell, the UE receives common control information (e.g., group common control information and/or cell common control information) such as common DCI, and/or control information (e.g., DCI) in a common search space.

In some examples, in the first cell, the UE only receives common control information (e.g., group common control information and/or cell common control information) such as common DCI, and/or control information (e.g., DCI) in a common search space.

In some examples, the UE does not receive UE-specific control information (e.g., UE-specific DCI) in the first cell and the UE does not receive control information (e.g., DCI) in a UE-specific search space in the first cell.

In some examples, the first cell is a PSCell or a PCell.

In some examples, the second cell is SCell.

In some examples, the second cell is not a PSCell.

In some examples, the first cell and the second cell are in a same cell group (e.g., the first cell and the second cell are in a MCG, or the first cell and the second cell are in a SCG).

In some examples, a size and/or a number of bits of the one or more bit-fields used for indicating dormancy information may not be based on whether the first cell schedules the second cell or the second cell schedules the first cell.

In some examples, a size and/or a number of bits of the one or more bit-fields used for indicating dormancy information in a scenario in which the second cell schedules the first cell is the same as the size and/or the number of bits of the one or more bit-fields used for indicating dormancy information in a scenario in which the first cell schedules the second cell.

In some examples, cross-cell scheduling and/or cross-carrier scheduling may imply and/or mean that scheduling control information and/or a control channel is in a first cell and/or a first carrier different than a second cell and/or a second carrier associated with scheduled data (e.g., scheduled data scheduled for the second cell and/or the second carrier via the scheduling control information and/or the control channel).

In some examples, self-scheduling may imply and/or mean that scheduling control information and/or a control channel is in a same cell and/or a same carrier as scheduled data (e.g., scheduled data scheduled for the same cell and/or the same carrier via the scheduling control information and/or the control channel).

One, some and/or all of the foregoing techniques and/or embodiments can be formed to a new embodiment.

In some examples, embodiments disclosed herein, such as embodiments described with respect to Embodiment 1, Embodiment 2 and Embodiment 3, may be implemented independently and/or separately. Alternatively and/or additionally, a combination of embodiments described herein, such as embodiments described with respect to Embodiment 1, Embodiment 2 and/or Embodiment 3, may be implemented. Alternatively and/or additionally, a combination of embodiments described herein, such as embodiments described with respect to Embodiment 1, Embodiment 2 and/or Embodiment 3, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 9:
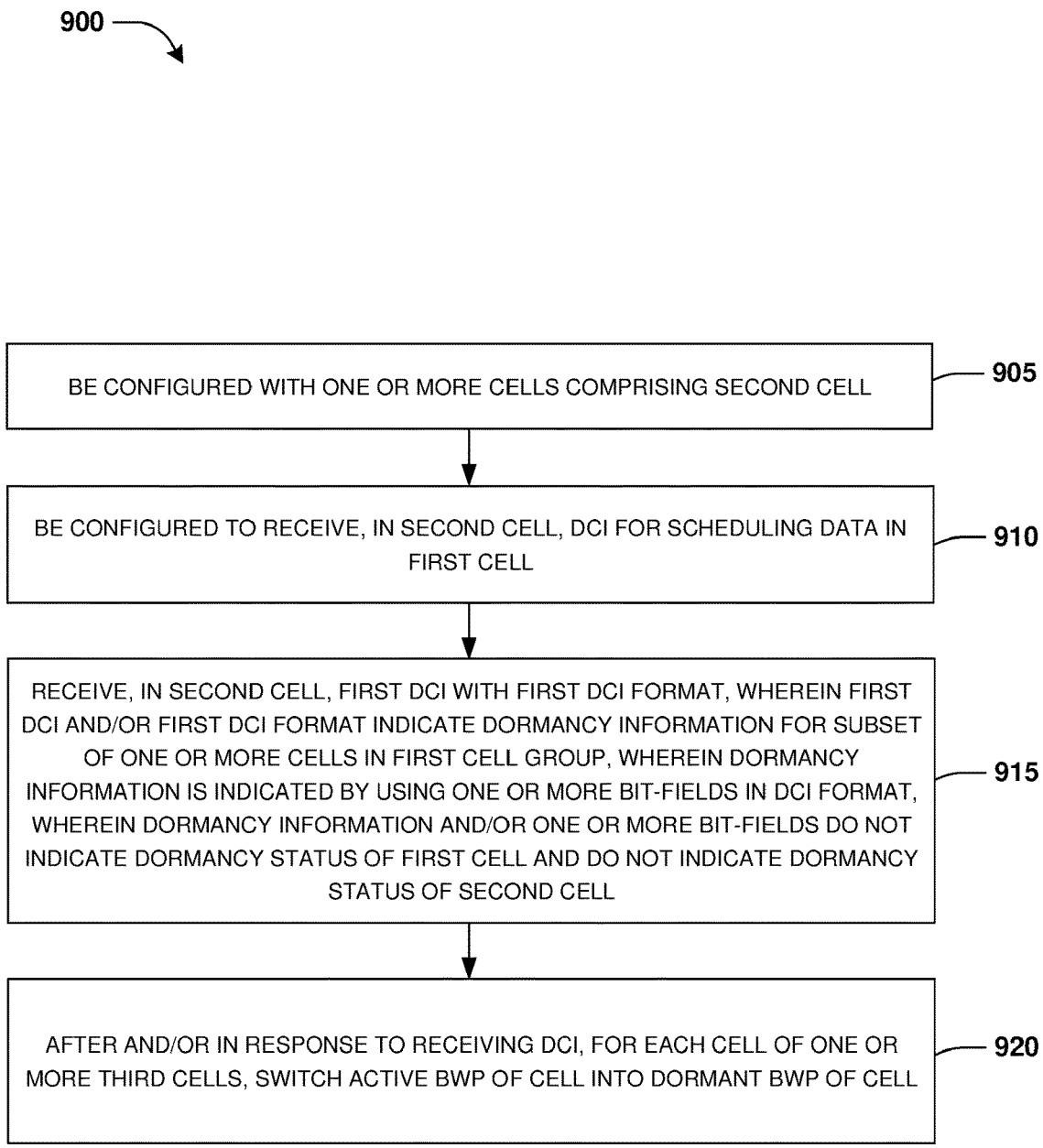
FIG. 9 is a flow chart according to one exemplary embodiment.

FIG. 9 is a flow chart 900 according to one exemplary embodiment from the perspective of a UE. In step 905, the UE is configured with one or more cells (e.g., one or more serving cells) comprising a second cell. In an example, the UE is configured with the one or more cells via receiving a configuration and/or an indication of the one or more cells from a network. In step 910, the UE is configured to receive, in the second cell, DCI for scheduling data in the first cell. For example, the second cell may schedule (e.g., cross-carrier schedule and/or cross-cell schedule) the first cell. In an example, the UE is configured to schedule (e.g., cross-carrier schedule and/or cross-cell schedule) the first cell using the second cell via receiving (from the network, for example) a configuration and/or an indication of the second cell scheduling (e.g., cross-carrier scheduling and/or cross-cell scheduling) the first cell. In step 915, the UE receives, in the second cell, a first DCI with a first DCI format, wherein the first DCI and/or the first DCI format indicate dormancy information for a subset of the one or more cells (e.g., one or more configured cells with which the UE is configured) in a first cell group. In an example, the one or more cells comprise the subset of the one or more cells. In an example, the subset of the one or more cells is the same as the one or more cells. The dormancy information is indicated by using (e.g., re-purposing) one or more bit-fields, in the DCI format, to indicate the dormancy information. The one or more bit-fields comprises one or more bits indicating dormancy status of the subset of the one or more cells. Each bit of the one or more bit-fields is associated with a cell of the subset of the one or more cells. For example, each bit of the one or more bit-fields may be indicative of a dormancy status of a cell of the subset of the one or more cells. The subset of the one or more cells do not comprise the first cell and do not comprise the second cell. In an example, the subset of the one or more cells, for which dormancy statuses are indicated by the dormancy information and/or the one or more bit-fields, comprise cells of the first cell group except the first cell and the second cell (e.g., the subset of the one or more cells may comprise all cells of the first cell group except the first cell and the second cell). For example, the dormancy information and/or the one or more bit-fields do not indicate a dormancy status of the first cell and do not indicate a dormancy status of the second cell. The dormancy information and/or the one or more bit-fields indicate dormant status of one or more third cells of the subset of the one or more cells. In step 920, after and/or in response to receiving the DCI, the UE, for each cell of the one or more third cells, switches an active BWP (e.g., an active downlink and/or uplink BWP) of the cell into a dormant BWP of the cell. In an example, the UE may switch an active BWP of a cell of the one or more third cells into a dormant BWP of the cell based on the dormancy information and/or the one or more bit-fields indicating dormant status of the cell.

In one embodiment, associations (between one or more bits of the one or more bit-fields and cells of the subset of the one or more cells that do not comprise the first cell and the second cell) correspond to one-to-one mapping (e.g., strictly one-to-one mapping), such as where one bit of the one or more bit-fields is associated with (e.g., indicates a dormancy status of) one configured cell of the one or more configured cells. The associations are in an ascending order of SCell indexes (such as from MSB or LSB of the one or more bit-fields).

In one embodiment, the one or more bit-fields in the DCI format do not comprise a bit and/or bit position that is associated with (and/or that indicates) a dormancy status of the second cell (e.g., there is no bit and/or bit position in the one or more bit-fields in the DCI format that is associated with (and/or that indicates) a dormancy status of the second cell).

In one embodiment, the UE, for each cell (e.g., each serving cell with which the UE is configured) except the first cell, is configured with a dormant BWP.

In one embodiment, the UE, for each cell (e.g., each serving cell with which the UE is configured) except the first cell and the second cell, is configured with a dormant BWP.

In one embodiment, the UE is configured to receive DCI in the second cell, wherein the DCI can schedule the second cell (e.g., self-scheduling) and/or the first cell (e.g., cross-carrier scheduling and/or cross-cell scheduling). The DCI may be UE-specific and/or in a UE-specific search space. Alternatively and/or additionally, the DCI may be associated with a UE-specific search space in the first cell or the second cell.

In one embodiment, the UE camps into and/or accesses a NR system via the first cell.

In one embodiment, the UE receives a SSB in the first cell for accessing a NR system (in idle mode, for example).

In one embodiment, the UE enters connected mode from idle mode via accessing the first cell.

In one embodiment, in the first cell, the UE only receives common control information (e.g., group common control information and/or cell common control information) such as common DCI, and/or control information (e.g., DCI) in a common search space.

In one embodiment, the UE does not receive UE-specific control information (e.g., UE-specific DCI) in the first cell and the UE does not receive control information (e.g., DCI) in a UE-specific search space in the first cell.

In one embodiment, the first cell is a PSCell or a PCell.

In one embodiment, the second cell is SCell.

In one embodiment, the second cell is not a PSCell.

In one embodiment, the first cell and the second cell are in a same cell group (e.g., the first cell group).

In one embodiment, a size and/or a number of bits of the one or more bit-fields used for indicating the dormancy information may be based on whether the first cell schedules the second cell or the second cell schedules the first cell.

In one embodiment, in a scenario in which the second cell schedules the first cell, the one or more bit-fields used for indicating the dormancy information has a first size and/or a first number of bits. In a scenario in which the first cell schedules the second cell, the one or more bit-fields used for indicating the dormancy information has a second size and/or a second number of bits. The first size and/or the first number of bits may be less than and/or smaller than the second size and/or the second number of bits.

In one embodiment, a size and/or a number of bits of the one or more bit-fields used for indicating dormancy information may not be based on whether the first cell schedules the second cell or the second cell schedules the first cell.

In one embodiment, a size and/or a number of bits of the one or more bit-fields used for indicating dormancy information in a scenario in which the second cell schedules the first cell is the same as the size and/or the number of bits of the one or more bit-fields used for indicating dormancy information in a scenario in which the first cell schedules the second cell.

In one embodiment, in a scenario in which the second cell schedules the first cell, the UE uses first bits, amounting to a first number of bits, of the one or more bit-fields (e.g., the UE uses the first bits for determining the dormancy information).

In one embodiment, in a scenario in which the first cell schedules the second cell, the UE uses second bits, amounting to a second number of bits, of the one or more bit-fields (e.g., the UE uses the second bits for determining the dormancy information).

In one embodiment, the first number of bits is less than the second number of bits, and/or the first bits do not comprise a bit (e.g., one bit) associated with the second cell and/or the first bits do not comprise a bit (e.g., one bit) that indicates dormancy status of the second cell.

In one embodiment, the second bits comprise a bit (e.g., one bit) associated with the second cell and/or the second bits comprise a bit (e.g., one bit) that indicates dormancy status of the second cell.

Referring back to FIGS. 3 and 4, in one exemplary embodiment of a UE, the device 300 includes a program code 312 stored in the memory 310. The CPU 308 may execute program code 312 to enable the UE (i) to be configured with one or more cells (e.g., one or more serving cells) comprising a second cell, (ii) to be configured to receive, in the second cell, DCI for scheduling data in the first cell, (iii) to receive, in the second cell, a first DCI with a first DCI format, wherein the first DCI and/or the first DCI format indicate dormancy information for a subset of the one or more cells (e.g., one or more configured cells with which the UE is configured) in a first cell group, wherein the dormancy information is indicated by using (e.g., re-purposing) one or more bit-fields, in the DCI format, to indicate the dormancy information, wherein each bit of the one or more bit-fields may be indicative of a dormancy status of a cell of the subset of the one or more cells, wherein the dormancy information and/or the one or more bit-fields indicate dormant status of one or more third cells of the subset of the one or more cells, and wherein the dormancy information and/or the one or more bit-fields do not indicate dormancy status of the first cell and do not indicate dormancy status of the second cell, and (iv) after and/or in response to receiving the DCI, to switch, for each cell of the one or more third cells, an active BWP (e.g., an active downlink and/or uplink BWP) of the cell into a dormant BWP of the cell. Furthermore, the CPU 308 can execute the program code 312 to perform one, some and/or all of the above-described actions and steps and/or others described herein.

Figure 10:
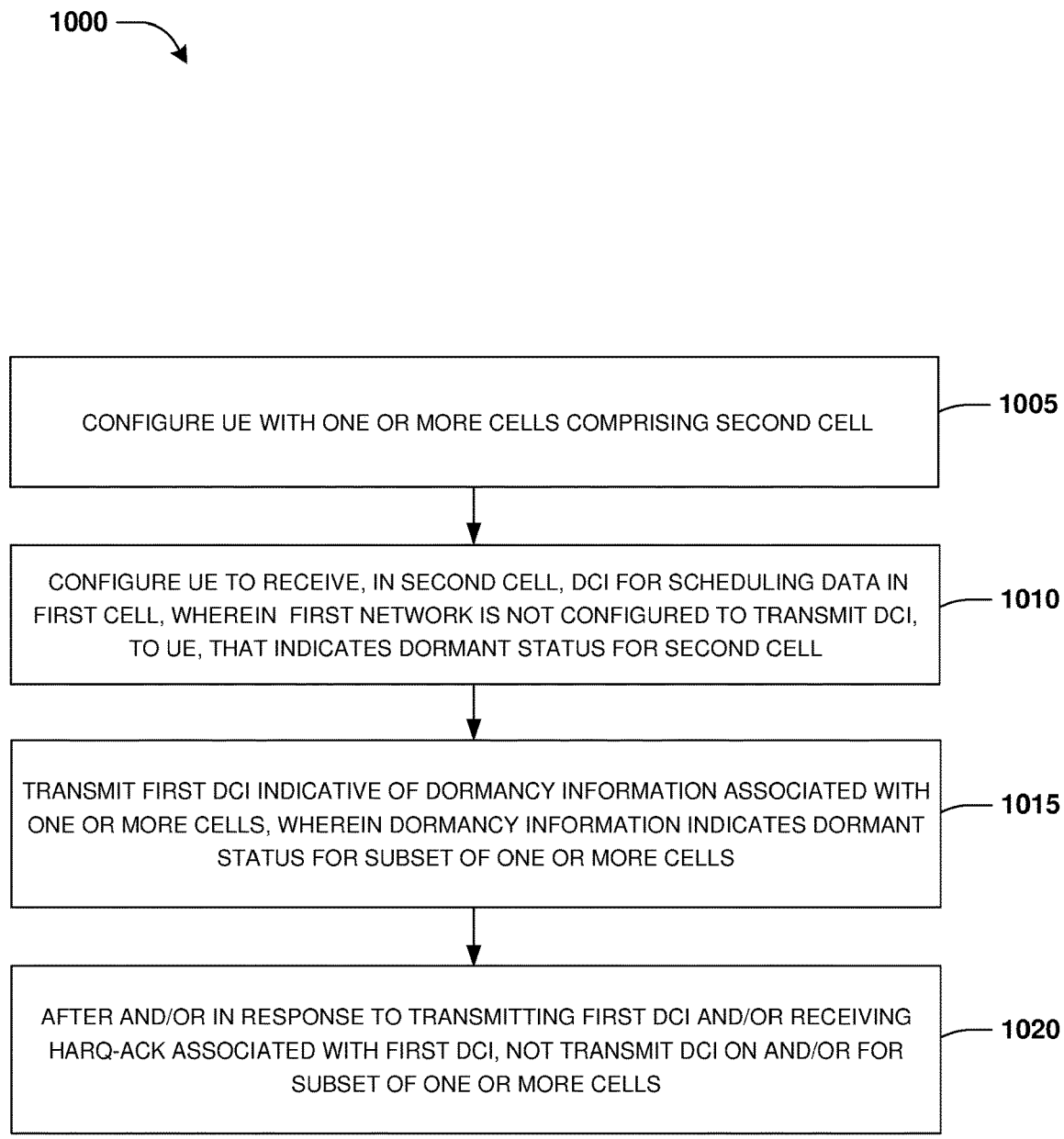
FIG. 10 is a flow chart according to one exemplary embodiment.

FIG. 10 is a flow chart 1000 according to one exemplary embodiment from the perspective of a first network. In step 1005, the first network configures a UE with one or more cells (e.g., one or more serving cells) comprising a second cell. In step 1010, the first network configures the UE to receive, in the second cell, DCI for scheduling data in a first cell. The first network is not configured to transmit (e.g., the first network is not allowed to transmit and/or is prohibited from transmitting and/or is prevented from transmitting) a DCI, to the UE, that indicates dormant status for the second cell. In step 1015, the first network transmits a first DCI indicative of dormancy information associated with the one or more cells. The first DCI and/or the dormancy information indicates dormant status for a subset of the one or more cells, wherein the subset of the one or more cells does not comprise the second cell. In step 1020, after and/or in response to transmitting the first DCI and/or receiving a HARQ-ACK associated with the first DCI, the first network may not transmit DCI on and/or for the subset of the one or more cells.

In one embodiment, the dormancy information is indicated by one or more bit-fields in the DCI and/or a DCI format of the DCI. The one or more bit-fields may be re-purposed for dormancy indication (e.g., indicating the dormancy information). For example, the dormancy information may be indicated by re-purposing the one or more bit-fields for SCell dormancy indication. For example, the one or more bit-fields may comprise a bit-field that is used to indicate other information, other than dormancy information, in other transmissions of DCI formats corresponding to the DCI format. The one or more bit-fields comprises one or more bits associated with (e.g., indicating a dormancy status of) one or more third cells of the one or more cells. The one or more third cells may comprise the subset of the one or more cells. The one or more third cells are in a cell group (belonging to the first network, for example). The one or more third cells do not comprise the first cell. The one or more third cells may comprise the second cell. Each bit of the one or more bit-fields is associated with (e.g., indicates a dormancy status of) a cell of the one or more third cells.

In one embodiment, associations (between one or more bits of the one or more bit-fields and the one or more third cells that may comprise the second cell and do not comprise the first cell) correspond to one-to-one mapping (e.g., strictly one-to-one mapping), such as where one bit of the one or more bit-fields is associated with (e.g., indicates a dormancy status of) one configured cell of the one or more third cells. The associations are in an ascending order of SCell indexes (such as from MSB or LSB of the one or more bit-fields).

In one embodiment, the first network may, for each cell (e.g., each serving cell with which the UE is configured) except the first cell, configure the UE with a dormant BWP.

In one embodiment, the first network may, for each cell (e.g., each serving cell with which the UE is configured) except the first cell and the second cell, configure the UE with a dormant BWP.

In one embodiment, the first network is not configured to configure (e.g., the first network is not allowed to configure and/or is prohibited from configuring and/or is prevented from configuring) a dormant BWP for the second cell scheduling (e.g., cross-cell scheduling and/or cross-carrier scheduling) the first cell.

In one embodiment, the first network is not configured to configure (e.g., the first network is not allowed to configure and/or is prohibited from configuring and/or is prevented from configuring) the second cell with a configured dormant BWP for scheduling (e.g., cross-cell scheduling and/or cross-carrier scheduling) the first cell.

In one embodiment, the first network is not configured to indicate (e.g., the first network is not allowed to indicate and/or is prohibited from indicating and/or is prevented from indicating) a configured dormant BWP, for the second cell, for scheduling (e.g., cross-cell scheduling and/or cross-carrier scheduling) the first cell.

In one embodiment, the first network configures the UE to receive DCI in the second cell, wherein the DCI can schedule the second cell (e.g., self-scheduling) and/or the first cell (e.g., cross-carrier scheduling and/or cross-cell scheduling). The DCI may be UE-specific and/or in a UE-specific search space. Alternatively and/or additionally, the DCI may be associated with a UE-specific search space in the first cell or the second cell.

In one embodiment, in the first cell, the first network only transmits, for one or more UEs comprising the UE, common control information (e.g., group common control information and/or cell common control information) such as common DCI, and/or control information (e.g., DCI) in a common search space.

In one embodiment, in the first cell, the first network does not transmit, for one or more UEs comprising the UE, UE-specific control information (e.g., UE-specific DCI) nor control information (e.g., DCI) in a UE-specific search space in the first cell.

In one embodiment, the first cell is a PSCell or a PCell (in view of the UE, for example).

In one embodiment, the second cell is SCell (in view of the UE, for example).

In one embodiment, the second cell is not a PSCell (in view of the UE, for example).

In one embodiment, the first network may configure the UE to communicate with a second network.

In one embodiment, the first network controls cells in MCG.

In one embodiment, the second network controls cells in SCG.

In one embodiment, the second cell is configured by the first network.

In one embodiment, the UE communicates with the first network and the second network (via dual-connectivity (DC), for example).

In one embodiment, the first cell and the second cell are in a same cell group (e.g., the first cell and the second cell are in a MCG, or the first cell and the second cell are in a SCG).

Referring back to FIGS. 3 and 4, in one exemplary embodiment of a first network, the device 300 includes a program code 312 stored in the memory 310. The CPU 308 may execute program code 312 to enable the first network (i) to configure a UE with one or more cells (e.g., one or more serving cells) comprising a second cell, (ii) to configure the UE to receive, in the second cell, DCI for scheduling data in a first cell, wherein the first network is not configured to transmit (e.g., the first network is not allowed to transmit and/or is prohibited from transmitting and/or is prevented from transmitting) a DCI, to the UE, that indicates dormant status for the second cell, (iii) to transmit a first DCI indicative of dormancy information associated with the one or more cells, wherein the first DCI and/or the dormancy information indicates dormant status for a subset of the one or more cells, and wherein the subset of the one or more cells does not comprise the second cell, and (iv) after and/or in response to transmitting the first DCI and/or receiving a HARQ-ACK associated with the first DCI, to not transmit DCI on and/or for the subset of the one or more cells. Furthermore, the CPU 308 can execute the program code 312 to perform one, some and/or all of the above-described actions and steps and/or others described herein.

Figure 11:
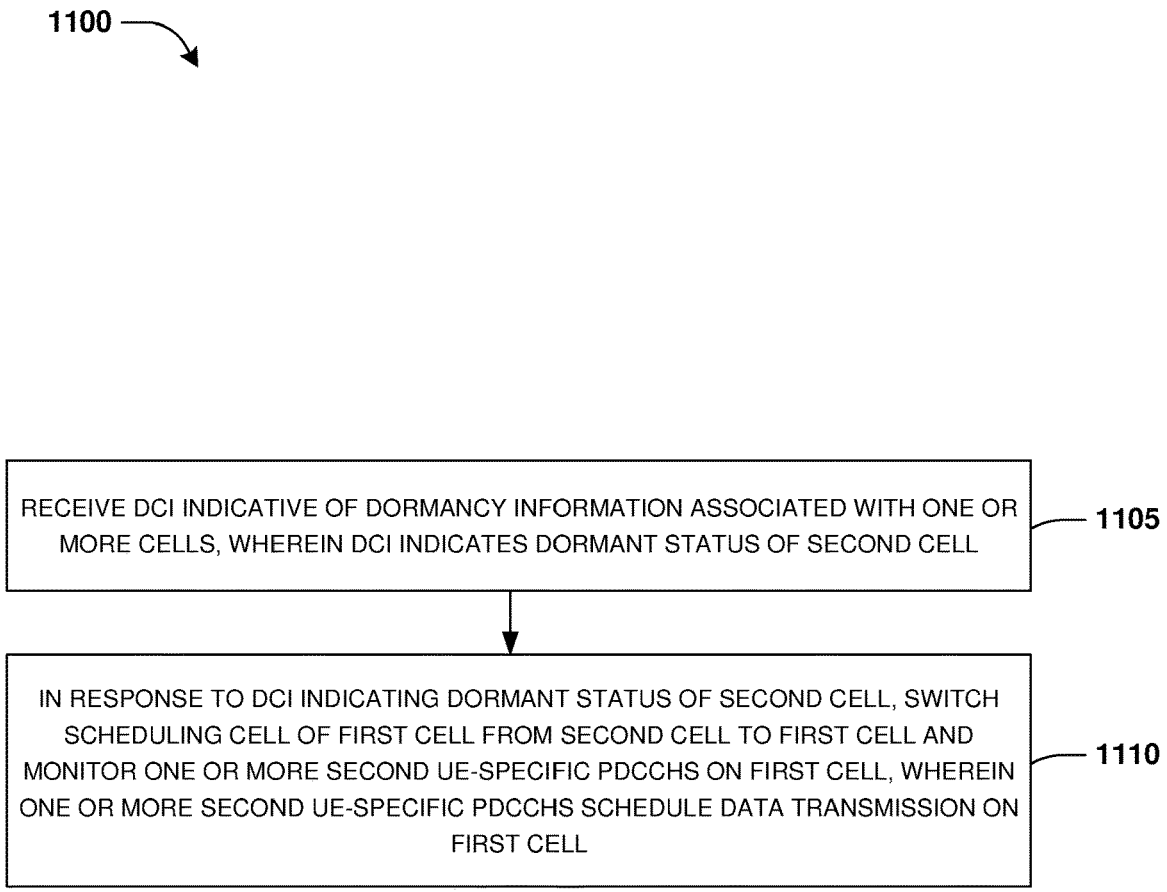
FIG. 11 is a flow chart according to one exemplary embodiment.

FIG. 11 is a flow chart 1100 according to one exemplary embodiment from the perspective of a UE. The UE is configured with one or more cells (e.g., one or more serving cells) comprising a second cell. The UE is configured to monitor one or more first UE-specific PDCCHs on the second cell. The one or more first UE-specific PDCCHs schedule first data transmission on a first cell. The one or more first UE-specific PDCCHs may correspond to one or more PDCCHs that are for the UE (e.g., one or more PDCCHs that are only for the UE and/or not for other UEs) and/or one or more PDCCHs for which the UE is an intended recipient (e.g., one or more PDCCHs for which only the UE is an intended recipient). In step 1105, the UE receives a DCI indicative of dormancy information associated with the one or more cells, wherein the DCI indicates dormant status of the second cell. In step 1110, in response to the DCI indicating the dormant status of the second cell, the UE switches a scheduling cell of the first cell from the second cell to the first cell, and monitors one or more second UE-specific PDCCHs on the first cell, wherein the one or more second UE-specific PDCCHs schedule second data transmission on the first cell. For example, the scheduling cell of the first cell may correspond to a cell that schedules data transmission of the first cell. Prior to receiving the DCI indicating the dormant status of the second cell, the scheduling cell of the first cell corresponds to the second cell (such as due to the UE being configured to monitor one or more first UE-specific PDCCHs on the second cell, wherein the one or more first UE-specific PDCCHs schedule the first data transmission on the first cell). The UE may switch the scheduling cell of the first cell from the second cell to the first cell based on the DCI indicating the dormant status of the second cell.

In one embodiment, in response to the DCI indicating the dormant status of the second cell, the UE monitors on the first cell, the UE does not monitor PDCCH (e.g., any PDCCH) on the second cell and/or the UE switches an active downlink and/or uplink BWP of the second cell into a dormant BWP of the second cell. In some examples, the UE does not monitor PDCCH (e.g., any PDCCH) on the second cell when the UE is in the dormant BWP of the second cell.

In one embodiment, in response to the DCI indicating the dormant status of the second cell, the UE switches from cross-cell scheduling and/or cross-carrier scheduling for scheduling the first cell to self-cell scheduling and/or self-carrier scheduling for scheduling the first cell. For example, for the first cell, the UE switches from cross-cell scheduling and/or cross-carrier scheduling to self-cell scheduling and/or self-carrier scheduling. For example, the UE switches from scheduling the first cell via cross-cell scheduling and/or cross-carrier scheduling to scheduling the first cell via self-cell scheduling and/or self-carrier scheduling.

In one embodiment, the DCI schedules data transmission (of the UE, for example).

In one embodiment, the DCI does not schedule data transmission (of the UE, for example).

In one embodiment, the one or more cells are in a same cell group.

In one embodiment, the first cell is a PCell and the second cell is a SCell.

In one embodiment, when the UE is in a dormant BWP of the second cell, the UE skips monitoring PDCCH for and/or on the dormant BWP of the second cell.

In one embodiment, after receiving the DCI indicating the dormant status of the second cell, the UE is in a dormant BWP of the second cell based on the DCI indicating the dormant status of the second cell, wherein, when the UE is in the dormant BWP of the second cell, the UE skips monitoring PDCCH on the dormant BWP of the second cell.

In one embodiment, when the UE is in a non-dormant BWP of the second cell, the UE does not monitor UE-specific PDCCH in the first cell nor PDCCH in a UE-specific search space in the first cell. For example, the UE may not monitor UE-specific PDCCH in the first cell nor PDCCH in a UE-specific search space in the first cell based on the UE being configured to monitor the one or more first UE-specific PDCCHs on the second cell, wherein the one or more first UE-specific PDCCHs schedule first data transmission on a first cell (and/or based on the scheduling cell of the first cell being the second cell prior to receiving the DCI indicating the dormant status of the second cell). The UE-specific search space may correspond to a search space configured for the UE (e.g., a search space configured only for the UE and/or not configured for other UEs).

In one embodiment, prior to receiving the DCI indicating the dormant status of the second cell, the UE is in a non-dormant BWP of the second cell, wherein, when the UE is in the non-dormant BWP of the second cell, the UE does not monitor UE-specific PDCCH in the first cell nor PDCCH in a UE-specific search space in the first cell. For example, the UE may not monitor UE-specific PDCCH in the first cell nor PDCCH in a UE-specific search space in the first cell based on the UE being configured to monitor the one or more first UE-specific PDCCHs on the second cell, wherein the one or more first UE-specific PDCCHs schedule first data transmission on a first cell (and/or based on the scheduling cell of the first cell being the second cell prior to receiving the DCI indicating the dormant status of the second cell).

In one embodiment, the UE receives the DCI on the first cell or on the second cell.

Referring back to FIGS. 3 and 4, in one exemplary embodiment of a UE, the device 300 includes a program code 312 stored in the memory 310. The UE is configured with one or more cells (e.g., one or more serving cells) comprising a second cell. The UE is configured to monitor one or more first UE-specific PDCCHs on the second cell. The one or more first UE-specific PDCCHs schedule first data transmission on a first cell. The CPU 308 may execute program code 312 to enable the UE (i) to receive a DCI indicative of dormancy information associated with the one or more cells, wherein the DCI indicates dormant status of the second cell, and (ii) in response to the DCI indicating the dormant status of the second cell, to switch a scheduling cell of the first cell from the second cell to the first cell and monitor one or more second UE-specific PDCCHs on the first cell, wherein the one or more second UE-specific PDCCHs schedule second data transmission on the first cell. Furthermore, the CPU 308 can execute the program code 312 to perform one, some and/or all of the above-described actions and steps and/or others described herein.

Figure 12:
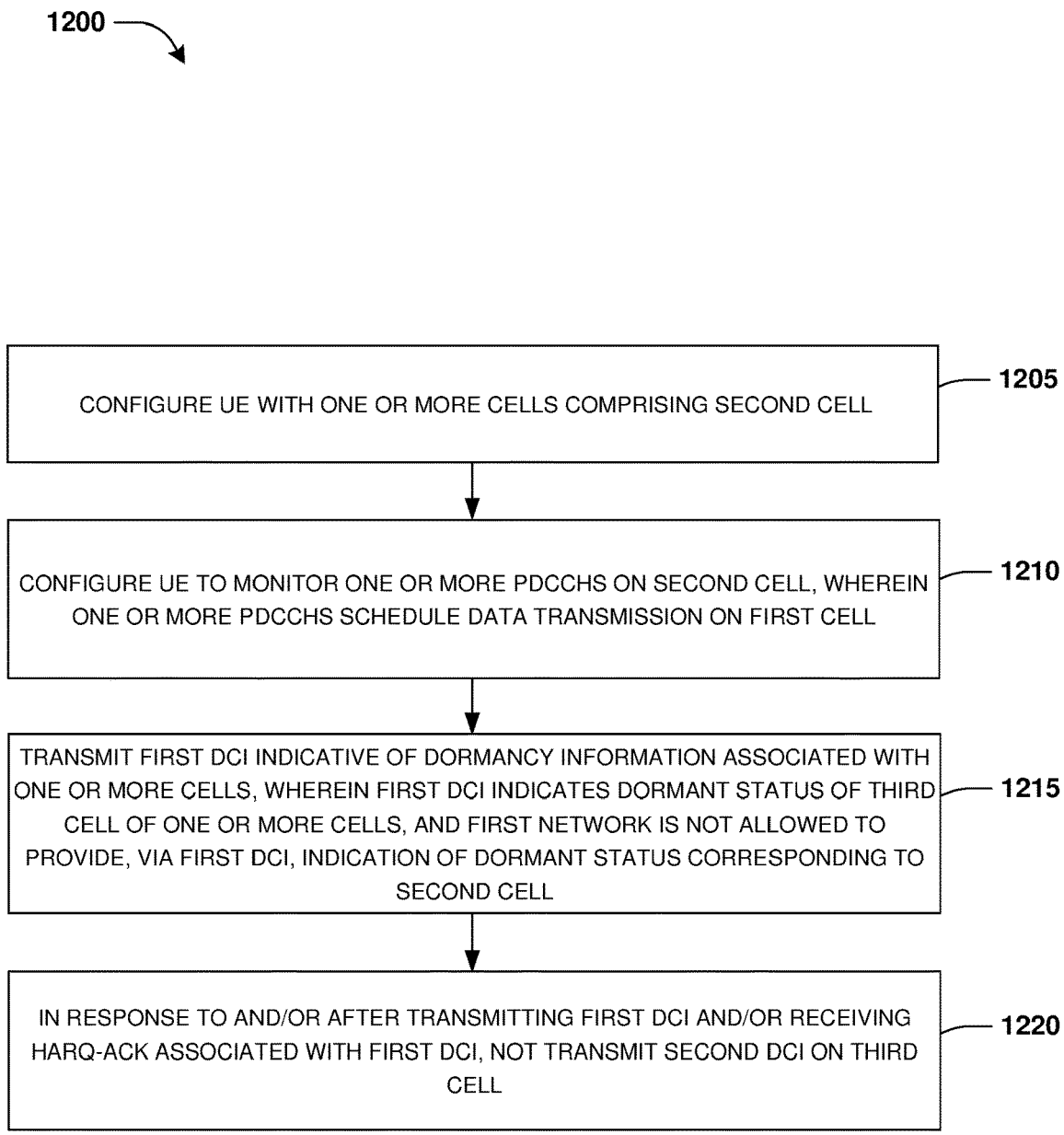
FIG. 12 is a flow chart according to one exemplary embodiment.

FIG. 12 is a flow chart 1200 according to one exemplary embodiment from the perspective of a first network. In step 1205, the first network configures a UE with one or more cells (e.g., one or more serving cells) comprising a second cell. In step 1210, the first network configures the UE to monitor one or more PDCCHs on the second cell, wherein the one or more PDCCHs schedule data transmission on a first cell. In step 1215, the first network transmits a first DCI indicative of dormancy information associated with the one or more cells. The first DCI indicates dormant status of a third cell of the one or more cells. The first network is not configured to provide (e.g., the first network is not allowed to provide and/or is prohibited from providing and/or is prevented from providing), via the first DCI, an indication of dormant status corresponding to the second cell. For example, the first network is not configured to indicate (e.g., the first network is not allowed to indicate and/or is prohibited from indicating and/or is prevented from indicating) dormant status of the second cell via the first DCI based on the second cell scheduling (e.g., cross-cell scheduling and/or cross-carrier scheduling) the first cell. For example, when the second cell schedules (e.g., cross-carrier schedules and/or cross-cell schedules) the first cell (and/or when the UE is configured to monitor the one or more PDCCHs on the second cell, wherein the one or more PDCCHs schedule data transmission on the first cell), the first network may not be configured to transmit (e.g., the first network is not allowed to transmit and/or is prohibited from transmitting and/or is prevented from transmitting) a DCI (e.g., any DCI), to the UE, that indicates dormant status of the second cell. In step 1220, after and/or in response to transmitting the first DCI and/or receiving a HARQ-ACK associated with the first DCI, the first network does not transmit a second DCI on and/or for the third cell. The HARQ-ACK may correspond to an indication that the UE received (e.g., successfully received) the first DCI. In some examples, the UE may switch from an active downlink and/or uplink BWP of the third cell into a dormant BWP of the third cell. The first network may not transmit the second DCI (and/or any DCI), to the UE, on and/or for the third cell when the UE is in the dormant BWP of the third cell.

In one embodiment, one or more bit-fields in the first DCI (e.g., one or more bit-fields in a DCI format of the first DCI) are indicative of the dormancy information. Each bit of the one or more bit-fields is associated with (e.g., indicates a dormancy status of) a cell (e.g., a configured cell), of the one or more cells, in a first cell group. In some examples, for each cell of the one or more cells, the one or more bit-fields indicate a dormancy status of the cell.

In one embodiment, the first network indicates the dormancy information by re-purposing one or more bit-fields in the first DCI (e.g., one or more bit-fields in a DCI format of the first DCI) to indicate the dormancy information. For example, the one or more bit-fields may comprise a bit-field that is used to indicate other type of information, other than dormancy information, in other transmissions of DCIs. Each bit of the one or more bit-fields is associated with (e.g., indicates a dormancy status of) a cell (e.g., a configured cell), of the one or more cells, in a first cell group. In some examples, for each cell of the one or more cells, the one or more bit-fields indicate a dormancy status of the cell.

In one embodiment, the one or more bit-fields comprises one or more bits associated with the one or more cells. The one or more cells do not comprise the first cell. One or more associations between the one or more bits and the one or more cells correspond to one-to-one mapping and are based on an ascending order of one or more SCell indexes associated with the one or more cells.

In one embodiment, the first network is not configured to configure (e.g., the first network is not allowed to configure and/or is prohibited from configuring and/or is prevented from configuring) the UE with a dormant BWP for the second cell.

In one embodiment, the first network is not configured to configure (e.g., the first network is not allowed to configure and/or is prohibited from configuring and/or is prevented from configuring) the second cell with a configured dormant BWP for scheduling (e.g., cross-cell scheduling and/or cross-carrier scheduling) the first cell.

In one embodiment, the first network is not configured to indicate (e.g., the first network is not allowed to indicate and/or is prohibited from indicating and/or is prevented from indicating) a configured dormant BWP, for the second cell, for scheduling (e.g., cross-cell scheduling and/or cross-carrier scheduling) the first cell.

In one embodiment, the one or more PDCCHs are UE-specific.

In one embodiment, the one or more PDCCHs are in a UE-specific search space.

In one embodiment, the one or more PDCCHs are associated with a UE-specific search space in the second cell.

In one embodiment, on the first cell, the first network does not transmit UE-specific control information (e.g., UE-specific DCI) to the UE nor control information (e.g., DCI) in a UE-specific search space to the UE. The UE-specific control information may correspond to control information (e.g., DCI) that is for the UE (e.g., control information that is only for the UE and/or not for other UEs) and/or control information (e.g., DCI) for which the UE is an intended recipient (e.g., control information for which only the UE is an intended recipient).

In one embodiment, when the second cell schedules (e.g., cross-carrier schedules and/or cross-cell schedules) the first cell (and/or when the UE is configured to monitor the one or more PDCCHs on the second cell, wherein the one or more PDCCHs schedule data transmission on the first cell), the first network does not transmit, on the first cell, UE-specific control information (e.g., UE-specific DCI) to the UE nor control information (e.g., DCI) in a UE-specific search space to the UE.

In one embodiment, the one or more cells are in a same cell group.

In one embodiment, the first cell is a PCell and the second cell is a SCell.

Referring back to FIGS. 3 and 4, in one exemplary embodiment of a first network, the device 300 includes a program code 312 stored in the memory 310. The CPU 308 may execute program code 312 to enable the first network (i) to configure a UE with one or more cells (e.g., one or more serving cells) comprising a second cell, (ii) to configure the UE to monitor one or more PDCCHs on the second cell, wherein the one or more PDCCHs schedule data transmission on a first cell, (iii) to transmit a first DCI indicative of dormancy information associated with the one or more cells, wherein the first DCI indicates dormant status of a third cell of the one or more cells, and wherein the first network is not configured to provide (e.g., the first network is not allowed to provide and/or is prohibited from providing and/or is prevented from providing), via the first DCI, an indication of dormant status corresponding to the second cell, and (iv) after and/or in response to transmitting the first DCI and/or receiving a HARQ-ACK associated with the first DCI, to not transmit second DCI on and/or for the third cell. Furthermore, the CPU 308 can execute the program code 312 to perform one, some and/or all of the above-described actions and steps and/or others described herein.

Figure 13:
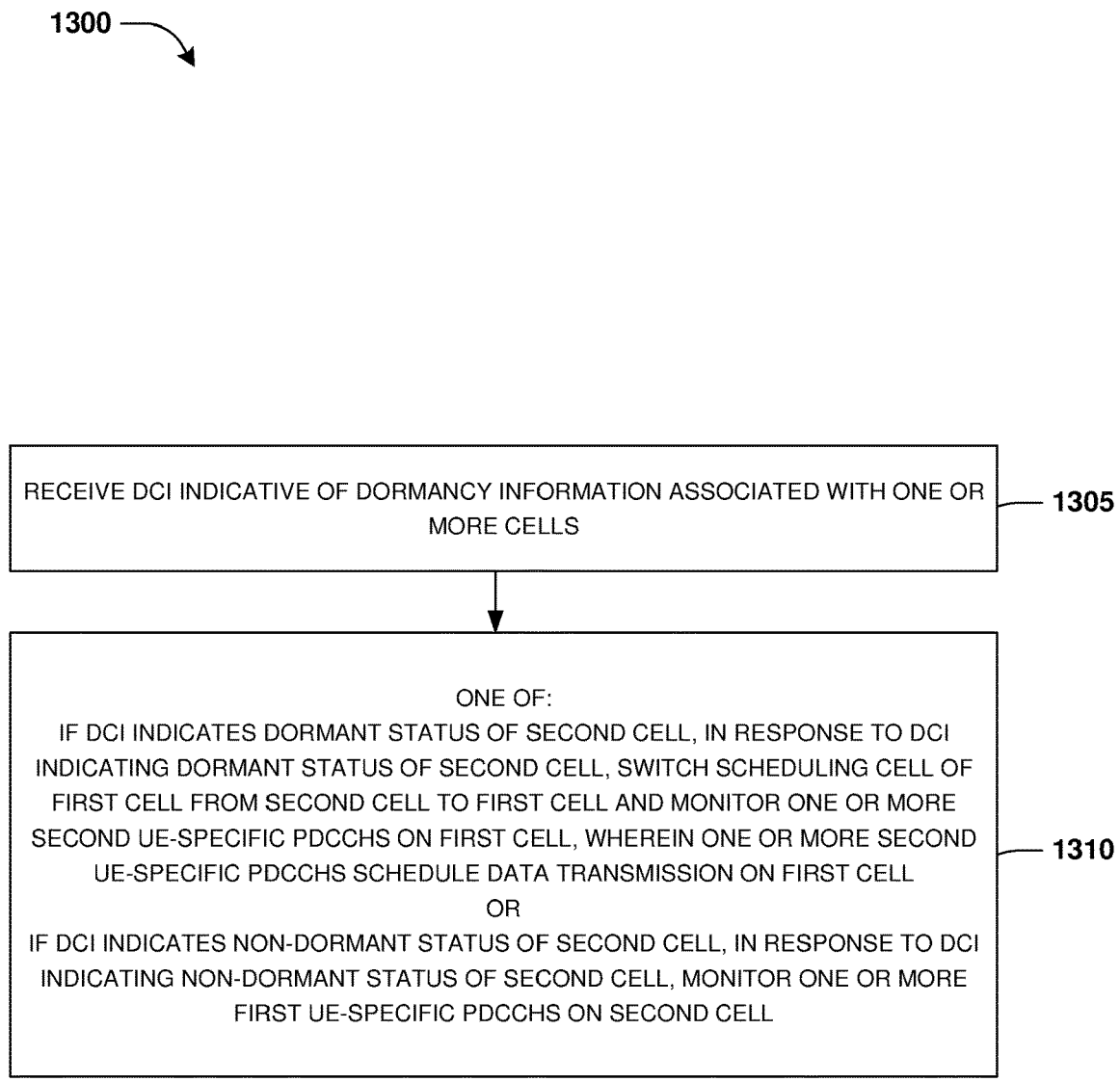
FIG. 13 is a flow chart according to one exemplary embodiment.

FIG. 13 is a flow chart 1300 according to one exemplary embodiment from the perspective of a UE. The UE is configured with one or more cells (e.g., one or more serving cells) comprising a second cell. The UE is configured to monitor one or more first UE-specific PDCCHs on the second cell. The one or more first UE-specific PDCCHs schedule first data transmission on a first cell. In step 1305, the UE receives a DCI indicative of dormancy information associated with the one or more cells, wherein the DCI indicates dormant status of the second cell. In step 1310, if the DCI indicates dormant status of the second cell, in response to the DCI indicating the dormant status of the second cell, the UE switches a scheduling cell of the first cell from the second cell to the first cell, and the UE monitors one or more second UE-specific PDCCHs on the first cell, wherein the one or more second UE-specific PDCCHs schedule data transmission on the first cell. If the DCI indicates non-dormant status of the second cell, in response to the DCI indicating the non-dormant status of the second cell, the UE monitors the one or more first UE-specific PDCCHs on the second cell.

Referring back to FIGS. 3 and 4, in one exemplary embodiment of a UE, the device 300 includes a program code 312 stored in the memory 310. The UE is configured with one or more cells (e.g., one or more serving cells) comprising a second cell. The UE is configured to monitor one or more first UE-specific PDCCHs on the second cell. The one or more first UE-specific PDCCHs schedule first data transmission on a first cell. The CPU 308 may execute program code 312 to enable the UE (i) to receive a DCI indicative of dormancy information associated with the one or more cells, wherein the DCI indicates dormant status of the second cell, and one of: (ii) if the DCI indicates dormant status of the second cell, in response to the DCI indicating the dormant status of the second cell, the UE switches a scheduling cell of the first cell from the second cell to the first cell, and the UE monitors one or more second UE-specific PDCCHs on the first cell, wherein the one or more second UE-specific PDCCHs schedule data transmission on the first cell, or (iii) if the DCI indicates non-dormant status of the second cell, in response to the DCI indicating the non-dormant status of the second cell, the UE monitors the one or more first UE-specific PDCCHs on the second cell. Furthermore, the CPU 308 can execute the program code 312 to perform one, some and/or all of the above-described actions and steps and/or others described herein.

A communication device (e.g., a UE, a network, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 9-13. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 9-13, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node) and improved service continuity, such as in scenarios in which a SCell with which a UE is configured schedules a PCell or a PSCell. The increased efficiency and/or the improved service continuity may be a result of using one or more of the techniques herein to avoid a situation in which the UE does not have and/or cannot receive UE-specific control signaling for scheduling the PCell or the PSCell. For example, using one or more of the techniques herein, the UE may not switch into a dormant BWP of the SCell if the SCell schedules the PCell or the PSCell. Alternatively and/or additionally, using one or more of the techniques herein, if the UE switches into a dormant BWP of the SCell, the UE may switch a scheduling cell of the PCell or the PSCell from the SCell to the PCell or the PSCell (without RRC signaling, for example), which may enable the UE to receive UE-specific control signaling for scheduling the PCell or the PSCell. However, in some systems, the UE may switch into a dormant BWP of the SCell scheduling the PCell or the PSCell without switching the scheduling cell of the PCell or the PSCell, which may cause the UE to not be able to receive UE-specific control signaling for scheduling the PCell or the PSCell and/or may result in service interruptions and/or communication delay.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), wherein the UE is configured with one or more cells comprising a second cell, wherein the UE is configured to monitor one or more first UE-specific Physical Downlink Control Channels (PDCCHs) on the second cell, and wherein the one or more first UE-specific PDCCHs schedule data transmission on a first cell, the method comprising:
    receiving a configuration of a UE-specific search space for configuring the UE to monitor, on the first cell, one or more second UE-specific PDCCHs in a first slot and a second slot;

when the UE is in a non-dormant Bandwidth Part (BWP) of the second cell:
  monitoring, on the first cell, one or more third PDCCHs in the first slot, wherein the one or more third PDCCHs are associated with a common search space; and
  not monitoring, on the first cell, the one or more second UE-specific PDCCHs in the first slot;
receiving, on the first cell, a Downlink Control Information (DCI) indicative of switching to a dormant BWP of the second cell; and
responsive to the DCI indicative of switching to the dormant BWP of the second cell:
  monitoring, on the first cell, the one or more second UE-specific PDCCHs in the second slot, wherein the one or more second UE-specific PDCCHs schedule data transmission on the first cell.

2. The method of claim 1, comprising:
responsive to the DCI indicative of switching to the dormant BWP of the second cell:
  switching an active BWP of the second cell into the dormant BWP of the second cell, wherein the active BWP is at least one of downlink or uplink.

3. The method of claim 1, comprising:
responsive to the DCI indicative of switching to the dormant BWP of the second cell:
  not monitoring PDCCH on the second cell.

4. The method of claim 1, wherein:
the DCI schedules data transmission.

5. The method of claim 1, wherein:
the DCI does not schedule data transmission.

6. The method of claim 1, wherein:
the one or more cells are in a same cell group.

7. The method of claim 1, wherein:
the first cell is a primary cell (PCell).

8. The method of claim 1, wherein, after receiving the DCI indicative of switching to the dormant BWP of the second cell, the UE is in the dormant BWP of the second cell based on the DCI indicative of switching to the dormant BWP of the second cell, the method comprising:
  skipping monitoring PDCCH on the dormant BWP of the second cell when the UE is in the dormant BWP of the second cell.

9. The method of claim 1, wherein:
the second cell is a secondary cell (SCell).

10. A User Equipment (UE), wherein the UE is configured with one or more cells comprising a second cell, wherein the UE is configured to monitor one or more first UE-specific Physical Downlink Control Channels (PDCCHs) on the second cell, and wherein the one or more first UE-specific PDCCHs schedule data transmission on a first cell, the UE comprising:
  a control circuit;
  a processor installed in the control circuit; and
  a memory installed in the control circuit and operatively coupled to the processor, wherein the processor is configured to execute a program code stored in the memory to perform operations, the operations comprising:
    receiving a configuration of a UE-specific search space for configuring the UE to monitor, on the first cell, one or more second UE-specific PDCCHs in a first slot and a second slot;
    when the UE is in a non-dormant Bandwidth Part (BWP) of the second cell:
      monitoring, on the first cell, one or more third PDCCHs in the first slot, wherein the one or more third PDCCHs are associated with a common search space; and
      not monitoring, on the first cell, the one or more second UE-specific PDCCHs in the first slot;
    receiving, on the first cell, a Downlink Control Information (DCI) indicative of switching to a dormant BWP of the second cell; and
    responsive to the DCI indicative of switching to the dormant BWP of the second cell:
      monitoring, on the first cell, the one or more second UE-specific PDCCHs in the second slot, wherein the one or more second UE-specific PDCCHs schedule data transmission on the first cell.

11. The UE of claim 10, the operations comprising:
responsive to the DCI indicative of switching to the dormant BWP of the second cell, not monitoring PDCCH on the second cell.

12. The UE of claim 10, wherein:
the DCI schedules data transmission.

13. The UE of claim 10, wherein:
the DCI does not schedule data transmission.

14. The UE of claim 10, wherein:
the one or more cells are in a same cell group.

15. The UE of claim 10, wherein:
the first cell is a primary cell (PCell).

16. The UE of claim 10, wherein:
the second cell is a secondary cell (SCell).

17. The UE of claim 10, wherein, after receiving the DCI indicative of switching to the dormant BWP of the second cell, the UE is in the dormant BWP of the second cell based on the DCI indicative of switching to the dormant BWP of the second cell, the method comprising:
  skipping monitoring PDCCH on the dormant BWP of the second cell when the UE is in the dormant BWP of the second cell.

18. The UE of claim 10, wherein:
the non-dormant BWP is at least one of downlink or uplink.

19. The UE of claim 10, the operations comprising:
responsive to the DCI indicative of switching to the dormant BWP of the second cell, switching an active BWP of the second cell into the dormant BWP of the second cell, wherein the active BWP is at least one of downlink or uplink.

20. A method of a User Equipment (UE), wherein the UE is configured with one or more cells comprising a second cell, wherein the UE is configured to monitor one or more first UE-specific Physical Downlink Control Channels (PDCCHs) on the second cell, and wherein the one or more first UE-specific PDCCHs schedule data transmission on a first cell, the method comprising:
  receiving a configuration of a UE-specific search space for configuring the UE to monitor, on the first cell, one or more second UE-specific PDCCHs in a first slot and a second slot;
  when the UE is in a non-dormant Bandwidth Part (BWP) of the second cell:
    monitoring, on the first cell, one or more third PDCCHs in the first slot, wherein the one or more third PDCCHs are associated with a common search space; and
  receiving, on the first cell, a Downlink Control Information (DCI) indicative of switching to a dormant BWP of the second cell; and responsive to the DCI indicative of switching to the dormant BWP of the second cell:
monitoring, on the first cell, the one or more second UE-specific PDCCHs in the second slot, wherein the one or more second UE-specific PDCCHs schedule data transmission on the first cell.

* * * * *